(12) United States Patent
Bollard et al.

(10) Patent No.: US 9,410,050 B2
(45) Date of Patent: Aug. 9, 2016

(54) COMPOSITIONS AND METHODS TO IMPROVE THE SETTING PROPERTIES AND RUB RESISTANCE OF PRINTING INKS

(71) Applicant: Sun Chemical Corporation, Parsippany, NJ (US)

(72) Inventors: Jerome Bollard, Asnieres sur Seine (FR); Ramasamy Krishnan, North Brunswick, NJ (US); Christian Johnke, Frankfurt am Main (DE); Hiroyuki Sugiyama, Saitama (JP); Mark Schneider, River Vale, NJ (US); David Klein, Wayne, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 14/746,284

(22) Filed: Jun. 22, 2015

(65) Prior Publication Data
US 2015/0284574 A1    Oct. 8, 2015

Related U.S. Application Data

(63) Continuation of application No. 13/885,551, filed as application No. PCT/US2011/060845 on Nov. 15, 2011, now Pat. No. 9,115,291.

(60) Provisional application No. 61/413,611, filed on Nov. 15, 2010.

(51) Int. Cl.
| | |
|---|---|
| *C09D 11/10* | (2014.01) |
| *C08F 2/18* | (2006.01) |
| *C09D 11/02* | (2014.01) |
| *C08F 265/06* | (2006.01) |
| *B41M 1/06* | (2006.01) |
| *C09D 11/107* | (2014.01) |
| *C09D 151/00* | (2006.01) |
| *C09D 11/033* | (2014.01) |

(52) U.S. Cl.
CPC ............... *C09D 11/107* (2013.01); *B41M 1/06* (2013.01); *C08F 2/18* (2013.01); *C08F 265/06* (2013.01); *C09D 11/02* (2013.01); *C09D 11/033* (2013.01); *C09D 151/003* (2013.01)

(58) Field of Classification Search
CPC ...... C09D 11/10; C09D 11/02; C09D 11/107; C09D 11/033; C09D 151/03; C08F 2/18; C08F 265/06; B41M 1/06
USPC ................ 524/236, 251, 522, 523, 561, 801; 525/902; 526/201
See application file for complete search history.

(56) References Cited

U.S. PATENT DOCUMENTS

| | | |
|---|---|---|
| 3,847,851 A | 11/1974 | Tugukuni et al. |
| 4,251,412 A | 2/1981 | Ferrini |
| 4,253,397 A | 3/1981 | Emmons et al. |
| 4,278,582 A | 7/1981 | Miller |
| 4,632,961 A | 12/1986 | Tsutsui et al. |
| 5,093,390 A | 3/1992 | Shibato et al. |
| 5,547,804 A | 8/1996 | Nishizawa et al. |
| 5,607,808 A | 3/1997 | Nishizawa et al. |
| 5,698,616 A | 12/1997 | Baker et al. |
| 7,038,027 B2 | 5/2006 | Sinha |
| 2002/0058730 A1 | 5/2002 | Kawashima et al. |
| 2003/0078319 A1 | 4/2003 | Sprycha et al. |
| 2005/0085559 A1 | 4/2005 | Hahnle et al. |
| 2005/0244736 A1* | 11/2005 | Yon .................. G03G 9/133 430/115 |
| 2007/0173560 A1* | 7/2007 | Uozumi .............. C09D 11/36 523/160 |
| 2010/0136236 A1 | 6/2010 | Hosoya et al. |

FOREIGN PATENT DOCUMENTS

| | | |
|---|---|---|
| CN | 1444595 | 9/2003 |
| CN | 101007917 | 8/2007 |
| DE | 19511476 | 11/1995 |
| EP | 1764161 A1 | 3/2007 |
| EP | 2053069 | 4/2009 |
| GB | 2434371 | 7/2007 |
| JP | S49-020252 | 2/1974 |
| JP | 03-106970 | 5/1991 |
| JP | 06-073261 | 3/1994 |
| JP | H07-503981 | 4/1995 |
| JP | 07-268264 | 10/1995 |
| JP | 07-319221 | 12/1995 |
| JP | H11-513423 | 11/1999 |
| JP | 2000-273381 | 10/2000 |

(Continued)

OTHER PUBLICATIONS

Chinese Office Action issued in corresponding Chinese Application No. 201180063653.9, dated Jan. 19, 2016 (with English Language Translation).

(Continued)

*Primary Examiner* — Michael M Bernshteyn
(74) *Attorney, Agent, or Firm* — Charles C. Achkar; Ostrolenk Faber LLP

(57) ABSTRACT

Provided are high viscosity essentially non-aqueous dispersions containing acrylic core/shell polymer particles in a non-aqueous solvent; sheetfed, heatset and coldset lithographic ink compositions containing the dispersions; and methods of printing with ink containing the dispersions to improve the setting and drying properties and rub resistance of sheet fed offset, heatset and coldset lithographic inks. The lithographic inks containing the dispersions set quickly enough to allow processing of printed sheets soon after printing.

34 Claims, No Drawings

(56) References Cited

FOREIGN PATENT DOCUMENTS

| JP | 2006-299039 | 11/2006 |
| JP | 2006-348189 | 12/2006 |
| JP | 2007-197500 | 8/2007 |
| WO | 03044105 A1 | 5/2003 |
| WO | 2007068102 | 6/2007 |
| WO | 2009155201 A1 | 12/2009 |
| WO | 2011014826 A1 | 2/2011 |

OTHER PUBLICATIONS

Office Action issued in connection with European Application No. 09767511.0 dated Dec. 17, 2013.
Database WPI Week 200747, Thomson Scientific, Longon, GB; AN 2007-478347, XP002540852 & JP 2006 348189 A (DYnic Corp.) Dec. 28, 2006, Abstract.
Office Action issued in connection with European Application No. 10805141.8 dated Nov. 27, 2012.
Office Action issued in connection with Japanese Application No. 2012-523107 dated Dec. 24, 2013 (with English translation).
Office Action issued in connection with Japanese Application No. 2011-514711 dated Aug. 13, 2013 (with English translation).
Notice of Allowance issued in connection with Japanese Application No. 2011-514711 dated Jan. 21, 2014 (with English translation).
Office Action issued in connection with U.S. Appl. No. 13/387,482 dated Feb. 6, 2014.
Notice of Allowance issued in connection with U.S. Appl. No. 13/387,482 dated Feb. 27, 2014.
Chinese Office Action Issued in Chinese Application No. 201080034062.4, dated Sep. 23, 2014.
International Search Report from PCT Application No. PCT/US2011/060845, filed Mar. 3, 2012.
Japanese Office Action issued in corresponding Japanese Patent Application No. 2013-539957, dated Nov. 16, 2015 (with English Language Translation).
Chinese Office Action issued in corresponding Chinese Application No. 201180063653.9, dated May 27, 2016 (with English Language Translation).

* cited by examiner

COMPOSITIONS AND METHODS TO IMPROVE THE SETTING PROPERTIES AND RUB RESISTANCE OF PRINTING INKS

CROSS REFERENCE TO RELATED APPLICATIONS

The present application is a continuation application of U.S. patent application Ser. No. 13/885,551 filed on Aug. 20, 2013, which is a §371 National Phase application based on PCT/US2011/60845, filed on Nov. 15, 2011, which claims priority to and benefit of U.S. Provisional Application No. 61/413,611, filed on Nov. 15, 2010, the subject matter of each of which is incorporated by reference in their entirety.

RELATED APPLICATION

Benefit of priority is claimed to U.S. Provisional Application Ser. No. 61/413,611, filed Nov. 15, 2010, entitled "NON-AQUEOUS DISPERSION AS AN ALTERNATIVE TO DRIER IN OXIDATIVE DRYING OFFSET INK," to Jerome Bollard.

Where permitted, the subject matter of the above-referenced application is incorporated by reference in its entirety.

FIELD OF THE INVENTION

Lithographic printing inks that allow processing of lithographic ink printed sheets soon after printing are provided. The invention relates to lithographic sheetfed printing inks containing a high viscosity essentially non-aqueous dispersion made of acrylic core/shell polymers in a non-aqueous organic solvent (NAD); heatset and coldset lithographic inks containing NAD; and to methods of printing with lithographic inks containing NAD to improve the setting and drying properties and rub resistance of sheetfed offset, heatset and coldset lithographic inks.

BACKGROUND

Lithographic printing processes often are used to prepare printed articles such as papers, magazines, films and labels. For lithographic printing processes, all types of lithographic printing inks known in the art can be used, depending on the selected process. These include, e.g., sheetfed, heatset and coldset lithographic printing inks.

Sheetfed printing inks normally dry as a result of an oxido-polymerization process. The oxygen surrounding the ink film reacts with the free C═C double bonds present in the ink system, which allows the formation of a high molecular weight polymer. The kinetics of this process are very slow and oxidative drying could last anywhere from several days to weeks depending on the ink formulation. Thus, in order to expedite further processing, such as cutting, folding and/or binding, the printed substrate often is overprinted with varnish. This is an added step that adds to the cost of the process.

The kinetics of oxidative drying can be increased by including metal drier or metal catalyst, which allows the ink film to be dried anywhere from several hours to 1 or 2 days. However, printing inks containing metal catalysts or metal driers have two major drawbacks. Firstly, the sheetfed printing inks are prone to premature polymerization on the press, which can necessitate time consuming and costly frequent press cleaning, or premature polymerization in storage containers, usually in the form of skin formation, which leads to sheetfed printing ink wastage and possible contamination. Secondly, the metal driers or metal catalysts are generally not user-friendly due to associated toxicity issues. Cobalt salts are the most widely used metal driers or metal catalysts in sheetfed offset printing but are regarded as toxic to handlers.

In the literature, there is no description of sheetfed offset inks that can polymerize (dry) quickly enough for further processing without the need for overprinting or including metal driers or metal catalysts. Thus, a need exists to improve the setting and drying properties and rub resistance of sheetfed lithographic inks while minimizing or eliminating metal driers or metal catalysts in the printing inks and the associated health risks and/or eliminating the need to overprint with varnish prior to further processing.

Lithographic printing inks used in heatset printing processes dry under the influence of heat, generally via solvent evaporation. The evaporation of solvent can be a major factor in the drying speed of the heatset printing ink. Heatset printing inks often include oils, such as, for example, mineral oils, which oils evaporate under the influence of heat, thereby allowing the printing ink film on the printed substrate to dry. The oils, e.g., mineral oils, can have a boiling range above 200° C. For example, some heatset printing inks often include oils have a boiling range of 220° C. to 320° C. Because the heatset printing ink does not need to have its components absorbed by the substrate, e.g., paper, in order to dry, substrates having smaller pores and/or having a coated surface can be printed.

Solvent evaporation as a drying mechanism can be accomplished at room temperature given enough time. Stacking of fresh prints in order to conserve space, which is typical during long printing runs, frequently limits the amount of oxygen available to the printed sheets and thus reduces the oxido-polymerization mechanism for drying, thereby limiting the efficacy of room temperature drying of stacked prints. To meet the efficacy requirements of the modern printer, a thermal process to accelerate solvent drying is required in heatset printing applications. The requirement that heatset printing inks be dried, such as by using a thermal process or other drying devices, means that the printing process can be energy intensive. Additionally, the incorporation of some solvents in lithographic printing inks can result in undesirable distortion, e.g., capillary spread prior to the ink drying, impacting print resolution. Thus, a need exists to improve the setting properties and drying properties and rub resistance of heatset printing inks while reducing the temperature needed to cure the heatset printing inks or eliminating the need to heat the heatset printing ink altogether.

Printing inks used in coldset printing processes dry by absorption of ink components into the substrate, such as paper. Coldset printing inks can include special auxiliary substances, e.g., surfactants, waxes, gelating agents and mineral fillers, which enhance or enable the ink film on the printed substrate surface to dry by causing ink components to be absorbed into the substrate. The printed ink film generally does not have the same strength as the film produced from a heatset printing ink formulation. Rub off can be a problem for some coldset printing ink formulations. Thus, a need exists to improve the setting properties and rub resistance of coldset printing inks.

SUMMARY OF THE INVENTION

It now has been found that the setting and drying rates, as measured by rub resistance, of most printing inks, particularly lithographic printing inks, including sheetfed, heatset and coldset lithographic printing inks, is advantageously enhanced by the inclusion of an essentially non-aqueous dispersion containing acrylic core/shell polymers in a continuous phase of an essentially non-aqueous organic solvent (NAD). Incorporation of NAD in lithographic printing inks results in printing inks that set dry dramatically faster than conventional lithographic printing inks.

Provided herein are lithographic printing inks and methods for improved processability of a lithographic printed substrate. In particular, provided are sheetfed offset printing inks containing NAD that exhibit fast setting and drying speeds while preferably eliminating metal driers or metal catalysts and the associated health risks. For the purposes of this application, drying speed is assessed by rub resistance testing, which indicates the degree of drying in a printed ink film. Better rub resistance indicates faster drying. Worse rub resistance indicates slower drying.

Provided herein are sheetfed printing inks that contain NAD but preferably do not contain metal drier or metal catalyst and that still dry quickly enough to allow processing of sheetfed printed sheets soon after printing without requiring overprinting. Also provided are methods of sheetfed offset lithographic printing of a substrate that minimize or obviate the need to include a metal drier or metal catalyst in order to produce a printed substrate that rapidly exhibits sufficient rub resistance to allow further processing of the printed substrate soon after printing. The methods include applying to a substrate a heatset printing ink that includes a NAD.

Also provided are heatset lithographic printing inks that contain a NAD and exhibit fast setting and drying speeds at reduced applied thermal conditions. Also provided are heatset lithographic printing inks that contain NAD and exhibit fast drying speeds at ambient drying conditions. Also provided are methods of heatset offset lithographic printing of a substrate that allows formation of a printed ink film on the substrate, the printed ink film rapidly exhibiting rub resistance. The method includes providing a heatset lithographic printing ink containing a NAD, which reduces the thermal energy required to set and dry the printing ink or eliminates the need to apply an external energy source, such as using a thermal process or other drying devices, such as, e.g., UV or IR dryers, in order to form a printed heatset printing ink film exhibiting rub resistance on the substrate.

Provided herein are coldset offset lithographic printing inks, which contain a NAD, and that exhibit fast setting and drying speeds compared to comparable coldset printing inks that do not contain a NAD. Also provided are methods of coldset offset lithographic printing of a substrate that results in a printed coldset printing ink film that exhibits enhanced rub resistance. The methods include applying to the substrate a coldset lithographic printing ink that includes a NAD.

DETAILED DESCRIPTION OF THE INVENTION

It is to be understood that the foregoing general description and the following detailed description are exemplary and explanatory only and are not restrictive of any subject matter claimed.

The section headings used herein are for organizational purposes only and are not to be construed as limiting the subject matter described.

A. DEFINITIONS

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

In this application, the use of the singular includes the plural unless specifically stated otherwise.

In this application, the use of "or" means "and/or" unless stated otherwise. As used herein, use of the term "including" as well as other forms, such as "includes," and "included," is not limiting.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, "improved rub resistance" refers to achieving a rub resistance of a printed ink in a certain amount of time after printing that is better that the rub resistance achieved with a comparable control printed ink in the same amount of time. As an example, inks exhibiting improved rub resistance exhibit improved processability, in which the printed substrate can be subjected to further processing without detrimental effect to the printed ink. In some instances, an ink demonstrating improved rub resistance has a rub resistance in 15 minutes or less that is equal to the rub resistance achieved in a standard ink after 1 hour.

As used herein, "setting" refers to ink film formation and apparent drying of the ink. Although the ink chemically may not be dried, the ink is set and exhibits rub resistance.

As used here, "NAD" refers to an essentially non-aqueous dispersion containing acrylic core/shell polymers, which can be in the form of particles, in an essentially non-aqueous solvent. While the continuous phase of the dispersion is a non-aqueous solvent, such as a non-aqueous organic solvent, the dispersion can contain up to 1 wt % water, such as 0.001 wt % to 1 wt % water based on the weight of the composition.

As used herein, "essentially non-aqueous" refers to a composition that contains minimal to no water. In some instances, an essentially non-aqueous composition can contain up to 1.0 wt % water based on the weight of the composition.

As used herein, a "rheology adjusting component" refers to a compound or mixture of two or more compounds that when added to a dispersion modifies the rheology of the dispersion. The modification to the rheology can result in an increase in the viscosity of the dispersion.

As used herein, "core-to-shell ratio" or "core/shell ratio" refers to the value obtained when the amount of acrylic core polymer in a core/shell polymer particle is divided by the amount of acrylic shell polymer in a core/shell polymer particle.

B. IMPROVED LITHOGRAPHIC PRINTING INKS

It now has been found that the setting and drying rates, as measured by rub resistance, of most printing inks, such as lithographic printing inks, including sheetfed, heatset and coldset lithographic printing inks, can be advantageously enhanced by the inclusion of a NAD as described herein. Incorporation of a NAD in a lithographic printing ink results in a lithographic printing ink that sets and dries dramatically faster than conventional lithographic printing inks that do not include a NAD.

Sheetfed lithographic printing inks are designed to run on sheetfed presses and are formulated to print on appropriate substrates that are printed using a sheetfed lithographic process. The NADs provided herein can be used in conventional and waterless printing sheetfed lithographic printing inks. Conventional sheetfed lithographic printing inks typically have a viscosity (measured using a Laray falling rod viscometer) of between at or about 150 dPa·s to at or about 250 dPa·s and a tack (measured using a Tack-o-Scope device at 200 rpm, e.g., from Testprint, Inc., Cherry Hill, N.J.) of at or about 130 to at or about 220. Waterless printing sheetfed lithographic printing inks typically have a viscosity (measured using a Laray falling rod viscometer) of between at or about 220 dPa·s to at or about 400 dPa·s and a tack (measured using a Tack-o-Scope device at 200 rpm) of at or about 120 to at or about 180.

Heatset lithographic printing inks are designed to run on heatset presses and are formulated to print on appropriate substrates that are printed using a heatset lithographic process. The NADs provided herein can be used in heatset lithographic printing inks. Heatset lithographic printing inks typically have a viscosity (measured using a Laray falling rod viscometer) of between at or about 70 dPa·s to at or about 150 dPa·s and a tack (measured using a Tack-o-Scope device at 300 rpm) of at or about 100 to at or about 200.

Coldset lithographic printing inks are designed to run on coldset presses and are formulated to print on appropriate substrates that are printed using a coldset lithographic process. The NADs provided herein can be used in coldset lithographic printing inks. Coldset lithographic printing inks typically have a viscosity (measured using a Laray falling rod viscometer) of between at or about 40 dPa·s to at or about 100 dPa·s and a tack (measured using a Tack-o-Scope device at 300 rpm) of at or about 80 to at or about 130.

C. ESSENTIALLY NON-AQUEOUS DISPERSIONS OF ACRYLIC CORE/SHELL POLYMER (NADS)

Dispersions of polymers are known in the art (for example, see U.S. Pat. Nos. 6,638,995 and 5,331,025, U.S. Patent Application Publ. No. US2005/0244736 and International patent publications WO 2009/155201 and WO2011/014826). U.S. Pat. No. 6,638,995 describes lithographic printing inks that include a polyol phase dispersed or emulsified in a branched vinyl resin vehicle phase. The patent states that the inks have improved misting and slinging properties and when used in news inks are purported to improved rub-off properties. The vinyl resins are prepared by chain reaction polymerization, or addition polymerization, through carbon-carbon double bonds, using vinyl monomers, such as acrylic and methacrylic monomers. The inks can also include other resins and one or more solvents, including water and aliphatic hydrocarbons (lithographic inks) or soybean or other vegetable oils (gravure and flexographic inks). The inks purportedly can be formulated having an oil-based continuous phase that contains the branched vinyl vehicle and a polyol discontinuous (dispersion) phase that contains a liquid polyol.

U.S. Pat. No. 5,331,025 describes methods for reducing the drying time of paints that contain composite polymer particles having a softer, insoluble first stage and a hard second stage. The composite polymer particles are described as being made of at least two mutually incompatible polymer stages that can be present as core/shell polymers.

U.S. Published Patent Appl. US 2005/0244736 describes liquid toners for electro-photographic image forming apparatuses, e.g., copiers, laser printers, and fax machines. The patent application describes the toners as containing an organosol and dispersion assistant agent that has an unsaturated double bond that photo-polymerizes in the presence of a photoreactive catalyst. The organosol purportedly contains particles of a thermoplastic co-polymer core that is insoluble in the carrier liquid (aliphatic hydrocarbon), and a shell containing co-polymer graft stabilizer that is covalently bonded to the thermoplastic co-polymer core. The patent application describes a function of the organosol as maintaining dispersion stability of the toner for an extended period of time.

In the international patent publication WO09155201, the use of a non-aqueous dispersion (NAD) polymer is described in order to increase the drying speed of a sheetfed offset ink. The specification mentions that the amount of NAD present in the sheet fed offset ink is at least from about 1% to about 15%, more preferably about 5% and most preferably about 10%. The examples, however, are limited to an amount of NAD of 10 wt % based on the weight of the ink, which necessitates the use of a metal drier or metal catalyst to polymerize the ink.

Core/shell polymer technology is well known in the polymer arts. For example, see U.S. Pat. Nos. 3,985,703; 4,264,678; 4,375,532; 4,419,471; 4,888,395; 4,916,171; 4,994,524; 5,006,592; 5,087,663; 5,186,993; 5,324,780; 6,203,973; 6,309,739; 6,605,404 and 7,939,103; and Kazemi et al., Small 4(10): 1756-1762 (2008). Any of the core/shell polymers known in the art that are compatible with the ink components can be used in the present invention.

Core/shell polymers have been used successfully in paint to control body, encapsulate pigment, and to provide emulsion-like dispersions in water-free environments. Preferred NADs for lithographic printing inks contain insoluble acrylic polymer particles dispersed in an essentially non-aqueous organic medium. These dispersions are attractive additives for lithographic printing inks due to their controlled particle size.

The preferred NAD used in the present lithographic printing inks can be formed by generating an acrylic core-shell polymer where the shell polymer is soluble in the continuous phase solvent while the acrylic core polymer is insoluble in the solvent, but soluble in the shell polymer. This structure can be obtained through a 2-step polymerization where the shell polymer is formed first and then the acrylic core polymer is "filled in," generating a dispersion. This process is described in WO09155201A, which is incorporated herein in its entirety by reference.

In the preparation of the NAD, the acrylic monomers used to make the acrylic shell polymer and/or the acrylic core polymer can include a functional group selected from among a carboxyl group, a hydroxyl group and a vinyl group.

The acrylic core polymer and/or the acrylic shell polymer of the NAD can include monomers that include a carboxyl functional group. Exemplary monomers that include a carboxyl functional group include acrylic acid, methacrylic acid, itaconic acid and maleic acid.

The acrylic core polymer and/or the acrylic shell polymer of the NAD can include monomers that include a hydroxyl functional group. Exemplary monomers that include a hydroxyl functional group include 2-hydroxy ethyl acrylates, 2-hydroxy ethyl methacrylates, 2-hydroxy propyl acrylates and 2-hydroxy propyl methacrylates.

The acrylic core polymer and/or the acrylic shell polymer of the NAD can include monomers that include a vinyl functional group. Exemplary monomers that include a hydroxyl functional group include glycidyl acrylate; glycidyl methacrylates and dimethyl amino methacrylate.

The NAD can be prepared by selecting a pre-formed acrylic shell polymer that is soluble in the continuous phase essentially non-aqueous solvent and then generating an acrylic core polymer from monomers selected to form an acrylic core polymer that is insoluble in the essentially non-aqueous solvent, but soluble in the shell polymer. By reacting the pre-formed acrylic shell polymer with the acrylic core polymer in the essentially non-aqueous solvent at elevated temperature, such as between 85° C.-140° C., the acrylic core polymer preferentially interacts with the acrylic shell polymer to form core/shell polymers, particularly core/shell polymer particles, generating a dispersion of core/shell polymer in the continuous phase essentially non-aqueous solvent.

The NAD also can be prepared by selecting a pre-formed acrylic shell polymer that is soluble in the continuous phase essentially non-aqueous solvent and selecting a pre-formed acrylic core polymer that is insoluble in the essentially non-aqueous solvent, but soluble in the shell polymer. By reacting the pre-formed acrylic shell polymer with the pre-formed acrylic core polymer in the essentially non-aqueous solvent at elevated temperature, such as between 85° C.-140° C., the acrylic core polymer preferentially interacts with the acrylic shell polymer to form core/shell polymers, particularly core/shell polymer particles, generating a dispersion of core/shell polymer in the continuous phase essentially non-aqueous solvent.

D. ACRYLIC CORE/SHELL POLYMER NAD FORMATION

NAD Synthesis

The non-aqueous dispersions provided herein can be formed by generating an acrylic core/shell polymer where the shell polymer is soluble in an essentially non-aqueous organic solvent continuous phase while the acrylic core polymer is insoluble in the solvent, but soluble in the shell polymer. The acrylic core/shell polymer can be formed in a two-step polymerization process in which the shell polymer is formed first and then the acrylic core polymer is "filled in," generating a dispersion.

1. Acrylic Shell Polymer

The shell polymer can be formed using any method known in the art. For example, the acrylic shell polymer of the acrylic core/shell polymer can be formed by first heating a continuous phase essentially non-aqueous solvent to 120° C. or to about 120° C., under an inert gas, such as nitrogen gas, in a reaction vessel. The continuous phase essentially non-aqueous solvent can be an organic medium, such as a vegetable oil or a hydrocarbon solvent, for example a hydrocarbon oil. The oil should have good solubility, preferably with an aniline point between from or between about from 45° C. to 90° C., or 50° C. to 80° C., such as at or about 45° C., 50° C., 55° C., 60° C., 65° C., 70° C., 75° C., 80° C., 85° C. or 90° C. Examples of vegetable oils include almond oil, cacao oil, candlenut oil, castor oil, dehydrated castor oil, coconut oil, corn oil, cottonseed oil, grape seed oil, hempseed oil, linseed oil, olive oil, palm kernel oil, peanut oil, rapeseed oil, rice bran oil, safflower oil, sunflower oil, sesame oil, soybean oil, tall oil, tung oil and walnut oil, including combinations and fatty acid esters, such as fatty acid alkyl esters, thereof. Exemplary vegetable oils include, for example, ethyl hexyl palmitate. Suitable hydrocarbon solvents include paraffinic oils, such as white mineral oils (CAS No. 8042-47-5), e.g., Magie N-40 oil; naphthenic oils and distillates, such as hydrotreated light naphthenic distillates (CAS No. 64742-53-6), e.g., Nytex 5130, and hydrotreated heavy naphthenic distillates (CAS No. 64742-52-5), e.g., Nytex 510 and Nytex 810); and aromatic oils. The hydrocarbon solvent optionally can be a process oil containing bitumen (CAS No. 64742-93-4), such as Nyprint 863.

The vegetable oil or hydrocarbon solvent preferably has a sulfur content at or below 1000 ppm. Generally, it is preferred that the vegetable oil or hydrocarbon solvent has a sulfur content at or below 750 ppm, and more preferably below 500 ppm. For example, the sulfur content is at or about 1 ppm, 10 ppm, 25 ppm, 50 ppm, 75 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm or 475 ppm, but less than 500 ppm sulfur. Exemplary continuous phase solvents that can be used to synthesize the shell polymers provided herein are hydrotreated light naphthenic distillates, e.g., Nytex 5130, and white mineral oils, e.g., Magie N-40 oil.

The total amount of continuous phase essentially non-aqueous solvent used in the synthesis of the shell polymers provided herein, as a percentage (%) by weight of the total reaction mixture (wt %), can be, e.g., between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, and 55 wt % to 60 wt %, based on the weight of the total reaction mixture. Generally, the total reaction mixture contains less than 60 wt % solvent. For example, the reaction mixtures provided herein can contain at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 40 wt %, 42 wt %, 45 wt %, 48 wt %, 50 wt %, 55 wt %, but less than 60 wt % total solvent based on the weight of the total reaction mixture.

Over a period of time, a mixture of acrylic monomers and a catalyst or a mixture of catalysts can be added to the reaction vessel containing the continuous phase essentially non-aqueous solvent. The period of time can be, for example, 1 to 5 hours, or 1, 2, 3, 4 or 5 hours, such as 4 hours or about 4 hours. The temperature of the first reaction vessel can be between 85° C. to 140° C., or 90° C. to 130° C., for example at or about 85° C., 90° C., 95° C., 100° C., 105° C., 110° C., 115° C., 120° C., 125° C., 130° C., 135° C. or 140° C., such as 120° C. or about 120° C. The mixture of monomers and mixture of catalysts can be added concurrently to the first reaction vessel from separate reaction vessels.

The mixture of monomers can be pre-mixed in a separate mixing vessel and can include monomers that are soluble in the continuous phase solvent. Such monomers can contain hydrocarbon chains. The hydrocarbon chains on the monomers can make the resulting polymer readily soluble in the continuous phase solvent. The monomers can contain one or more functional groups, such as carboxyl groups. Exemplary monomers that can contain carboxyl groups are acrylic acid and substituted acrylic acids (e.g., n-butyl acrylate), methacrylic acid and substituted methacrylic acids (e.g., isobutyl methacrylate, dodecyl methacrylate, methyl methacrylate and n-butyl methacrylate), itaconic acid and substituted itaconic acids, and maleic acid and substituted maleic acids. The monomers can contain hydroxyl groups. Exemplary monomers that can contain hydroxyl groups include 2-hydroxy ethyl acrylates, 2-hydroxy ethyl methacrylates, 2-hydroxy propyl acrylates and 2-hydroxy propyl methacrylates. The monomers can contain vinyl functional groups. Exemplary vinyl functional groups include glycidyl acrylates, glycidyl methacrylates and dimethyl amino methacrylates. Monomers that contain epoxy functional groups, such as glycidyl acrylates, can be added to the monomer mixture to increase the attraction between the acrylic shell and acrylic core polymers. The monomers can contain one or more than one functional group or a combination of functional groups such as carboxyl, hydroxyl and vinyl.

In the shell polymers provided herein, the monomer mixture can contain two or more monomers. For example, the mixture of monomers can be a mixture of substituted methacrylic acids. The methacrylic acids can be $C_1$-$C_{12}$ alkyl methacrylates. Exemplary $C_1$-$C_{12}$ alkyl methacrylates that can be used in the shell polymers provided herein are isobutyl methacrylate and dodecyl methacrylate. The ratio of isobutyl methacrylate to dodecyl methacrylate can be or can be about 10:1, 9:1, 8:1, 7:1, 6:1, 5:1, 4:1, 3:1, 2:1, 1.5:1, 1.3:1, 1.1:1 or 1:1 or less.

To aid in efficient polymer formation, a polymerization promoter can be added to the monomer mixture. The polymerization promoters are co-polymerizable with the acrylate monomers (and other co-monomers, if present) of the acrylic core/shell polymers. The promoters can promote polymerization or cross-linking, and/or introduce pendant groups, e.g., cross-linkable pendant carboxylic groups, cross-linkable pendant hydroxyl groups and/or cross-linkable pendant amide groups, into the copolymer backbone. Exemplary polymerization promoters include acrylic acid or $C_1$-$C_6$-substituted acrylic acid, e.g, methacrylic acid (to introduce cross-linkable pendant carboxylic groups into the copolymer backbone), hydroxyalkyl esters of acrylic acid or $C_1$-$C_6$-alkyl-substituted acrylic acid, such as 2-hydroxyethyl acrylate, 2-hydroxypropyl acrylate and 3-hydroxy-propyl methacrylate (to introduce cross-linkable pendant hydroxyl groups into the copolymer backbone), and an acrylic acid amide or $C_1$-$C_6$-alkyl-substituted acrylic acid amide, such as hydroxymethylene diacetone acrylamide (to introduce cross-linkable pendant amide groups into the copolymer backbone). A preferred polymerization promoter contains acrylic acid. An exemplary polymerization promoter is acrylic acid. The amount of polymerization promoter that can be used can be from 0.5 wt % to 5 wt % based on the weight of the reaction mixture. In an exemplary monomer mixture, 1 wt % or about 1 wt % acrylic acid based on the weight of the reaction mixture can be present.

In the acrylic shell polymers provided herein, the total weight of monomer or monomer mixture as a percentage (%) by weight of the reaction mixture (wt %) can be, for example, between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, and 55 wt % to 60 wt %, by weight of the reaction mixture, which contains an essentially non-aqueous solvent, acrylic monomer or mixture of acrylic monomers and other reactants. Generally, the reaction mixture generally contains less than 60 wt % acrylic monomer or acrylic monomer mixture. For example, the reaction mixtures provided herein can contain at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 35 wt %, 40 wt %, 42 wt %, 45 wt %, 48 wt %, 50 wt %, 55 wt %, or 60 wt % total monomer mixture based on the total weight of the reaction mixture.

The catalyst or mixture of catalysts can be pre-mixed in a separate vessel before adding to the reaction vessel containing the reaction mixture. The catalyst pre-mix can include one or more polymerization initiators. The polymerization initiators can be, for example, organic peroxide catalysts. Exemplary organic peroxide catalysts include dialkyl peroxides, di-tert-alkyl peroxides, diacyl peroxides, dialkyl peroxydicarbamates, tert-alkyl peroxyesters and di-tert-alkyl peroxyketals. Preferred polymerization initiators are the dialkyl peroxides, such as tert-butyl peroctoate and tert-butyl peroxybenzoate. The polymerization initiators can be free radical initiators. Exemplary free radical initiators include azo initiators. A preferred azo initiator is, for example, Vazo® 67 (DuPont, Wilmington, Del.). The catalyst mixture can contain two or more polymerization initiators. For example, the mixture of catalysts can be a mixture of organic peroxide catalysts. Exemplary organic peroxide catalysts that can be used in the shell polymers provided herein are tert-butyl peroctoate and tert-butyl peroxybenzoate. The ratio of tert-butyl peroctoate to tert-butyl peroxybenzoate can be or can be about 10:1, 9:1, 8:1, 7:1, 6:1, 5:1, 4:1, 3:1, 2:1, 1.5:1, 1.3:1, 1.1:1 or 1:1 or less.

The catalysts can be pre-mixed in a continuous phase solvent, for example the same continuous phase solvent present in the reaction vessel (e.g., Nytex 5130 or Magie N-40 oil).

After the mixture of monomers and mixture of catalysts are added to the reaction vessel, and after mixing at a temperature between 85° C. to 140° C., or 90° C. to 130° C., for example at or about 85° C., 90° C., 95° C., 100° C., 105° C., 110° C., 115° C., 120° C., 125° C., 130° C., 135° C. or 140° C., such as 120° C. or about 120° C. for a period of time between, for example, 1 to 5 hours, or 1, 2, 3, 4 or 5 hours, such as 4 hours or about 4 hours, the inert gas can be changed to air. A mixture of glycidyl methacrylate, triphenyl-phosphine and p-methoxyphenol can be added to the reaction mixture in the reaction vessel. For example, up to 1 wt % or about 1 wt %, or between 0.05 wt % to 0.5 wt %, such as 0.1 wt %, 0.2 wt %, 0.3 wt %, 0.4 wt %, 0.5 wt %, 0.6 wt %, 0.7 wt %, 0.8 wt %, 0.9 wt % or 1 wt % glycidyl methacrylate by weight of the reaction mixture. The amount of triphenyl-phosphine that can be added to the reaction mixture can be in the range of at or about 0.001 wt % to 0.1 wt %, or 0.005 wt % to 0.05 wt %, such as 0.001 wt %, 0.002 wt %, 0.003 wt %, 0.004 wt %, 0.005 wt %, 0.006 wt %, 0.007 wt %, 0.008 wt %, 0.009 wt %, 0.010 wt %, 0.011 wt %, 0.012 wt %, 0.013 wt %, 0.014 wt %, 0.015 wt %, 0.016 wt %, 0.017 wt %, 0.018 wt %, 0.019 wt %, 0.020 wt %, 0.021 wt %, 0.022 wt %, 0.023 wt %, 0.024 wt %, 0.025 wt %, 0.026 wt %, 0.027 wt %, 0.028 wt %, 0.029 wt %, 0.030 wt %, 0.040 wt %, 0.050 wt %, 0.060 wt %, 0.070 wt %, 0.080 wt %, 0.090 wt % or 0.1 wt % triphenyl-phosphine based on the weight of the reaction mixture. The amount of p-methoxyphenol that can be added to the reaction mixture can be in the range of at or about 0.0005 wt % to 0.01 wt %, or 0.001 wt % to 0.009 wt %, such as 0.001 wt %, 0.002 wt %, 0.003 wt %, 0.004 wt %, 0.005 wt %, 0.006 wt %, 0.007 wt %, 0.008 wt %, 0.009 wt % or 0.001 wt % p-methoxyphenol based on the weight of the reaction mixture. In an exemplary reaction, the reaction mixture contains 0.33 wt % glycidyl methacrylate, 0.02 wt % triphenyl phosphine and 0.003 wt % p-methoxyphenol based on the weight of the reaction mixture.

After addition of the glycidyl methacrylate, triphenylphosphine and p-methoxyphenol mixture, the reaction vessel can be held at the same temperature, for example at 85° C. to 140° C., or 90° C. to 130° C., for example at or about 85° C., 90° C., 95° C., 100° C., 105° C., 110° C., 115° C., 120° C., 125° C., 130° C., 135° C. or 140° C., such as 120° C. or about 120° C., for a period of time between, for example, 1 to 5 hours, or 1, 2, 3, 4 or 5 hours, such as 4 hours or about 4 hours. The air in the reaction vessel then be removed, such as by subjecting the reaction mixture vessel to vacuum for 30 minutes or about 30 minutes. The reaction vessel then can be cooled down to allow discharge of the resulting shell polymer. The reaction vessel can be cooled down to a temperature of 100° C. or about 100° C. or less.

The inert gas can be changed to air after the mixture of monomers and mixture of catalysts are added to the reaction vessel and mixed at 85° C. to 140° C., or 90° C. to 130° C., for example at or about 85° C., 90° C., 95° C., 100° C., 105° C., 110° C., 115° C., 120° C., 125° C., 130° C., 135° C. or 140° C., such as 120° C. or about 120° C., for a period of time between, for example, 1 to 5 hours, or 1, 2, 3, 4 or 5 hours, such as 4 hours or about 4 hours. Additional polymerization initiator, for example the same polymerization initiator used in the catalyst mixture (e.g., 1-butyl peroctoate), can be added to the reaction vessel. For example, additional polymerization initiator can be added in an amount of up to 1 wt % or about 1 wt %, such as 0.1 wt %, 0.2 wt %, 0.3 wt %, 0.4 wt %, 0.5 wt %, 0.6 wt %, 0.7 wt %, 0.8 wt %, 0.9 wt % or 1 wt % based on the weight of the reaction mixture. The reaction vessel then can be held at the same temperature, for example at 120° C. or about 120° C., for a time from 1-4 hours, such as 1, 1.5, 2, 2.5, 3. 3.5 or 4 hours, for example, 2 hours or about 2 hours.

The viscosity of the composition can be modified by slowly adding a rheology adjusting component, such as, for example, water, an alcohol, an alkali compound, an amine or a combination thereof, to the reaction vessel. Addition of the rheology adjusting component increases the viscosity of the resulting NAD such that addition of a relatively large amount of the NAD, such as 15 wt % to 60 wt % based on the weight of the ink, to an ink will not adversely affect the desired viscosity range of the ink.

The alcohol that can be used as or in the rheology adjusting component can be, for example, a $C_1$-$C_6$ alcohol, such as isopropanol (isopropyl alcohol), butanol, ethanol and methanol. Suitable alkali compounds that can used as or in the rheology adjusting component include metal hydroxides. Exemplary metal hydroxides include potassium hydroxide, sodium hydroxide and calcium hydroxide. Exemplary amines that can be used as or in the rheology adjusting component can be a primary amine (e.g., ethyl amine), secondary amine (e.g., diethylamine) or tertiary amine (e.g., triethylamine). For example, a rheology adjusting component can contain a mixture of water, an alcohol, an alkali compound and an amine. An exemplary rheology adjusting component contains water, potassium hydroxide, such as 85 wt % potassium hydroxide, isopropanol and diethylamine.

In the acrylic shell polymers provided herein, the total amount of rheology adjusting component as a percentage (%) by weight of the reaction mixture (wt %) can be, for example, between from or about from 0.01 wt % to 2 wt %, such as 0.01 wt % to 0.1 wt %, 0.01 wt % to 0.2 wt %, 0.01 wt % to 0.3 wt %, 0.01 wt % to 0.4 wt %, 0.01 wt % to 0.5 wt %, 0.01 wt % to 0.6 wt %, 0.01 wt % to 0.7 wt %, 0.01 wt % to 0.8 wt %, 0.01 wt % to 0.9 wt %, 0.01 wt % to 1.0 wt %, 0.01 wt % to 1.1 wt %, 0.01 wt % to 1.2 wt %, 0.01 wt % to 1.3 wt %, 0.01 wt % to 1.4 wt %, 0.01 wt % to 1.5 wt %, 0.01 wt % to 1.6 wt %, 0.01 wt % to 1.7 wt %, 0.01 wt % to 1.8 wt %, 0.01 wt % to 1.9 wt %, 0.1 wt % to 0.2 wt %, 0.1 wt % to 0.3 wt %, 0.1 wt % to 0.4 wt %, 0.1 wt % to 0.5 wt %, 0.1 wt % to 1.0 wt %, 0.1 wt % to 1.5 wt %, 0.1 wt % to 2.0 wt %, 0.5 wt % to 1.0 wt %, 0.5 wt % to 1.1 wt %, 0.5 wt % to 1.2 wt %, 0.5 wt % to 1.3 wt %, 0.5 wt % to 1.4 wt %, 0.5 wt % to 1.5 wt %, 0.5 wt % to 1.6 wt %, 0.5 wt % to 1.7 wt %, 0.5 wt % to 1.8 wt %, 0.5 wt % to 1.9 wt %, 0.5 wt % to 2.0 wt %, 1.0 wt % to 1.1 wt %, 1.0 wt % to 1.2 wt %, 1.0 wt % to 1.3 wt %, 1.0 wt % to 1.4 wt %, 1.0 wt % to 1.5 wt %, 1.0 wt % to 1.6 wt %, 1.0 wt % to 1.7 wt %, 1.0 wt % to 1.8 wt %, 1.0 wt % to 1.9 wt %, 1.0 wt % to 2.0 wt %, 1.2 wt % to 1.3 wt %, 1.2 wt % to 1.4 wt %, 1.2 wt % to 1.5 wt %, 1.2 wt % to 1.6 wt %, 1.2 wt % to 1.7 wt %, 1.2 wt % to 1.8 wt %, 1.2 wt % to 1.9 wt %, 1.2 wt % to 2.0 wt %, 1.5 wt % to 1.6 wt %, 1.5 wt % to 1.7 wt %, 1.5 wt % to 1.8 wt %, 1.5 wt % to 1.9 wt %, 1.5 wt % to 2.0 wt %, 1.7 wt % to 1.8 wt %, 1.7 wt % to 1.9 wt %, 1.7 wt % to 2.0 wt %, 1.8 wt % to 2.0 wt %, and 1.9 wt % to 2.0 wt %, based on the weight of the reaction mixture.

Generally, the reaction mixture contains less than 2.0 wt % water. For example, the reaction mixtures provided herein can contain water in an amount of up to 0.001 wt %, 0.01 wt %, 0.05 wt %, 0.1 wt %, 0.2 wt %, 0.25 wt %, 0.3 wt %, 0.4 wt %, 0.5 wt %, 0.6 wt %, 0.7 wt %, 0.75 wt %, 0.8 wt %, 0. wt %, 1.0 wt %, 1.1 wt %, 1.2 wt %, 1.25 wt %, 1.3 wt %, 1.4 wt %, 1.5 wt %, 1.6 wt %, 1.7 wt %, 1.75 wt %, 1.8 wt %, 1.9 wt % or 2.0 wt % based on the weight of the reaction mixture. Because the rheology adjusting component, which includes water, can be added to the reaction vessel at high temperatures, such as at 120° C. or about 120° C., a large part of the water from the rheology adjusting component can be distilled off, thus reducing the total amount of water present in the shell polymer and/or the NAD.

The constituents of the rheology adjusting component can be pre-mixed in a separate vessel and slowly added to the reaction vessel in order to control any foaming that can occur. After addition of the rheology adjusting component, the reaction vessel can be held at the same temperature, for example at 120° C. or about 120° C., for 1 hour or about 1 hour. The reaction vessel then can be cooled to allow discharge of the resulting acrylic shell polymer. The reaction vessel can be cooled down to a temperature of 90° C. or about 90° C. The reaction vessel can be cooled down to a temperature of less than or equal to 85° C. or less than or equal to about 85° C.

2. Acrylic Core Polymer

The acrylic core polymer of the acrylic core/shell polymer of the NAD described herein can be formed by heating in a reaction vessel a continuous phase essentially non-aqueous solvent and the acrylic shell polymer provided herein (and as described above) to 85° C.-140° C., such as at or about 85° C., 90° C., 95° C., 100° C., 105° C., 110° C., 115° C., 120° C., 125° C., 130° C., 135° C. or 140° C. The reaction vessel can be heated under an inert gas, such as nitrogen gas. The total amount of acrylic shell polymer added to the reaction mixture as a percentage (%) by weight of the reaction mixture (wt %) can be, for example, between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, and 55 wt % to 60 wt %, based on the weight of the reaction mixture. Generally, the reaction mixture contains less than 60 wt % acrylic shell polymer. For example, the reaction mixture can contain acrylic shell polymer in an amount that is at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 40 wt %, 42 wt %, 45 wt %, 48 wt %, 50 wt %, 55 wt %, but less than 60 wt % based on the weight of the reaction mixture.

The continuous phase essentially non-aqueous solvent can be an organic medium, such as a vegetable oil or a hydrocarbon solvent, for example a hydrocarbon oil. The vegetable oil or hydrocarbon solvent should have good solubility, preferably with an aniline point between from or between about from 45° C. to 90° C., or 50° C. to 80° C., such as at or about 45° C., 50° C., 55° C., 60° C., 65° C., 70° C., 75° C., 80° C., 85° C. or 90° C. Suitable vegetable oils include, for example, ethyl hexyl palmitate. Suitable hydrocarbon solvents include paraffinic oils, such as white mineral oils, e.g., mineral oils of CAS number 64742-47-8, such as Magic N-40 oil; naphthenic oils and distillates, such as hydrotreated light naphthenic distillates (e.g., process oils of CAS No. 64742-53-6, such as Nytex 5130) and hydrotreated heavy naphthenic distillates (e.g., process oils of CAS No. 64742-52-5, such as Nytex 510 and Nytex 810); and aromatic oils. The hydrocarbon solvent optionally can contain bitumen (CAS No. 64742-93-4), such as Nyprint 863.

The hydrocarbon solvent can have a sulfur content at or below 1000 ppm. Generally, the hydrocarbon solvent has a sulfur content at or below 500 ppm. Generally, the hydrocarbon solvent has a sulfur content at or below 500 ppm. For example, the sulfur content is at or about 1 ppm, 10 ppm, 25 ppm, 50 ppm, 75 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, or 475 ppm, but less than 500 ppm sulfur. Exemplary continuous phase solvents that can be used to synthesize the acrylic core polymers provided herein are hydrotreated light naphthenic distillate, particularly Nytex 5130, and white mineral oils, particularly Magie N-40 oil.

The total amount of continuous phase essentially non-aqueous solvent used in the synthesis of the acrylic core polymers provided herein, as a percentage (%) by weight of the total reaction mixture (wt %) can be, for example, between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, and 55 wt % to 60 wt %, based on the weight of the total reaction mixture.

Generally, the total reaction mixture generally contains less than 60 wt % solvent. For example, the reaction mixtures provided herein can contain solvent in an amount that is at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 30 wt %, 35 wt %, 40 wt %, 42 wt %, 45 wt %, 48 wt %, 50 wt %, 55 wt % or 60 wt % based on the weight of the reaction mixture.

Over a period of time a mixture of acrylic monomers and a mixture of catalysts can be added to the reaction vessel containing the continuous phase essentially non-aqueous solvent and acrylic shell polymer. The period of time can be between 1 and 5 hours, e.g., 1, 2, 3, 4 or 5 hours, for example, 3 hours or about 3 hours, or 4 hours or about 4 hours. The temperature of the reaction vessel can be 85° C.-140° C., such as at or about 85° C., 90° C., 95° C., 100° C., 105° C., 110° C., 115° C., 120° C., 125° C., 130° C., 135° C. or 140° C. The mixture of acrylic monomers and mixture of catalysts can be added concurrently to the reaction vessel from separate delivery vessels. The reaction vessel then can be held at 85° C.-140° C., such as at or about 85° C., 90° C., 95° C., 100° C., 105° C., 110° C., 115° C., 120° C., 125° C., 130° C., 135° C. or 140° C. The reaction vessel can be held for between 1 and 5 hours, e.g., 1, 2, 3, 4 or 5 hours, for example, 3 hours or about 3 hours, or 4 hours or about 4 hours.

The mixture of acrylic monomers can be pre-mixed in a separate mixing vessel and can include monomers that are soluble in the continuous phase essentially non-aqueous solvent. Such monomers can contain hydrocarbon chains. The hydrocarbon chains on the monomers can make the resulting polymer readily soluble in the continuous phase essentially non-aqueous solvent. The monomers can contain one or more functional groups, such as carboxyl groups. Exemplary monomers that contain carboxyl groups are acrylic acid and substituted acrylic acids (e.g., n-butyl acrylate), methacrylic acid and substituted methacrylic acids (e.g., isobutyl methacrylate, dodecyl methacrylate, methyl methacrylate and n-butyl methacrylate), itaconic acid and substituted itaconic acids, and maleic acid and substituted maleic acids. The monomers can contain hydroxyl groups. Exemplary monomers that can contain hydroxyl groups include 2-hydroxy ethyl acrylates, 2-hydroxy ethyl methacrylates, 2-hydroxy propyl acrylates and 2-hydroxy propyl methacrylates. The monomers can contain vinyl functional groups. Exemplary vinyl functional groups include glycidyl acrylates, glycidyl methacrylates and dimethyl amino methacrylates. Monomers that contain epoxy functional groups, such as glycidyl acrylates, can be added to the monomer mixture to increase the attraction between the acrylic shell and acrylic core polymers. The monomers can contain one or more than one functional group or a combination of functional groups such as carboxyl, hydroxyl and vinyl.

In the acrylic core polymers provided herein, the monomer mixture added to the reaction vessel can contain two or more monomers. For example, the mixture of monomers can be a mixture of substituted acrylic and methacrylic acids. The acrylic and methacrylic acids can be $C_1$-$C_{12}$ alkyl acrylates and methacrylates. Exemplary $C_1$-$C_{12}$ alkyl acrylic and methacrylic acids that can be used in the acrylic core polymers provided herein are n-butyl acrylate, methyl methacrylate and n-butyl methacrylate. The ratio of methyl methacrylate to n-butyl methacrylate can be or can be about 10:1, 9:1, 8:1, 7:1, 6:1, 5:1, 4:1, 3:1, 2:1, 1.5:1, 1.3:1, 1.1:1 or 1:1 or less. The ratio of methyl methacrylate to n-butyl acrylate can be or can be about 10:1, 9:1, 8:1, 7:1, 6:1, 5:1, 4:1, 3:1, 2:1, 1.5:1, 1.3:1, 1.1:1 or 1:1 or less. The ratio of n-butyl acrylate to n-butyl methacrylate can be or can be about 10:1, 9:1, 8:1, 7:1, 6:1, 5:1, 4:1, 3:1, 2:1, 1.7:1, 1.5:1, 1.4:1, 1.3:1, 1.2:1, 1.1:1 or 1:1 or less.

In the acrylic core polymers provided herein, the total amount of monomer mixture as a percentage (%) by weight of the reaction mixture (wt %) can be, for example, between from or about from 1 wt % to 60 wt %, such as 1 wt % to 10 wt %, 1 wt % to 15 wt %, 1 wt % to 25 wt %, 1 wt % to 30 wt %, 1 wt % to 40 wt %, 1 wt % to 50 wt %, 5 wt % to 10 wt %, 5 wt % to 15 wt %, 5 wt % to 25 wt %, 5 wt % to 30 wt %, 5 wt % to 40 wt %, 5 wt % to 50 wt %, 10 wt % to 20 wt %, 10 wt % to 30 wt %, 10 wt % to 40 wt %, 10 wt % to 50 wt %, 15 wt % to 25 wt %, 15 wt % to 30 wt %, 15 wt % to 35 wt %, 15 wt % to 40 wt %, 15 wt % to 45 wt %, 15 wt % to 50 wt %, 20 wt % to 30 wt %, 20 wt % to 40 wt %, 20 wt % to 50 wt %, 25 wt % to 30 wt %, 25 wt % to 35 wt %, 25 wt % to 40 wt %, 25 wt % to 45 wt %, 25 wt % to 50 wt %, 25 wt % to 60 wt %, 30 wt % to 40 wt %, 30 wt % to 50 wt %, 30 wt % to 60 wt %, 40 wt % to 50 wt %, 40 wt % to 55 wt %, 40 wt % to 60 wt %, 45 wt % to 50 wt %, 45 wt % to 55 wt %, 45 wt % to 60 wt %, 50 wt % to 60 wt %, 50 wt % to 55 wt %, and 55 wt % to 60 wt %, based on the weight of the reaction mixture. Generally, the reaction mixture contains less than 60 wt % monomer mixture. For example, the reaction mixtures provided herein can contain an amount of monomer mixture that is at least or about at least 1 wt %, 3 wt %, 5 wt %, 7 wt %, 10 wt %, 12 wt %, 15 wt %, 17 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 40 wt %, 42 wt %, 45 wt %, 48 wt %, 50 wt %, 55 wt % or 60 wt % based on the weight of the reaction mixture.

The mixture of catalysts can be pre-mixed in a separate mixing vessel before adding to the reaction vessel and can include polymerization initiators. The polymerization initiators can be, for example, organic peroxide catalysts. Exemplary organic peroxide catalysts include dialkyl peroxides, di-t-alkyl peroxides, diacyl peroxides, dialkyl peroxydicarbamates, t-alkyl peroxyesters and di-t-alkyl peroxyketals. Preferred polymerization initiators are the dialkyl peroxides, such as t-butyl peroctoate and t-butyl peroxybenzoate. The polymerization initiators can be free radical initiators. Exemplary free radical initiators include azo initiators. A preferred azo initiator is, for example, Vazo® 67 (DuPont, Wilmington, Del.). The catalyst mixture can contain one or more than one polymerization initiator. For example, the mixture of catalysts can be a mixture of organic peroxide catalysts. Exemplary organic peroxide catalysts that can be used in the synthesis of acrylic core polymers provided herein are t-butyl peroctoate and t-butyl peroxybenzoate. The ratio of t-butyl peroctoate to t-butyl peroxybenzoate can be or can be about 10:1, 9:1, 8:1, 7:1, 6:1, 5:1, 4:1, 3:1, 2:1, 1.5:1, 1.3:1, 1.1:1 or 1:1 or less. The organic peroxide catalysts can be used alone or in combination. An exemplary organic peroxide catalyst that can be used alone is t-butyl peroctoate.

The mixture of catalysts can be pre-mixed in a continuous phase essentially non-aqueous solvent, for example, the same continuous phase essentially non-aqueous solvent present in the reaction vessel used in the synthesis of the acrylic core polymer, which is discussed above. Generally, the hydrocarbon solvent has a sulfur content at or below 500 ppm. Exemplary continuous phase solvents that can be used to synthesize the acrylic core polymers provided herein include hydrotreated light naphthenic distillate, particularly Nytex 5130, and white mineral oils, particularly Magie N-40 oil.

After the mixture of acrylic monomers and mixture of catalysts are added to the reaction vessel, and after mixing at 85° C.-140° C., such as at 85° C., 90° C., 95° C., 100° C., 105° C., 110° C., 115° C., 120° C., 125° C., 130° C., 135° C. or 140° C. for a period of time between 1 to 5 hours, e.g. 1, 2, 3, 4, or 5 hours, such as for at or about 2 hours or at or about 3 hours, additional monomer can be added to the reaction vessel. The additional monomer can be one of the monomers present in the acrylic monomer mixture. For example, the additional monomer can be methyl methacrylate. Any desired amount of additional monomer can be added. For example, an additional amount of monomer that is up to 5 wt % or about 5 wt %, such as 0.1 wt %, 0.5 wt %, 0.7 wt %, 1 wt %, 1.5 wt %, 2 wt %, 2.5 wt %, 3 wt %, 3.5 v, 4%, 4.5 wt % or 5 wt % based on the weight of reaction mixture can be added. The additional monomer can be added to the reaction vessel at the same temperature, for example between 85° C.-140° C., such as at 85° C. or at about 85° C.

In some instances, after the mixture of monomers and mixture of catalysts are added to the reaction vessel, the inert gas can be changed to air and the reaction vessel can be held at 120° C. or about 120° C. for 1 hour or about 1 hour.

A second or supplemental mixture of catalysts then can be added to the reaction vessel. The second mixture of catalysts can be pre-mixed in a separate mixing vessel and can include additional polymerization initiators. For example, the additional polymerization initiators can be the same polymerization initiators used in the first catalyst mixture. The additional polymerization initiators can be a single type of catalyst, such as t-butyl peroctoate. The additional polymerization initiators can be a mixture of catalysts, such as t-butyl peroctoate and t-butyl peroxybenzoate. The catalyst can be mixed with a continuous phase essentially non-aqueous solvent, e.g., the same continuous phase solvent present in the first mixture of catalysts (e.g., Nytex 5130 or Magie N-40 oil). For example, a second mixture of catalysts can be added in an amount of up to 5 wt % or about 5 wt %, such as 0.1 wt %, 0.25 wt %, 0.5 wt %, 0.75 wt %, 1 wt %, 1.5 wt %, 2 wt %, 2.5 wt %, 3 wt %, 3.5 wt %, 4 wt %, 4.5 wt % or 5 wt % based on the weight of the reaction mixture.

If added, the supplemental mixture of catalysts can be added slowly, for example the mixture can be added dropwise to the reaction vessel. The reaction vessel then can be held for a period of time at the same temperature, for example at 85-140° C., such as at or about 85° C., 90° C., 95° C., 100° C., 105° C., 110° C., 115° C., 120° C., 125° C., 130° C., 135° C. or 140° C. The period of time that the first reaction vessel can be held can vary from between 1 and 4 hours, such as 1, 2, 3 or 4 hours. For example, the reaction can be allowed to proceed for 3 hours or for about 3 hours.

After the supplemental mixture of catalysts is added and held in the first reaction vessel for the period of time, such as 3 hours, the viscosity of the composition in the reaction vessel can be adjusted. For example, the viscosity can be increased by slowly adding a rheology adjusting component, such as, for example, water, an alcohol, an alkali compound, an amine or a combination thereof, to the reaction vessel. Addition of the rheology adjusting component increases the viscosity of the resulting NAD such that addition of a relatively large amount of the NAD, such as 15 wt % to 60 wt % based on the weight of the ink, to an ink will not adversely affect the desired viscosity range of the ink.

The alcohol that can be used as or in the rheology adjusting component can be, for example, a $C_1$-$C_6$ alcohol, such as isopropanol (isopropyl alcohol), butanol, ethanol and methanol. Suitable alkali compounds that can used as or in the rheology adjusting component include metal hydroxides. Exemplary metal hydroxides include potassium hydroxide, sodium hydroxide and calcium hydroxide. Exemplary amines that can be used as or in the rheology adjusting component can be a primary amine (e.g., ethyl amine), secondary amine (e.g., diethylamine) or tertiary amine (e.g., triethylamine). For example, a rheology adjusting component can contain a mixture of water, an alcohol, an alkali compound and an amine. An exemplary rheology adjusting component contains water, potassium hydroxide, such as 85 wt % potassium hydroxide, isopropanol and diethylamine.

The rheology adjusting component generally contains water. Because the rheology adjusting component is added at a relatively high temperature, however, a large part of the water of the rheology adjusting component can be distilled off and removed, resulting in an essentially non-aqueous product. The resulting NAD product usually contains 2.0 wt % or less water, generally 1.0 wt % or less water, but also can contain 0.5 wt % or less water, based on the weight of the NAD composition. The resulting NAD product can contain an amount of water that is between 0.001 wt % to 1 wt %, 0.005 wt % to 0.5 wt %, or 0.025 wt % to 0.25 wt %, or 0.01 wt % to 0.1 wt % based on the weight of the composition. The resulting product also can be anhydrous.

A preferred mixture of constituents in the rheology adjusting component that can be used in the acrylic shell polymers and NAD provided herein include water, potassium hydroxide, such as 85 wt % potassium hydroxide, isopropanol and diethylamine.

In the synthesis of the acrylic core polymers provided herein, the total amount of rheology adjusting component as a percentage (%) by weight of the reaction mixture (wt %) can be, for example, between from or about from 0.001 wt % to 2 wt %, such as 0.01 wt % to 0.1 wt %, 0.01 wt % to 0.2 wt %, 0.01 wt % to 0.3 wt %, 0.01 wt % to 0.4 wt %, 0.01 wt % to 0.5 wt %, 0.01 wt % to 0.6 wt %, 0.01 wt % to 0.7 wt %, 0.01 wt % to 0.8 wt %, 0.01 wt % to 0.9 wt %, 0.01 wt % to 1.0 wt %, 0.01 wt % to 1.1 wt %, 0.01 wt % to 1.2 wt %, 0.01 wt % to 1.3 wt %, 0.01 wt % to 1.4 wt %, 0.01 wt % to 1.5 wt %, 0.01 wt % to 1.6 wt %, 0.01 wt % to 1.7 wt %, 0.01 wt % to 1.8 wt %, 0.01 wt % to 1.9 wt %, 0.1 wt % to 0.2 wt %, 0.1 wt % to 0.3 wt %, 0.1 wt % to 0.4 wt %, 0.1 wt % to 0.5 wt %, 0.1 wt % to 1.0 wt %, 0.1 wt % to 1.5 wt %, 0.1 wt % to 2.0 wt %, 0.5 wt % to 1.0 wt %, 0.5 wt % to 1.1 wt %, 0.5 wt % to 1.2 wt %, 0.5 wt % to 1.3 wt %, 0.5 wt % to 1.4 wt %, 0.5 wt % to 1.5 wt %, 0.5 wt % to 1.6 wt %, 0.5 wt % to 1.7 wt %, 0.5 wt % to 1.8 wt %, 0.5 wt % to 1.9 wt %, 0.5 wt % to 2.0 wt %, 1.0 wt % to 1.1 wt %, 1.0 wt % to 1.2 wt %, 1.0 wt % to 1.3 wt %, 1.0 wt % to 1.4 wt %, 1.0 wt % to 1.5 wt %, 1.0 wt % to 1.6 wt %, 1.0 wt % to 1.7 wt %, 1.0 wt % to 1.8 wt %, 1.0 wt % to 1.9 wt %, 1.0 wt % to 2.0 wt %, 1.2 wt % to 1.3 wt %, 1.2 wt % to 1.4 wt %, 1.2 wt % to 1.5 wt %, 1.2 wt % to 1.6 wt %, 1.2 wt % to 1.7 wt %, 1.2 wt % to 1.8 wt %, 1.2 wt % to 1.9 wt %, 1.2 wt % to 2.0 wt %, 1.5 wt % to 1.6 wt %, 1.5 wt % to 1.7 wt %, 1.5 wt % to 1.8 wt %, 1.5 wt % to 1.9 wt %, 1.5 wt % to 2.0 wt %, 1.7 wt % to 1.8 wt %, 1.7 wt % to 1.9 wt %, 1.7 wt % to 2.0 wt %, 1.8 wt % to 2.0 wt %, and 1.9 wt % to 2.0 wt %, by weight of the reaction mixture. Generally, the reaction mixture contains less than 2.0 wt % rheology adjusting component. For example, the reaction mixtures provided herein contain a rheology adjusting component in an amount that is at or about 0.01 wt %, 0.05 wt %, 0.1 wt %, 0.2 wt %, 0.25 wt %, 0.3 wt %, 0.4 wt %, 0.5 wt %, 0.6 wt %, 0.7 wt %, 0.75 wt %, 0.8 wt %, 0.9 wt %, 1.0 wt %, 1.1 wt %, 1.2 wt %, 1.25 wt %, 1.3 wt %, 1.4 wt %, 1.5 wt %, 1.6 wt %, 1.7 wt %, 1.75 wt %, 1.8 wt %, 1.9 wt % or 2.0 wt % based on the weight of the reaction mixture. Because the rheology adjusting component, which generally contains water, can be added to the reaction vessel at high temperatures, e.g., 100° C. to 140° C., such as at or above 120° C. or at or above about 120° C., water from the rheology adjusting component can distill off during the reaction, thus reducing the total residual amount of water present in the acrylic core polymer and/or reaction mixture.

The rheology adjusting component can be pre-mixed in a separate mixing vessel and slowly added to the reaction vessel to control any foaming that can occur. After addition of the rheology adjusting component, the reaction vessel can be held at the same temperature, e.g., 100° C. to 140° C., for example at 120° C. or about 120° C., for 1 to 4 hours, e.g., 1, 1.5, 2, 2.5, 3, 3.5 or 4 hours, such as 1 hour or about 1 hour.

The addition of the rheology adjusting component results in a NAD having increased viscosity when compared to an NAD prepared without the addition of a rheology adjusting component. NADs prepared without addition of the rheology adjusting component described herein have a fairly low viscosity. For example, without addition of the rheology adjusting component described herein, the viscosity of the resulting NAD can be less than 10 Pa·s at a shear rate of 50 sec$^{-1}$ (as measured on a TA Instruments AR 1000 rotational viscometer). Addition of the rheology adjusting component as described herein results in a NAD having a viscosity of at or about 10 Pa·s to at or about 150 Pa·s at a shear rate of 50 sec$^{-1}$. The viscosity of the NAD can be greater than 10 Pa·s, 15 Pa·s, 20 Pa·s, 25 Pa·s, 30 Pa·s, 35 Pa·s, 40 Pa·s, 45 Pa·s, 50 Pa·s, 55 Pa·s, 60 Pa·s, 65 Pa·s, 70 Pa·s, 75 Pa·s, 80 Pa·s, 85 Pa·s, 90 Pa·s, 95 Pa·s, 100 Pa·s, 110 Pa·s, 120 Pa·s, 130 Pa·s, 140 Pa·s or 150 Pa·s at a shear rate of 50 sec$^{-1}$. The viscosity of the NAD can be in a range of 10 Pa·s to 40 Pa·s, or 20 Pa·s to 50 Pa·s, or 30 Pa·s to 60 Pa·s, 40 Pa·s to 80 Pa·s, or 50 Pa·s to 90 Pa·s, or 60 Pa·s to 100 Pa·s, or 70 Pa·s to 120 Pa·s, or 80 Pa·s to 130 Pa·s, or 100 Pa·s to 150 Pa·s at a shear rate of 50 sec$^{-1}$.

The reaction mixture can be monitored for the presence of residual acrylic monomers or other co-monomers. The reaction mixture can be monitored by any method known to those of skill in the art. The reaction mixture can be monitored by, for example, chromatography. An exemplary method of chromatography that can be used is gas chromatography. The reaction is allowed to proceed until a desired level of residual monomers is reached. The level can be less than 5 wt %, or less than 1 wt %, or less than 0.5 wt %, or less than 0.1 wt % of the initial value of monomer present.

After a desired level of residual monomers is reached, the reaction vessel can be cooled down to allow discharge of the resulting acrylic core/shell polymer. For example, the reaction vessel can be cooled down to a temperature of between 30° C. to 90° C. The reaction vessel can be cooled down to at or about room temperature. For example, the reaction can be cooled down to 20° C. to 25° C.

The particle size of the acrylic core/shell polymer particles can impact the final printing ink properties when the NAD is added to the lithographic printing ink. Acrylic core/shell polymer particles that are too large could lead to a low gloss level of the lithographic printed ink whereas acrylic core/shell polymer particles that are too small could have a negative impact on the immediate rub resistance and fast conversion properties of the lithographic printed ink.

Reaction conditions and reactants can influence primary particle size of the acrylic core/shell polymer particles. For example, reaction temperature during core/shell polymer formation has a measurable effect on core/shell polymer particle size. It has been observed that there is a correlation with increasing reaction temperature and decreasing the resulting core/shell polymer particle size. As the reaction temperature increases, the resulting acrylic core/shell polymer particle size decreases. It has be determined that reaction temperatures between 85° C. to 140° C., such as at or about 85° C., 90° C., 95° C., 100° C., 105° C., 110° C., 115° C., 120° C., 125° C., 130° C., 135° C. or 140° C., for a period of time of between 1 and 5 hours, such as 1, 1.5, 2, 2.5, 3, 3.5, 4, 4.5 or 5 hours, such as 3 or 4 hours, generally results in an acrylic core/shell polymer where typically 90% of the particles of the acrylic core/shell polymer are less than 3 microns. Particularly, at reaction temperatures of at or about 120° C. or higher, about 50% or more of the particles of the acrylic core/shell polymer are less than 1.5 microns.

A direct correlation exists between the amount of alkyl methacrylate monomer present in the acrylic core polymer and/or the acrylic shell polymer and particle size. As the amount of alkyl methacrylate monomer, particularly methyl methacrylate, in the acrylic core polymer and/or the acrylic shell polymer increases, the average particle size of the core/shell polymer particle increases, and thus higher methyl methacrylate levels favors larger particles.

The particle size and particle size distribution can be analyzed using any method known in the art. For example, a volume average particle size can be measured by using a Coulter Counter™ particle size analyzer (manufactured by Beckman Coulter Inc.). The median particle size also can be measured using conventional laser diffraction techniques. An exemplary laser diffraction technique uses a Mastersizer 2000 particle size analyzer (Malvern Instruments LTD., Malvern, Worcestershire, United Kingdom), particularly a Hydro S small volume general-purpose automated sample dispersion unit. All functions of the particle counting can be controlled by the system software in either fully automatic operation via standard operating procedure directions or by manual operation via on-screen operating dialogues. In an exemplary method, the NAD sample to be evaluated is diluted with cyclohexane to disperse the particles and a refractive index of 1.55 is used. The sample is stirred at up to 3500 rpm after dilution of the sample to achieve an appropriate laser obscuration, particle size is measured using laser diffraction, generating a particle size distribution curve as well as data with respect to the volume median diameter, $D(v,0.5)$, which is the diameter where 50% of the distribution is above and 50% is below, the $D(v,0.9)$ value, where 90% of the volume distribution is below this value, and $D(v,0.1)$, where 10% of the volume distribution is below this value. The span of the particle size also can be determined, based on the width of the distribution based on the 10%, 50% and 90% quantile.

The mean particle size also can be measured using a Zetasizer Nano ZS device (Malvern Instruments LTD., Malvern, Worcestershire, United Kingdom) utilizing the Dynamic Light Scattering (DLS) method. The DLS method essentially consists of observing the scattering of laser light from particles, determining the diffusion speed and deriving the size from this scattering of laser light, using the Stokes-Einstein relationship.

An analysis of the particle size of the acrylic core/shell polymer particles in the NAD shows that typically 90% of the particles of the acrylic core/shell polymer in the NAD are less than 3 microns. Particularly, 50% of the particles of the acrylic core/shell polymer in the NAD are less than 1.5 microns or less than 1 micron. In some instances, greater than 50% of the particles of the acrylic core/shell polymer in the NAD are less than 1 micron. The average particle size of the acrylic core/shell polymer particles in the NAD can be in the range of at or about 300 nm to at or about 1300 nm. In particular, the average particle size of the acrylic core/shell polymer particles in the NAD can be in the range of at or about 300 nm to at or about 600 nm, or at or about 400 nm to at or about 800 nm, or at or about 500 nm to at or about 900 nm, or at or about 600 nm to at or about 1200 nm.

The amounts of acrylic core polymer and acrylic shell polymer in the acrylic core/shell polymer were determined. Any method known in the art can be used to determine the amounts of acrylic core polymer and acrylic shell polymer can be used. Spectrographic methods commonly are used in the art. For example, Wang et al. (eXPRESS Polymer Letters 4(11): 670-680 (2010)) describes methods of characterizing core/shell polymers using Fourier transform infrared (IR) measurements. Fei et al. (Chalcogenide Letters 8(8): 499-504 (2011)) describes spectral characterization of core/shell polymers using IR spectroscopic analysis. Auguiar et al. (Macromolecules 32(20): 6767-6771 (1999)) describes characterization of core/shell polymers using transmission electron microscopy, dynamic mechanical thermal analysis light scattering, IR spectroscopy and differential scanning calorimetry. For IR spectrographic analysis, a Thermo Nicolet Magna 550 with a Golden Gate diamond crystal micro attenuated total reflection (ATR) device or an immersion transflectance probe can be used. For near IR spectroscopy (NIR), a Foss XDS NIR spectrometer can be used to analyze the polymer particles to determine the amount of acrylic core polymer and acrylic shell polymer present. Analysis also can include software for automation or reaction monitoring, such as the FOSS XDS Interactance OptiProbe® Analyzer. Software known in the art can be used to assess the spectroscopic data. Exemplary software includes TQ Analyst (Thermo Fisher Scientific, Waltham, Mass.), Unscrambler® X (CAMO Software AS, Woodbridge, N.J.) and irAnalyze software (LabCognition, Ft. Myers, Fla.).

The acrylic core/shell polymer particles in the NAD can contain from at or about 15 wt % to at or about 75 wt % or from at or about 20 wt % to at or about 60 wt % acrylic core polymer based on the weight of the acrylic core/shell polymer particle. The acrylic core/shell polymer particles in the NAD can contain 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt % or 75 wt % acrylic core polymer, based on the weight of the acrylic core/shell polymer.

The acrylic core/shell polymer particles in the NAD can contain from at or about 15 wt % to at or about 75 wt % or from at or about 20 wt % to at or about 60 wt % acrylic shell polymer based on the weight of the acrylic core/shell polymer particle. The acrylic core/shell polymer particles in the NAD can contain 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt % or 75 wt % acrylic shell polymer, based on the weight of the acrylic core/shell polymer.

The acrylic core/shell polymer particles can have an average core-to-shell ratio of from at or about 0.60 to at or about 2.0. For example, an acrylic core/shell polymer particle containing 62.2% acrylic core polymer and 37.8% acrylic shell polymer has a core/shell ratio of about 1.65. An acrylic core/shell polymer particle containing 40% acrylic core polymer and 60% acrylic shell polymer has a core/shell ratio of about 0.67. The acrylic core/shell polymer particles can have an average core-to-shell ratio of from at or about 0.60 to at or about 1.65 at or about 0.97 to at or about 1.24 or from at or about 1.00 to at or about 1.70 or from at or about 1.50 to at or about 1.90. Preferred core/shell ratios include ratios between 1.20 and 1.80, or between 1.30 and 1.70, or between 1.40 and 1.65 or between 1.55 and 1.75. The acrylic core/shell polymer particles of the NAD can have an average core-to-shell ratio of 1.0, 1.025, 1.05, 1.075, 1.1, 1.125, 1.15, 1.175, 1.2, 1.225 1.25, 1.275, 1.3, 1.325, 1.35, 1.375, 1.4, 1.425, 1.45, 1.475 1.5, 1.525, 1.55, 1.575, 1.6, 1.625, 1.65, 1.675 or 1.7.

The NAD composition can contain an essentially non-aqueous organic solvent containing from at or about 15 wt % to at or about 35 wt % acrylic core polymer based on the weight of the NAD and from at or about 15 wt % to at or about 35 wt % acrylic shell polymer based on the weight of the NAD. The acrylic core polymer and the acrylic shell polymer can make up the acrylic core/shell polymer particles dispersed in the NAD. The NAD can contain from at or about 30 wt % to at or about 70 wt % acrylic core/shell polymer particles based on the weight of the NAD. The NAD can contain from at or about 30 wt % to at or about 70 wt % essentially non-aqueous organic solvent based on the weight of the NAD.

The NAD composition can contain a rheology adjusting component. An exemplary rheology adjusting component generally contains water, an alcohol, an alkali compound, an amine or a mixture thereof. A preferred rheology adjusting component contains a mixture of water, potassium hydroxide, isopropanol and diethylamine. The ratio of alkali compound to amine can be between 0.66 to 1.5 or between 0.75 to 1.25. The ratio of water to amine can be between 2 to 16 or between 3 to 9. The ratio of water to alcohol can between 3 to 15 or between 4 to 12.5.

The amount of rheology adjusting component can be present in the NAD composition in an amount from or about from 0.001 wt % to 5 wt % based on the weight of the NAD composition. The NAD composition can contain 0.001 wt %, 0.005 wt %, 0.01 wt %, 0.025 wt %, 0.05 wt %, 0.075 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 3.0 wt %, 4.1 wt %, 4.2 wt %, 4.3 wt %, 4.4 wt %, 4.5 wt %, 4.6 wt %, 4.7 wt %, 4.8 wt %, 4.9 wt % or 5.0 wt % rheology adjusting component based on the weight of the NAD composition.

Pre-Formed Polymers

The NAD can be prepared by selecting a pre-formed acrylic shell polymer that is soluble in the continuous phase essentially non-aqueous solvent and compatible with the acrylic core polymer to be synthesized, and then generating an acrylic core polymer from monomers selected to form an acrylic core polymer that is insoluble in the essentially non-aqueous solvent, but soluble in the shell polymer. By reacting the pre-formed acrylic shell polymer with the acrylic core polymer in the essentially non-aqueous solvent at elevated temperature, such as between 85° C. to 140° C., the acrylic core polymer preferentially interacts with the acrylic shell polymer to form core/shell polymers, particularly core/shell polymer particles, generating a dispersion of core/shell polymer in the continuous phase essentially non-aqueous solvent.

In selecting a pre-formed acrylic shell polymer, polymers that include one or more monomer or comonomer units that contain hydrocarbon chains and one or more monomer or comonomer units that contain one or more functional groups, such as carboxyl groups, hydroxyl groups or vinyl groups are preferred. Exemplary monomer units containing carboxyl groups that can be present in the pre-formed acrylic shell polymer are acrylic acid and substituted acrylic acids (e.g., n-butyl acrylate), methacrylic acid and substituted methacrylic acids (e.g., isobutyl methacrylate, dodecyl methacrylate, methyl methacrylate and n-butyl methacrylate), itaconic acid and substituted itaconic acids, and maleic acid and substituted maleic acids. The monomer units can contain hydroxyl groups. Exemplary monomer units containing hydroxyl groups that can be present in the pre-formed acrylic shell polymer include 2-hydroxy ethyl acrylates, 2-hydroxy ethyl methacrylates, 2-hydroxy propyl acrylates and 2-hydroxy propyl methacrylates. Preferably, the pre-formed acrylic shell polymer is selected to include one or more $C_1$-$C_{12}$ alkyl methacrylates as monomer units. Exemplary $C_1$-$C_{12}$ alkyl methacrylates that can be present in the shell polymers are isobutyl methacrylate and dodecyl methacrylate.

The selected pre-formed acrylic shell polymer can be added to a continuous phase essentially non-aqueous solvent in a reaction vessel, heated to 85° C.-140° C., such as at or about 85° C., 90° C., 95° C., 100° C., 105° C., 110° C., 115° C., 120° C., 125° C., 130° C., 135° C. or 140° C., and the acrylic core polymer can be synthesized in situ over a period of time by addition to the reaction vessel a mixture of acrylic monomers and a mixture of catalysts as described above, where the synthesized acrylic core polymer, being insoluble in the continuous phase essentially non-aqueous solvent, migrates from the continuous phase into the acrylic shell polymer, "filling it in" and generating a dispersion of core/shell polymer particles.

The viscosity of the composition can be modified by slowly adding to the reaction mixture a rheology adjusting component, such as, for example, water, an alcohol, an alkali compound, an amine or a combination thereof. Addition of the rheology adjusting component increases the viscosity of the resulting NAD such that addition of a relatively large amount of the NAD, such as 15 wt % to 60 wt % based on the weight of the ink, to an ink will not adversely affect the desired viscosity range of the ink.

The alcohol that can be used as or in the rheology adjusting component can be, for example, a $C_1$-$C_6$ alcohol, such as isopropanol (isopropyl alcohol), butanol, ethanol and methanol. Suitable alkali compounds that can used as or in the rheology adjusting component include metal hydroxides. Exemplary metal hydroxides include potassium hydroxide, sodium hydroxide and calcium hydroxide. Exemplary amines that can be used as or in the rheology adjusting component can be a primary amine (e.g., ethyl amine), secondary amine (e.g., diethylamine) or tertiary amine (e.g., triethylamine). For example, a rheology adjusting component can contain a mixture of water, an alcohol, an alkali compound and an amine. An exemplary rheology adjusting component contains water, potassium hydroxide, such as 85 wt % potassium hydroxide, isopropanol and diethylamine.

The NAD also can be prepared by selecting a pre-formed acrylic shell polymer that is soluble in the continuous phase essentially non-aqueous solvent and selecting a pre-formed acrylic core polymer that is insoluble in the essentially non-aqueous solvent, but soluble in the shell polymer. By reacting the pre-formed acrylic shell polymer with the pre-formed acrylic core polymer in the essentially non-aqueous solvent at elevated temperature, such as between 85° C.-140° C., the acrylic core polymer preferentially interacts with the acrylic shell polymer, migrating from the continuous phase essentially non-aqueous solvent into the acrylic shell polymer to form core/shell polymers, particularly core/shell polymer particles, generating a dispersion of core/shell polymer in the continuous phase essentially non-aqueous solvent.

In selecting a pre-formed acrylic shell polymer for this preparation method, acrylic polymers that include one or more monomer or comonomer units that contain hydrocarbon chains and one or more monomer or comonomer units that contain one or more functional groups, such as carboxyl groups, hydroxyl groups or vinyl groups are preferred. Exemplary monomer units containing carboxyl groups that can be present in the pre-formed acrylic shell polymer are acrylic acid and substituted acrylic acids (e.g., n-butyl acrylate), methacrylic acid and substituted methacrylic acids (e.g., isobutyl methacrylate, dodecyl methacrylate, methyl methacrylate and n-butyl methacrylate), itaconic acid and substituted itaconic acids, and maleic acid and substituted maleic acids. The monomer units can contain hydroxyl groups. Exemplary monomer units containing hydroxyl groups that can be present in the pre-formed acrylic shell polymer include 2-hydroxy ethyl acrylates, 2-hydroxy ethyl methacrylates, 2-hydroxy propyl acrylates and 2-hydroxy propyl methacrylates. Preferably, the pre-formed acrylic shell polymer is selected to include one or more $C_1$-$C_{12}$ alkyl methacrylates as monomer units. Exemplary $C_1$-$C_{12}$ alkyl methacrylates that can be present in the shell polymers are isobutyl methacrylate and dodecyl methacrylate.

In selecting a pre-formed acrylic core polymer for this preparation method, acrylic polymers that include one or more monomer or comonomer units that contain hydrocarbon chains, such as $C_1$-$C_6$ alkyl methacrylate and/or $C_1$-$C_6$ alkyl acrylate are preferred. The pre-formed acrylic core polymer is selected so that it is insoluble in the continuous phase of the essentially non-aqueous solvent but is soluble in the acrylic shell polymer selected above, which is soluble in the continuous phase of the essentially non-aqueous solvent and forms particles of acrylic core/shell polymer in the continuous phase of the essentially non-aqueous solvent. Exemplary monomer units containing $C_1$-$C_6$ alkyl methacrylate include methyl methacrylate, ethyl methacrylate, n-propyl methacrylate and n-butyl methacrylate. Exemplary monomer units containing $C_1$-$C_6$ alkyl acrylate include methyl acrylate, ethyl acrylate, n-propyl acrylate and n-butyl acrylate.

The selected pre-formed acrylic shell polymer can be added to a continuous phase essentially non-aqueous solvent in a reaction vessel, heated to 85° C.-140° C., such as at or about 85° C., 90° C., 95° C., 100° C., 105° C., 110° C., 115° C., 120° C., 125° C., 130° C., 135° C. or 140° C., and the selected pre-formed acrylic core polymer can be added to the reaction mixture while maintaining or returning the temperature of the reaction mixture to between 85° C.-140° C. Because the selected pre-fouled acrylic core polymer is insoluble in the continuous phase essentially non-aqueous solvent but soluble in the acrylic shell polymer, the acrylic core polymer migrates from the continuous phase into the acrylic shell polymer, "filling it in" and generating a dispersion of core/shell polymer particles.

The viscosity of the NAD composition can be increased by adding a rheology adjusting component, such as, e.g., water, an alcohol, an alkali compound, an amine or a combination thereof. The alcohol that can be used as or in the rheology adjusting component can be, for example, a $C_1$-$C_6$ alcohol, such as isopropanol (isopropyl alcohol), butanol, ethanol and methanol. Suitable alkali compounds that can used as or in the rheology adjusting component include metal hydroxides. Exemplary metal hydroxides include potassium hydroxide, sodium hydroxide and calcium hydroxide. Exemplary amines that can be used as or in the rheology adjusting component can be a primary amine (e.g., ethyl amine), secondary amine (e.g., diethylamine) or tertiary amine (e.g., triethylamine). For example, a rheology adjusting component can contain a mixture of water, an alcohol, an alkali compound and an amine. An exemplary rheology adjusting component contains water, potassium hydroxide, isopropanol and diethylamine.

It should be noted that the aforementioned NAD and its synthesis and preparation represents a preferred embodiment in the present printing ink formulations, but it is understood that other, other methods of preparing a NAD, and traditionally prepared NADs, could be used alone or in combination with the aforementioned NAD to produce printing ink compositions having good printing, setting and drying properties.

E. LITHOGRAPHIC PRINTING INKS

The NADs can be incorporated into lithographic printing inks. The lithographic printing inks containing one or more NADs of the present invention will usually include at least one pigment, the nature of which is not critical to the present invention, and which can be chosen from any of those pigments well known to those skilled in the art. In general terms, a lithographic printing ink should have a low surface tension, be water-repellent and be capable of emulsifying with a fount solution. The formulation of printing inks for offset lithographic printing is very well known, and is described in considerable detail, in the art. For example, see *The Printing Ink Manual* ($5^{th}$ ed., Leach et al. eds. (2009), pages 342-452), and U.S. Pat. Nos. 5,382,282; 5,725,646 and 6,489,375.

1. Sheetfed Printing Inks

One class of lithographic printing inks that can be formulated to include NADs are sheetfed printing inks. The NADs can be incorporated into conventional sheetfed printing inks and into waterless printing sheetfed printing inks. When printing substrates using a sheetfed lithography process, it is desirable to be able to further process the freshly printed sheet as quickly as possible, while at the same time still allowing the sheetfed printing inks to settle in and on the substrate in order for the desired print gloss and print resolution to be achieved.

Lithographic printing inks formulated for sheetfed printing applications, in both conventional and waterless printing sheetfed printing inks, generally include one or more components that react with air to dry. Conventional off-set sheetfed printing inks usually contain a resin and/or drying oil that reacts with oxygen in the air to initially form a film on the surface of the ink film when the sheetfed printing ink is printed on the substrate and to cure the final printed ink over time.

Sheetfed printing inks normally set and dry as a result of an oxido-polymerization process. The oxygen surrounding the ink film reacts with the free C=C double bonds present in the ink system which allows the formation of a high molecular weight polymer. This chemical drying process can be assisted by addition of a metal catalyst (metal drier). In the absence of metal catalyst, this process is very slow and could last anywhere from several days to weeks depending on the ink formulation. When drying is slow, the sheetfed printing ink does not set properly on the printed substrate. In a sheetfed lithographic process, printed papers are laminated one after another, so that if the sheetfed printing ink is not properly set, the printing ink from one sheet can transfer to the back surface of the next paper.

The introduction of metal catalyst (metal drier) significantly increases the setting and drying process and allows the printing ink film to set and to be dried anywhere from several hours to 1 or 2 days. Sheetfed printing inks containing metal catalysts, however, have two major drawbacks. Firstly, the sheetfed printing inks are prone to premature polymerization on the printing press, which can necessitate time consuming and costly frequent press cleaning, or premature polymerization in storage containers, usually in the form of skin formation, which leads to printing ink wastage and possible contamination. Secondly, the metal catalysts generally are not user-friendly due to associated toxicity issues. Accelerated drying may be possible if electron beam curing or UV irradiation is used after the printing step, but for both applications, special printing inks and special equipment is required, which introduces additional costs and potential difficulties in the sheetfed printing process.

Provided are compositions and methods for improving the setting and drying, as evidenced by improved rub resistance, of conventional sheetfed printing ink compositions and waterless printing sheetfed printing ink compositions containing NAD formulated for sheetfed applications and printing using a sheetfed lithographic process. Including an amount of NAD that is at or about 11 wt % to 60 wt %, or 12 wt % to 50 wt %, preferably 25 wt % to 35 wt % based on the weight of the ink composition, of NAD, particularly of a NAD provided herein, in a sheetfed printing ink formulation, imparts sufficient setting drying and mechanical resistance of the printed ink film that metal catalysts can be eliminated. It is possible to incorporate the NAD into a sheetfed printing ink composition containing metal catalysts in order to impart improved setting and drying and rub resistance properties, but the preferred embodiment would be to introduce sufficient NAD in the sheetfed printing ink composition that it will set and dry in an acceptable time without the need for metal catalysts. In an alternate embodiment, the amount of NAD included in the sheetfed printing ink composition can be maintained at a level greater than 11 wt %, such as greater than 15 wt % or greater than 20 wt %, or at a level between 25 wt % to 60 wt %, based on the weight of the ink composition, or reduced to a lower level, and a reduced amount of metal drier could be used rather than eliminating the drier altogether. As demonstrated in the Examples, sheetfed printing inks containing from 15 wt % to 60 wt % NAD and no metal drier or anti-oxidant exhibit rub resistance values very soon after printing, such as at 15 minutes, as well as after 1 hour, 2 hours and 24 hours, that are equal to or better than comparative standard sheetfed printing inks that contain drier and anti-oxidant. Sheetfed printing ink compositions without drier can be formulated to contain between 15 wt % to 60 wt % NAD based on the weight of the ink composition and such sheetfed printing ink compositions exhibit good setting and drying properties, particularly as measured by rub resistance.

Also provided are conventional sheetfed printing ink compositions and waterless printing sheetfed printing ink compositions containing NAD that do not require metal catalyst or its equivalent to properly set and dry, as exhibited by acceptable rub resistance values. The sheetfed printing ink compositions can be characterized by having a viscosity of 20 Pa·s to 150 Pa·s at a shear rate of 50 s$^{-1}$, or a viscosity of 40 Pa·s to 100 Pa·s at a shear rate of 50 s$^{-1}$. The viscosity can be measured using an AR 1000 rotational viscometer (TA Instruments, New Castle, Del., USA). The ink compositions also can be characterized by exhibiting a rub resistance rating of less than 2 after 24 hours, and/or a rub resistance rating of less than 2 after 2 hours, and/or a rub resistance rating of less than 2 after 15 minutes.

In the international patent publications WO2009/155201 and WO2011/014826, the use of a non-aqueous dispersion of core/shell polymer particles is described. WO09155201 states that addition of NAD in conjunction with a metal drier can increase the drying speed of the sheetfed offset ink. Examples are limited, however, to an amount of NAD up to 15 wt % based on the weight of the ink, and using a metal catalyst to polymerize the ink. WO2011/014826 describes reducing the odor of non-aqueous dispersions and states that its non-aqueous dispersion of core/shell polymers can be incorporated into a standard sheetfed printing ink at a 10 wt % level. WO2011/014826 provides no examples of such sheetfed printing inks or their use.

NADs often exhibit a fairly low viscosity (for example about 10 Pa·s at a shear rate of 50 sec$^{-1}$ as measured on a TA Instruments AR 1000 rotational viscometer). Introducing NADs having this low of a viscosity at increased levels into a sheetfed printing ink may be impractical since the resulting printing ink may not be viscous enough for good performance when used in a lithographic sheetfed printing process. In a preferred embodiment, the NAD used in the sheetfed printing inks of the present application are modified to have a higher viscosity (for example at or about 20 Pa·s to at or about 150 Pa·s at a shear rate of 50 sec$^{-1}$). By using a more viscous NAD, a greater amount of NAD can be included in the sheetfed printing ink composition without significantly decreasing the final viscosity of the sheetfed printing ink composition. This allows the formulator to increase the total NAD content in a finished sheetfed printing ink to a level greater than 11 wt %, or 15 wt % based on weight of the ink composition, such as at or about 16 wt % to 60 wt %, more preferably at or about 25 wt % to 35 wt % based on weight of the ink composition, such that the resulting printing ink has a viscosity conducive for good sheetfed lithographic process performance, and that will quickly set and provide apparent dryness as evidenced by increased rub resistance without the need for metal driers.

As discussed above, one method to increase the viscosity of the NAD is to introduce a rheology adjusting component, such as water, an alcohol, an alkali compound or an amine or a combination thereof, such as a mixture of water, an alkali hydroxide, an alkylamine and an alcohol, during polymerization of or formation of the acrylic core/shell polymer particles. Any other method for increasing the viscosity of a non-aqueous dispersion of polymer particles known in the art also can be used.

Conventional sheetfed printing ink compositions and waterless printing sheetfed printing ink compositions that incorporate NAD can be prepared by any method known in the art. For example, pigments, resins, such as alkyd resins, and varnishes can be pre-mixed using a mixer or vibration shaker device. This mixture then can be milled and dispersed. Any commercially available devices can be used to mix and disperse the components. Examples of such equipment and devices include an agitator mill, an attritor grinding mil, a ball mill, a Cobol™ mill, a colloid mill, a Dyno® mill, a flow jet mill, a high-speed disperser, a homogenizer, a Microfluidizer®, a pearl mill, a sand grinder, a sand mill, an ultrafine mill, a three-roll mill, a two-roll mill, and an ultrasonic wave homogenizer, and these can be used alone or in combination of two or more. Preferably a two-roll or three-roll mill is used.

The milling can be repeated a number of times until a desired particle size is achieved. For example, the mixture can be milled to obtain a grind not higher than 10 μm to form a printing ink concentrate. The milling can be performed until about 90% of the particles are of a size less than 10 μm, or until about 90% of the particles are of a size less than 5 μm, or until at least 50% of the particles are of a size of 2.5 μm or less.

Any additives to be added to the sheetfed printing ink composition, such as wax paste, anti-set off paste, water fighter, emulsifier and anti-oxidants, and the NAD then can be added to this printing ink concentrate and the mixture can be mixed to yield a homogeneous printing ink composition. The mixing can be done using any standard mixing method or instrument, such as a paddle mixer or paint shaker device to form finished printing inks.

In general terms, a sheetfed lithographic printing ink should have a low surface tension, be water-repellent, be capable of emulsifying with a fount solution, and, for conventional sheetfed offset lithography, usually be capable of drying without radiation. These very particular requirements can be met by careful formulation and choice of the various components and is well known in the printing ink industry.

The sheetfed printing ink compositions containing NAD usually include a pigment. The type of pigment included will depend upon the kind of ink being formulated. Lithographic printing inks are typically used in four colors—magenta, yellow, black, and cyan, which can be formulated to provide a metallic or a pearlescent appearance. Any of the customary inorganic and organic pigments can be used in the sheetfed printing ink compositions of the present invention. Pigments suitable for use in the present invention include but are not limited to yellow of the AAA, AAOA and AAOT type, phthalo-cyanide Blue GS, green shade beta type, permanent red 2B calcium, lithol rubine (4B), rhodamine YS, carbon black metal modified furnace type (with alkali blue toner) chrome yellow, iron blues, iron oxides, titanium dioxide, alumina hydrate, blanc fixe, calcium carbonate, lake pigments, PMTA colors, fluorescent pigments, metallic pigments, clays, naphthols, and other organic pigments. When a black pigment is used, a blue toner can be included and it generally replaces a portion of the vehicle. The pigment can be added to the lithographic sheetfed printing ink composition either as a dry powder, flush, presscake or as a dispersion. When using a pigment flush, a portion of the vehicle can first be used to prepare the flush dispersion. The pigments can be used in an amount dispersable by the formulation. In general, it can be desirable to carry as much pigment in the ink as possible. A typical range of typical pigment amounts used is approximately 10 wt % to 50 wt % based on the weight of the printing ink.

The sheetfed printing ink typically is dried by oxidative polymerization of the resins and by incorporation of drying oils, e.g., linseed oil or castor oil or derivatives thereof, which can pass into the paper in the course of printing. The proportion of drying oils in the sheetfed offset printing inks can be about 0 wt % to 50 wt %, or about 0.5% wt % to 30 wt % based on the weight of the printing ink. The drying reaction traditionally is accelerated further by addition of drying catalysts (metal driers), which are typically fatty acid salts, such as salts of organic carboxylic acids, of heavy metals such as cobalt and manganese, e.g., cobalt/manganese linoleate, hexadeconate or octoate (e.g., see U.S. Pat. Nos. 5,156,674; 6,899,756; 7,811,367). It has been found that addition of the NAD compositions provided herein can significantly reduce or eliminate the need for metal driers in the sheetfed lithographic printing ink formulation to improve the setting and drying of the sheetfed ink composition, as exhibited by increased rub resistance. If not totally replaced by the NAD provided herein, a metal drier can be included in the sheetfed printing ink composition. The drier can be any of the commercially available metal driers, such as those based on cobalt or manganese or cobalt/manganese combinations. A number of cobalt/manganese driers are commercially available as cobalt/manganese linoleate, hexadeconate or octoate. Generally, the commercial sheetfed printing inks contain metal drier in an amount that is up to 3 wt %, or less than about 3 wt %, or less than about 2.5 wt %, preferably less than about 1.5 wt % based on the weight of the printing ink. Addition of NAD to the sheetfed printing ink composition can significantly reduce or eliminate metal drier in the sheetfed printing ink.

Additives can be introduced into the sheetfed printing ink in order to modify the ink properties for specific applications. These additives can include, e.g., wax compounds, such as PE wax and/or PTFE wax, pour point depressants, surfactants, emulsifying agents, drying agents (e.g., for formulations containing vegetable oils), defoamers, anti-set off agents, lithographic additives, dispersants, solvents, flow agents, thickeners, anti-misting agents, lubricants, anti-settling agents, wetting agents, water fighters, gloss enhancers, UV absorbers, pigment fillers and/or anti-oxidants. These additives are well known to those skilled in the art. When included, additives typically are included in amounts of at least about 0.001 wt % by weight of the ink, and can be included in amounts of about 5 wt % or more based on the weight of the ink, depending upon their nature. Many sheetfed printing inks are formulated to use vegetable oils in combination with, or instead of, mineral oils. When mineral oils are present, they generally are selected to have a boiling range between at or about 260° C. to at or about 310° C. Further details regarding the fundamental characteristics of lithographic sheetfed printing inks can be found, e.g., in *The Printing Ink Manual* (5$^{th}$ ed., Leach et al. eds. (2009), pages 387-431), the disclosure of which is incorporated herein by reference.

Resins usable in the lithographic sheetfed printing inks of the present invention include, for example, natural or processed resins such as rosins, rosin esters, maleic modified resins, rosin modified fumaric resins, dimerized and polymerized rosins, phenolics, rosin modified phenolics, terpenes, polyamides, cyclized rubber, acrylics, hydrocarbons and modified hydrocarbons. Also included among the available resins are those identified in *The Printing Ink Manual*, supra.

Any conventional anti-oxidant that does not adversely react with components of a sheetfed printing ink can be used. Exemplary anti-oxidants include ascorbic acid, astaxanthin, carotene, chroman (3,4-dihydro-2H-1-benzopyran), hexamethylene bis(3,5-di-tert-butyl-4-hydroxyhydro-cinnamate), octadecyl 3,5-di-tert-butyl-4-hydroxyhydro-cinnamate, vitamin E and vitamin E analogs, mono-tert-butylhydroquinone (MTBHQ) and butylated hydroxy toluene (BHT). Preferred anti-oxidants are MTBHQ and BHT. Generally, the sheetfed printing ink composition can contain less than about 5 wt % anti-oxidant based on the weight of the ink composition, preferably less than about 2.5 wt %, or less than about 1.5 wt % anti-oxidant based on the weight of the ink composition.

The sheetfed printing ink composition can contain a heavy oil, such as a mineral oil having a density between 0.85-0.91. An exemplary heavy oil is Printosol 30/40 AP85 from Haltermann (Channelview, Tex.). Generally, the composition can contain heavy oil in an amount that is less than about 10 wt %, preferably less than about 5 wt % or less than about 2.5 wt % based on the weight of the ink composition.

The sheetfed printing ink includes a resin. Exemplary resins include natural or modified resins such as rosin, copal, shellac, hardened rosin and rosin esters; synthetic resins such as phenol resin, rosin modified phenol resin, 100% phenol resin, maleic acid resin, alkyd resin, epoxy modified alkyd resin, soya/linseed oil alkyd resins, petroleum resin, vinyl resin, acrylic resin, polyamide resin, epoxy resin, aminoalkyd resin, polyurethane resin and aminoplastic resin; cellulose derivatives such as nitrocellulose and ethyl cellulose. Preferred resins include rosin resins, alkyd resins, epoxy modified alkyd resins and soya/linseed oil alkyd resins.

The amount of resin in the sheetfed printing ink composition and the proportion of resin to pigments in the sheetfed printing ink can routinely be selected in order to adjust parameters that are important for the sheetfed printing process, such as, e.g., dispersability, tackiness and viscosity. For a given sheetfed printing ink, viscosity and tackiness usually are mutually dependent, but can also be modified individually in a controlled manner through a specific printing ink formulation. Sheetfed printing inks having too high a degree of tackiness can give rise to picking or sections of the paper tearing. Sheetfed printing inks of low or inadequate tackiness are not transferred in an appropriate manner in the course of the lithographic printing process. If the viscosity of the printing ink is to low, it can readily penetrate the paper, becoming visible on the opposite side of the paper. Low viscosity of the sheetfed printing ink also can cause smearing, blotchiness or loss of clarity in the reproduced image. By contrast, excessively viscous sheetfed printing inks will not flow appropriately from the filling sources to the rollers. The provided sheetfed printing ink compositions containing NAD are formulated to viscosities required for printing using a sheetfed lithographic printing process. Generally, the sheetfed printing ink composition containing NAD can contain a total amount of resin that is from at or about 5 wt % to at or about 50 wt % based on the weight of the ink composition. The sheetfed printing ink composition containing NAD can contain a total amount of resin that is from at or about 10 wt % to at or about 40 wt % based on the weight of the ink composition. The sheetfed printing ink composition containing NAD can contain resin in an amount that is less than about 40 wt % or less than about 35 wt % based on the weight of the ink composition.

The sheetfed printing ink composition containing NAD can include a wax paste, which can include one or more waxes. The waxes generally are dispersed in a vehicle based on a resin, such as rosin resin or alkyd resin, to form a wax paste. The wax compound, or combinations of wax compounds, can provide slip and rub resistance. Any wax known in the art can be included in the sheetfed printing ink. Exemplary waxes include polytetrafluoroethylene (PTFE), polyethylene (PE), micronized PE, Fischer Tropsch (FT), carnauba, and microcrystalline beeswax and combinations thereof. The polyethylene wax can be of a low density, medium crystallinity and the form of a dispersion, such as Iovite XP107 or Lawter 697, in an alkyd resin is suitable for use in a sheet-fed ink. Exemplary PTFE waxes include Polyfluo® 535 and Polyfluo® 540. An exemplary micronized PE wax is MicroMatte® 1011 UVW. The Fisher Tropsch (FT) waxes, generally available in aliphatic hydrocarbon solvents, such as Texolon of Lawter Chemicals Company, also can be used. Preferred waxes include PTFE, PE or micronized PE or combinations thereof. Generally, the sheetfed printing ink compositions containing NAD include an amount of wax that is less than about 10 wt %, preferably less than about 8 wt % based on the weight of the ink composition because the wax compound can reduce the printing ink viscosity and gloss.

The sheetfed printing ink can include an anti-set off agent. The anti-set off agent can include silicas or starches or combinations thereof. The anti-set off agent generally is dispersed in a vehicle based on a resin, such as rosin resin or alkyd resin. Generally, the sheetfed printing ink composition containing NAD can contain an anti-set off agent in an amount that is less than about 10 wt %, preferably less than about 5% based on the weight of the ink composition.

The sheetfed printing ink containing NAD can include a water fighter. The water fighter can include one or more of the following: blown oils, including blown linseed oil, blown rapeseed oil, blown soybean oil and blown castor oil, such as oxidized castor oils (CAS No. 68187-84-8); isotridecyl alcohol such as is in Primalene AKC4918 (Akzo Nobel); polyalkylene oxide and hydrophobic polyoxyalkane compounds, such as are present in LithoTrol™ ink/water balance additives and polyglycols. Preferred water fighting agents are blown oils, polyglycols and polyalkylene oxides. Generally, the sheetfed printing ink composition containing NAD can contain a water fighter in an amount that is less than about 1.0 wt %, preferably between 0.1 wt % to 0.75 wt % based on the weight of the ink composition. The amount of water fighter included in the sheetfed printing ink composition containing NAD can be between 0.2 wt % to 0.6 wt %, or between 0.3 wt % to 0.5 wt %, or at or about 0.5 wt % based on the weight of the ink composition.

The sheetfed printing ink containing NAD can include an emulsifier. Any emulsifier used routinely in the art for ink and ink-related applications that is compatible with the components of the sheetfed printing ink composition can be included. Generally, the emulsifier can be selected to have an HLB (hydrophilic lipophilic balance) value between at or about 2 to at or about 15. The emulsifier can include an amphoteric surfactant, a zwitterionic surfactant, an anionic surfactant, a nonionic surfactant, and mixtures thereof. The emulsifier can include perfluoroalkyl surfactants, alkylphenyl surfactants, polysiloxane surfactants and combinations thereof. The emulsifier can include alkoxylates, ethoxylates, block copolymers of ethylene oxide, copolymers of ethylene oxide, copolymers of propylene oxide, copolymers of butylene oxide, alkyl phenol ethoxylate, alkyl phenol propoxylate, arylarylalkoxylates, amine alkoxylates, amine ethoxylates; fatty acid alkoxylates, fatty alcohol alkoxylates, alkyl sulfonates, alkyl benzene sulfonates, alkyl naphthalene sulfonates, sulfated fatty alcohols, sulfated fatty alcohols, sulfated fatty amines, sulfated fatty acid amides, acid esters of sodium isethionate, esters of sodium sulfosuccinate, sulfated fatty acid esters, sulfonated fatty acid esters, petroleum sulfonates, N-acyl sarcosinates, alkyl polyglycosides, alkyl ethoxylated amines, alkyl acetylenic diols, pyrrilodone based surfactants, 2-ethyl hexyl sulfate, isodecyl alcohol ethoxylates, ethylene diamine alkoxylates, ethylene oxide/propylene oxide copolymers, diphenyl ether Gemini type surfactants, ethylene oxide/propylene oxide copolymers, amine ethoxylates, alkyl polyglycosides, and oxo-tridecyl alcohol ethoxylates and combinations thereof. The emulsifier can include lecithin, nonyl phenoxy polyethoxylated alcohols, acrylate-modified polydimethyl-siloxanes, polyether-modified polydimethylsiloxanes, polyoxyalkylated ethers, anionic fluorothio alkyls, alkyl aryl sulfonates, alkyl amine quaternary salts, polysorbates, alkyl ethers, aryl ethers, poloxamers, fatty alkanolamides, acetylenic glycols, ethoxylated glycols, ethoxylated acetylenic diols, sorbitan esters, and mixtures thereof. Generally, the sheetfed printing ink composition can contain an emulsifier in an amount that is less than about 5 wt %, preferably less than about 2.5 wt %, based on the weight of the ink composition. The emulsifier can be present in the sheetfed printing ink composition containing NAD at a weight in the range of from at or about 0.25 wt % to at or about 2.5 wt % based on the weight of the ink composition. The emulsifier can be present in an amount that is 0.25 wt %, 0.5 wt %, 0.75 wt %, 1 wt %, 1.25 wt %, 1.5 wt %, 1.75 wt %, 2 wt %, 2.25 wt % or 2.5 wt % based on the weight of the sheetfed printing ink composition.

The sheetfed printing ink containing NAD contains a varnish. The varnish can contain a resin and a solvent. The varnish can contain resin, drying oils, bodied drying oils, vegetable oils, naphthenic oils, paraffinic oils fatty acids and multifunctional unsaturated polyesters. Any resins known in the art can be included in the varnish. Exemplary resins include rosin resin, alkyd resin, epoxy modified alkyd resins and soya/linseed oil alkyd resins. The varnish also can contain a mineral oil, such as a light mineral oil or a heavy mineral oil or combinations thereof. The varnish also can contain a vegetable oil, such as a linseed oil, castor oil, cottonseed oil, soya oil or combinations thereof. An exemplary varnish contains 30 wt % to 40 wt % rosin resin, 30 wt % to 40 wt % mineral oil, 15 wt % to 25 wt % linseed oil and 10 wt % to 20 wt % alkyd based on the weight of the varnish. Another exemplary varnish can include 40 wt % to 50 wt % rosin resin, 40 wt % to 50 wt % mineral oil, 5 wt % to 15 wt % linseed oil and 1 wt % to 5 wt % soya oil based on the weight of the varnish. The varnish can be present in an amount that is between at or about 5 wt % to at or about 60 wt %, or 10 wt % to at or about 50 wt %, such as 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt % or 50 wt % based on the weight of the sheetfed printing ink composition.

An exemplary conventional sheetfed printing ink composition contains, based on the weight of the ink composition, 1 wt % to 10 wt % resin, 10 wt % to 45 wt % varnish, 15 wt % to 45 wt % pigment, 15 wt % to 60 wt % NAD, 1 wt % to 10 wt % waxes, 0.5 wt % to 5 wt % heavy oil, 0.5 wt % to 5 wt % emulsifier, 1 wt % to 5 wt % anti-set off agents, 0.25 wt % to 2.5 wt % anti-oxidant, 0.1 wt % to 1 wt % water fighter agent and, if present, 0.25 wt % to 2 wt % metal drier.

It has been found that sheetfed printing ink compositions containing NAD, particularly containing 11 wt % to 60 wt %, or 15 wt % to 60 wt % NAD based on the weight of the ink composition, exhibit faster setting and drying, as exhibited by increased rub resistance 1 minute after printing without oven drying. As demonstrated in the Examples, sheetfed printing ink compositions containing NAD set quickly and have improved short term rub resistance when compared to a sheetfed printing ink that does not include a drier or anti-oxidant. Increasing the amount of NAD in the sheetfed printing ink composition results in increasing improvements in the set time and rub resistance. Accordingly, provided are methods for improving rub resistance of a sheetfed printing ink composition by including in the sheetfed printing ink composition an NAD in an amount that provides rub resistance without the need to include a metal drier. As shown in the Examples, including NAD in the sheetfed printing ink composition without metal drier yields a printed ink that exhibits a rub resistance value at 15 minutes that is the same as or better than rub resistance value achieved in 24 hours.

Also provided are sheetfed printing ink formulations containing NAD and methods of sheetfed lithographic printing that obviate the need for metal driers and anti-oxidants in the sheetfed printing ink. The method includes preparation of a sheetfed printing ink composition that contains from 11 wt % to 60 wt % NAD, such as 15 wt % to 55 wt % NAD, preferably between 20 wt % to 35 wt % NAD based on the weight of the ink composition, and does not contain a metal drier. As demonstrated in the Examples, sheetfed printing ink compositions that contain from 15 wt % to 60 wt % NAD based on the weight of the ink composition will set and dry properly and exhibit good rub resistance without the need for metal driers or anti-oxidant. Such sheetfed printing ink compositions yield printed inks that have rub resistance values 2 hours and 24 hours after printing that are equal or better than ink compositions containing metal driers.

Also provided are sheetfed lithographic printed substrates printed with a sheetfed printing ink, where the sheetfed printing ink contains from 11 wt % to 60 wt % NAD, such as 15 wt % to 55 wt % NAD, preferably between 20 wt % to 35 wt % NAD, based on the weight of the ink composition, where the sheetfed printing ink composition does not include a metal drier.

Also provided are methods of lithographic printing using a sheetfed lithographic printing process, comprising printing a substrate with a sheetfed printing ink that contains from 11 wt % to 60 wt % NAD, such as 15 wt % to 55 wt % NAD, preferably between 20 wt % to 35% NAD based on the weight of the ink composition, where the sheetfed printing ink composition does not include a metal drier.

2. Heatset Printing Ink Compositions

Another class of lithographic inks that can be formulated to include NADs are heatset printing inks. Standard heatset printing inks are used mainly to print magazines and normally set and dry by solvent evaporation while the printed substrate goes through a heating apparatus, such as an oven or IR or UV dryer. A printed substrate temperature between 100° C. and 130° C. normally is required at the end of the heating process in order to dry the printed ink film. Although progress has been made within the last few years to improve the outputs of the heating process, the heatset printing process remains relatively unfriendly to the environment due to the energy necessary to dry the heatset printing ink film. A heatset printing ink that would allow a reduction in energy consumption would make the heatset printing process more environmental-friendly. A reduction in energy consumption could be achieved by reducing the temperature required to dry the heatset printing ink. A significant reduction in energy consumption could be achieved by eliminating the need to heat the heatset printing ink altogether in order to dry the heatset printing ink. Such a heatset printing ink would make the heatset printing process more environmental-friendly as well as more economical for the print shops.

The present invention provides heatset printing ink compositions that contain a non-aqueous dispersion (NAD). The inclusion of NAD in heatset printing inks provides a heatset printing ink composition that exhibits excellent setting and drying and immediate rub resistance without the need for the printed heatset printing ink to be exposed to thermal energy, such as in an oven or via IR or UV heaters. Heatset printing ink compositions containing NAD can be printed using a conventional heatset lithographic process while reducing the temperature of the external energy source, e.g., an oven, or even turning off the oven typically used with conventional heatset printing. It is impossible to by-pass or eliminate the oven in a heatset lithographic printing process using conventional heatset printing inks because doing so would immediately lead to severe rub off issues in the downstream folding and cutting units, yielding printed jobs with very poor appearance.

The amount of NAD that can be included into a heatset printing ink can vary between 5 wt % to 50 wt % based on the weight of the ink composition. The NAD can be incorporated into the heatset printing ink composition in a range of from at or about 10 wt % to at or about 45 wt %, or at or about 15 wt % to at or about 40 wt %, or at or about 20 wt % to at or about 35 wt %, based on the weight of the ink composition. The NAD can be present in the heatset printing ink composition in an amount that is at or about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt % or 50 wt % based on the weight of the ink composition.

Heatset offset printing inks can include a resin or modified resin, such as hydrocarbon resin, rosin resin, phenolic modified rosin resin, alkyd resin, oxidized alkyd resin or rosin resin, including modified rosin esters and modified alkyd resins and combinations thereof, one or more pigments, and solvents such as mineral solvents or petroleum derivatives, generally high boiling point solvents, and additives such as waxes and rheology control agents. U.S. Pat. Nos. 6,489,375 and 6,451,873 describe resin-based rheological additives for web offset heatset printing inks.

Exemplary resins that can be included in the heatset printing inks include rosins, rosin esters, phenolic modified rosins, maleic modified resins, rosin modified fumaric resins, dimerized and polymerized rosins, phenolics, rosin modified phenolics, terpenes, polyamides, cyclized rubber, acrylics, hydrocarbons and modified hydrocarbons and combinations thereof. Preferred resins are alkyd resins, phenolic modified rosin resins and hydrocarbon resins and combinations thereof, particularly phenolic modified rosin resins combined with hydrocarbon resins. In the heatset printing ink compositions containing NAD provided herein, the total resin content of the ink composition can be in a range of from at or about 1 wt % to at or about 40 wt %, or in a range of from at or about 1 wt % to at or about 10 wt %, or in a range of from at or about 5 wt % to at or about 15 wt %, or in a range of from at or about 10 wt % to at or about 30 wt %, based on the weight of the ink composition. The heatset printing inks can include a clay base, a varnish, one or a combination of waxes, emulsifier(s) and anti-oxidant(s). Further details regarding the fundamental characteristics of heatset printing inks can be found, e.g., in *The Printing Ink Manual* (5$^{th}$ ed., Leach et al. eds. (2009), pages 360-387), the disclosure of which is incorporated herein by reference.

The heatset printing ink compositions usually include a pigment, the nature of which is not critical to the present invention, and which can be chosen from any of those pigments well known to those skilled in the art. Heatset printing inks generally are prepared in four colors—magenta, yellow, black, and cyan. Any of the customary inorganic and organic pigments can be used in the ink compositions of the present invention. The pigment can be added to the heatset printing ink composition either as a dry powder, flush, presscake or as a dispersion. When using a pigment flush, a portion of the vehicle can first be used to prepare the flush dispersion. The pigments can be used in an amount dispersable by the formulation. In general, it can be desirable to carry as much pigment in the heatset printing ink as possible. A range of typical pigment amounts used is approximately 10 wt % to 50 wt % based on the weight of the heatset printing ink.

Typical heatset printing ink compositions can be characterized, e.g., as containing an oil, such as, e.g., a mineral oil, that evaporates under the influence of application of an external energy, such as heat, thereby allowing the printed ink to dry on the substrate. In conventional heatset printing inks, the mineral oils generally have a boiling range of 220° C. to 320° C., and typical conventional heatset printing inks contain mineral oils having a boiling range between 240° C. and 270° C. The boiling range of the oil for a conventional heatset printing ink typically is selected to provide good evaporation when exposed to a thermal energy source, such as in an oven or when exposed to an IR or UV dryer. Because the heatset printing inks containing NAD provided herein do not require an external energy source, such as an oven or IR or UV drier, to properly set and dry, mineral oils and/or vegetable oils having a lower boiling point range, such as a boiling point range between 210° C. and 250° C., or a boiling point range between 160° C. and 220° C., can be used. A heatset printing ink composition can contain an oil in an amount of from at or about 15 wt % to at or about 60 wt % based on the weight of the ink composition. The oils in the heatset printing ink composition can be present in an amount from at or about 20 wt % to at or about 50 wt %, or at or about 25 wt % to at or about 45 wt %, or at or about 30 wt % to at or about 40 wt % based on the weight of the heatset ink composition.

The heatset printing ink composition also can include a clay and/or organoclays. Clays and organoclays are used widely as viscosity modifiers and also can serve as anti-misting agents. Organoclays sold under the trademark Bentone® can be included in the ink compositions containing NAD described herein. The clays often are included as a clay base, which can include a clay in a resin solution vehicle. In some instances, the amount of clay in a clay base can be as high at 60 wt % based on the weight of the ink composition. In exemplary heatset printing ink compositions containing NAD provided herein, a clay or organoclay, if present, can be present in the heatset printing ink in an amount that is in a range of from at or about 0.25 wt % to at or about 5 wt %, or in a range of from at or about 0.5 wt % to at or about 3 wt % based on the weight of the ink composition. The clay/organoclay can be present in an amount that is at or about 0.25 wt %, 0.5 wt %, 0.75 wt %, 1 wt %, 1.25 wt %, 1.5 wt %, 1.75 wt %, 2 wt %, 2.25 wt %, 2.5 wt % or 2.75 wt % based on the weight of the ink composition.

The heatset printing inks containing NAD include a varnish. The varnish can contain a resin and a solvent. Any resin and any solvent that can dissolve or solvate the selected resin can be used. Exemplary resins include rosin resin, modified rosin resins, alkyd resin, modified alkyd resins, such as epoxy modified alkyd resins and soya/linseed oil alkyd resins. The varnish also can contain, as a solvent, a mineral oil, such as a light mineral oil or a heavy mineral oil, a naphthenic oil, a paraffinic oil, a vegetable oil or combinations thereof. The varnish also can include a gelling agent. Exemplary gelling agents include chelates, such as an aluminum chelate, and alcoholates, such as aluminum alcoholate. An exemplary aluminum chelate is oxy aluminum octoate. In the heatset printing ink compositions containing NAD provided herein, the varnish can be present in an amount that is in a range of from at or about 5 wt % to at or about 55 wt %, or in a range of from at or about 10 wt % to at or about 50 wt %, or in a range of from at or about 15 wt % to at or about 45 wt %, based on the weight of the ink composition. An exemplary varnish contains, based on the weight of the varnish, 40 wt % to 50 wt % mineral oil, 40 wt % to 60 wt % resin, such as rosin resin or modified rosin resin, 1 wt % to 10 wt % vegetable oil, such as linseed oil, and 0.1 wt % to 1.5 wt % gelling agent, such as oxy aluminum octoate.

The heatset printing ink containing NAD also can include a wax, which can be incorporated into the printing ink composition as a wax paste. The wax paste can include a wax dispersed in a vehicle based on a resin, such as rosin resin or alkyd resin. Any wax known in the art can be included in the heatset printing ink composition containing NAD. Exemplary waxes include polytetra-fluoroethylene (PTFE), polyethylene (PE), micronized PE, Fischer Tropsch (FT), carnauba, and microcrystalline beeswax and combinations thereof. Preferred waxes include PTFE, PE or micronized PE or combinations thereof. Generally, the heatset printing ink composition containing NAD can include wax in an amount that is less than about 10 wt %, preferably less than about 5 wt % based on the weight of the ink composition.

The heatset printing ink containing NAD also can include an emulsifier. Any emulsifier used routinely in the art for ink and ink-related applications that is compatible with the components of the heatset printing ink composition can be included. The emulsifier can include an amphoteric surfactant, a zwitterionic surfactant, an anionic surfactant, a nonionic surfactant, and mixtures thereof. The emulsifier can include perfluoroalkyl surfactants, alkylphenyl surfactants, polysiloxane surfactants and combinations thereof. The emulsifier can include alkoxylates, ethoxylates, block copolymers of ethylene oxide, copolymers of ethylene oxide, copolymers of propylene oxide, copolymers of butylene oxide, alkyl phenol ethoxylate, alkyl phenol propoxylate, arylarylalkoxylates, amine alkoxylates, amine ethoxylates; fatty acid alkoxylates, fatty alcohol alkoxylates, alkyl sulfonates, alkyl benzene sulfonates, alkyl naphthalene sulfonates, sulfated fatty alcohols, sulfated fatty alcohols, sulfated fatty amines, sulfated fatty acid amides, acid esters of sodium isethionate, esters of sodium sulfosuccinate, sulfated fatty acid esters, sulfonated fatty acid esters, petroleum sulfonates, N-acyl sarcosinates, alkyl polyglycosides, alkyl ethoxylated amines, alkyl acetylenic diols, pyrrilodone based surfactants, 2-ethyl hexyl sulfate, isodecyl alcohol ethoxylates, ethylene diamine alkoxylates, ethylene oxide/propylene oxide copolymers, diphenyl ether Gemini type surfactants, ethylene oxide/propylene oxide copolymers, amine ethoxylates, alkyl polyglycosides, and oxo-tridecyl alcohol ethoxylates, and combinations thereof. The emulsifier can include lecithin, nonyl phenoxy polyethoxylated alcohols, acrylate-modified polydimethyl-siloxanes, polyether-modified polydimethylsiloxanes, polyoxyalkylated ethers, anionic fluorothio alkyls, alkyl aryl sulfonates, alkyl amine quaternary salts, polysorbates, alkyl ethers, aryl ethers, poloxamers, fatty alkanolamides, acetylenic glycols, ethoxylated glycols, ethoxylated acetylenic diols, sorbitan esters, and mixtures thereof. Generally, the heatset printing ink composition can contain an emulsifier in an amount that is less than about 7.5 wt %, preferably less than about 5 wt % or 2.5 wt %, based on the weight of the ink composition. The emulsifier can be present in the heatset printing ink in a range of from at or about 0.25 wt % to at or about 5 wt % based on the weight of the ink composition.

The heatset printing ink composition containing NAD can include an anti-oxidant. Anti-oxidant additives are known in the art and are commercially available. Any conventional anti-oxidant that does not adversely react with other components of the heatset printing ink can be used. Exemplary anti-oxidants include ascorbic acid, astaxanthin, carotene, chroman (3,4-dihydro-2H-1-benzopyran), hexamethylene bis(3,5-di-tert-butyl-4-hydroxyhydro-cinnamate), octadecyl 3,5-di-tert-butyl-4-hydroxyhydro-cinnamate, vitamin E and vitamin E analogs, mono-tert-butylhydroquinone (MTBHQ) and butylated hydroxy toluene (BHT). Preferred anti-oxidants are MTBHQ and BHT. Generally, the heatset printing ink composition containing NAD can contain an amount of anti-oxidant that is less than about 5 wt %, preferably less than about 2.5 wt % or less than about 1.5 wt % or less than about 1 wt % based on the weight of the ink composition.

An exemplary heatset printing ink composition can, e.g., contain exemplary ranges of components that include, for example, 10 wt % to 50 wt % pigment, 10 wt % to 55 wt % rosin resin varnish (which contains 30 wt % to 50 wt % rosin resin, 30 wt % to 50 wt % mineral oil, 5 wt % to 35 wt % linseed oil, 0 wt % to 5 wt % soya oil and 0 wt % to 20 wt % alkyd based on the weight of the varnish), 1 wt % to 15 wt % mineral oil or mineral solvent, 0.1 wt % to 2 wt % antioxidant, 1 wt % to 5 wt % wax paste, 10 wt % to 50 wt % NAD, 0 wt % to 10 wt % clay or organoclay, 0 wt % to 5 wt % alkyd resin, and 0 wt % to 5 wt % emulsifier based on the weight of the ink composition.

Because the heatset printing ink does not need to be absorbed by the substrate in order to set and dry, substrate surfaces having smaller pores can be printed using the heatset printing ink compositions. In addition, coated substrates can be printed using the heatset printing ink compositions. The substrate can include heavily coated paper, typically having a coating weight of more than 10 g/m², and for example, of at least 15 g/m². The substrate also can be a paper having a base weight range of greater than 40 g/m², such as, for example, having a base weight greater than 50 g/m², such as a base weight in the range of 55-120 g/m². The substrate also can be a super calendered paper.

In traditional heatset lithographic printing operations, the printed heatset printing ink on a substrate is dried using a dryer, such as an oven, hot air, a UV drier or an IR dryer. During the setting and drying process, the oil in the heatset printing ink evaporates, the resin in the heatset printing ink becomes insoluble and precipitates causing the ink to set. In some processes, after the substrate is heated in a dryer, the substrate can be cooled by passing the printed substrate through a cooling device. Thus, the traditional heatset printing process can be energy intensive.

As demonstrated in the Examples, the rub resistance of prints made using heatset printing ink compositions containing NAD is improved, and the general trend it that rub resistance is continuously improved as a greater amount (wt %) of NAD is included in the heatset printing ink composition. Heatset printing ink compositions containing NAD yield a printed ink having a rub resistance at 1 minute without any external energy treatment, such as thermal treatment, that is the same or better than its rub resistance at 24 hours without external energy treatment. Heatset printing ink compositions containing 5 wt % to 50 wt % NAD or more based on the weight of the ink composition set quickly and provide optimum rub resistance 1 minute after printing when the oven is turned off in the tested formulations. When the same heatset printing inks containing NAD are exposed to an external energy source, such as to a thermal energy, such as heating in an oven, the dried heatset printing inks containing NAD generally exhibit a similar rub resistance. Including NAD in a heatset printing ink composition yields a heatset printing ink that when printed on a substrate exhibits very fast setting and improved rub resistance when compared to conventional heatset printing inks that do not contain NAD. Thus, heatset printing ink compositions containing NAD exhibit fast setting times and significantly improved rub resistance whether or not the sheet is subjected to exposure to an external energy source, such as thermal energy, such as heating in an oven. In exemplary compositions, heatset printing ink compositions containing NAD exhibit rub resistance after 1 minute without going through an oven that is equal to the rub resistance of a conventional ink containing no NAD after the conventional ink has gone through an oven. In contrast, conventional heatset printing ink compositions that do not include NAD have, shortly after printing without the input of external energy, very poor rub resistance that slowly improves with time at the solvent in the ink slowly evaporates. Thus, a heatset printing ink composition containing NAD can be provided that can eliminate the need for exposing a substrate printed with the heatset printing ink to an external energy, such thermal energy. Also provided are methods for rapidly or immediately upon substrate application improving rub resistance of a heatset printing ink composition by including in the ink composition an NAD in an amount that provides rub resistance without having to be exposed to an energy source, such as an oven, IR drier or UV drier.

Addition of 5 wt % to 60 wt % NAD, or 15 wt % to 55 wt % NAD to a heatset printing ink composition, e.g., at levels of 30 wt % or less in exemplary compositions, allows the ink press operator to reduce the energy required to set and dry the ink formulation, such as by reducing the temperature of the oven used to set and dry the printed ink. Such a reduction in energy can result in a printed product that is less expensive to produce. In addition, including NAD in the heatset printing ink compositions produces an ink demonstrating improved setting and immediate rub resistance, such as, e.g., when measured 1 minute after printing.

Provided are methods of heatset printing that reduce the energy consumption during setting and drying of a heatset printed substrate. The methods include preparation of a heatset printing ink composition that contains from 5 wt % to 60 wt % NAD or 10 wt % to 50 wt % NAD or 15 wt % to 40 wt % NAD based on the weight of the ink composition, and printing the ink onto a substrate. Because the ink containing NAD requires little to no exposure to external energy in order to set and properly dry, the amount of energy necessary for printing with such inks can be reduced. As demonstrated in the Examples, heatset printing ink compositions that contains NAD in the range of from 15 wt % to 60 wt % NAD based on the weight of the ink composition set quickly and dry properly and exhibit good rub resistance without the need for exposure to external energy, such as heating in an over or via IR or UV dryers.

Also provided are methods for reducing the amount of energy required to provide rub resistance of a heatset printing ink by including in the ink formulation an NAD in an amount that provides rub resistance, such as in the range of from 5 wt % to 60 wt % NAD or 10 wt % to 50 wt % NAD or 15 wt % to 40 wt % NAD, based on the weight of the ink composition, at lower exposures to an energy source, such as an oven, IR drier or UV drier, than conventionally used.

Also provided are methods for reducing the time necessary for a heatset printing ink printed on a substrate to set and dry without heating, where the methods include preparation of a heatset printing ink composition that contains from 5 wt % to 60 wt % NAD or 10 wt % to 50 wt % NAD or 15 wt % to 40 wt % NAD or 30 wt % to 60 wt % based on the weight of the ink composition, and printing the ink onto a substrate. Such heatset printing ink compositions yield printed inks that have rub resistance values after 1 minute without heating that are equal to or better than heatset printing ink compositions containing no NAD after 24 hours without heating.

Also provided are methods for generally improving the rub resistance of a heatset printing ink printed on a substrate, where the methods include preparation of a heatset printing ink composition that contains from 5 wt % to 60 wt % NAD or 10 wt % to 50 wt % NAD or 15 wt % to 40 wt % NAD or 30 wt % to 60 wt % based on the weight of the ink composition, and printing the ink onto a substrate. Such heatset printing ink compositions yield printed inks that have rub resistance values, particularly Prüfbau rub mark values, that continue to improve when increasing amounts of NAD are added to the heatset printing ink composition.

Also provided are heatset printed substrates that include an ink on at least one surface thereof, where the heatset printing ink contains from 5 wt % to 60 wt % NAD, preferably between 15 wt % to 35 wt % NAD or 30 wt % to 60 wt % based on the weight of the ink composition and the substrate is printed using a heatset lithographic printing process.

Also provided are methods of printing a substrate using a heatset lithographic printing process, comprising depositing on a substrate a heatset printing ink that contains from 5 wt % to 60 wt % NAD, preferably between 15 wt % to 35 wt % NAD or 30 wt % to 60 wt % NAD based on the weight of the ink composition, where the ink is deposited on the substrate using a heatset lithographic printing process.

The heatset printing ink compositions also can be characterized by exhibiting an increase of at least 10%-50%, or between 10%-100%, such as 10%, 15%, 20%, 25%, 30%, 35%, 40%, 45%, 50%, 55%, 60%, 65%, 70%, 75%, 80%, 85%, 90%, 95% or 100% in a rub resistance rating when compared to a comparable ink composition that does not contain NAD. For example, as demonstrated in the Examples, an exemplary heatset printing ink composition containing 40 wt % NAD based on the weight of the ink composition without heat treatment exhibited an average rub resistance mark value of 4, while a comparative ink containing no NAD without heat treatment had an average ink mark value of 8, which represents a 100% improvement in the average rub resistance mark value for the ink containing the NAD. Other exemplary ink compositions containing NAD exhibited increases in rub resistance ratings of, e.g., 33%, 50% and 66%.

3. Coldset Printing Ink Compositions

Another class of lithographic inks that can be formulated to include NADs are coldset printing ink compositions. Coldset printing inks primarily are used to print porous paper, particularly newspaper. Coldset printing ink compositions basically contain a pigment dispersed in a mineral/vegetable oil and binder, and often a resin. Coldset printing inks generally dry by penetration of the solvent in the ink composition into the fibers of the paper, which allows the resin in the ink composition to set and thereby provide rub-fastness to the ink. Rub resistance of coldset ink, however, is very poor and ink easily can transfer to the fingers of the person who is handling or reading the newspaper. Other problems experienced with the coldset printing process include inter-page set off, where ink from one page marks an adjacent page.

In addition, conventional coldset printing inks generally are used for printing on uncoated stock used for newspaper since drying requires open pores through which the solvent in the ink can be absorbed and transported away from the ink film. The substrate typically is uncoated, although lightly coated paper can be used. For coldset lithographic printing applications, the paper can be structured in a base weight range of generally less than 50 g/m$^2$, and especially less than 40 g/m$^2$. Due to this limitation, other types of paper, such as coated or super calendared papers, typically cannot be printed using a conventional coldset lithographic printing process. In addition, because most newspapers are printed at night, some printshops cannot run their printing machines during the day. Providing a coldest printing ink that would allow printing with a coldset printing ink on other paper types and qualities could lead to a significant increase in coldset lithographic press productivity and substrate versatility.

Provided herein are coldset printing inks that contain non-aqueous dispersions containing acrylic core/shell polymers (NAD). The introduction of this polymeric dispersion in coldset printing inks provides a coldset printing ink that demonstrates improved immediate and long-term nib resistance on different substrates, including papers of different types and qualities, e.g., uncoated paper, super calendered paper and/or low weight coated paper.

As mentioned above, coldset printing inks basically contain a pigment dispersed in a mineral/vegetable oil and binder, and often a resin. Because of cost restrictions, additives generally are not included in many coldset printing inks. Any modified coldset printing ink must be easy to insert into a current printing process, must not add excessively to the cost, and must not unduly slow the overall printing process. Some conventional coldset printing inks include binders. Binders generally include ingredients that modify the absorption characteristics of the ink into the substrate, such as extenders, clays, e.g., organoclays, smectic clays and Kaolin clays and carbonates. In some instances, the coldset printing ink can include surfactants, waxes, gelling agents and mineral fillers. A skilled artisan will readily recognize that additional additives, such as dispersing agents, wetting agents, waxes and other agents, can be included in the coldset printing ink compositions. Due to cost constraints, however, many ink compositions contain few if any additional additives. Further details regarding the fundamental characteristics of coldset printing inks can be found, e.g., in *The Printing Ink Manual* ($5^{th}$ ed., Leach et al. eds. (2009), pages 353-360), the disclosure of which is incorporated herein by reference.

The coldset printing ink compositions typically include a pigment. Coldset printing inks typically are black inks for printing newspapers, although inks of other colors, such as magenta, yellow and cyan, also can be formulated. Any of the customary inorganic and organic pigments can be used in the ink compositions of the present invention. In the case of black ink, carbon black (such as Elftex carbon black from Cabot Corp.) can be used. In the coldset printing ink compositions containing NAD provided herein, the pigment can be present in an amount that is from at or about 10 wt % to at or about 40 wt % based on the weight of the ink composition.

The oil used in the composition can be a hydrocarbon oil or a vegetable oil or a combination thereof. Suitable hydrocarbon oils include paraffinic oils, such as white mineral oils (CAS No. 8042-47-5), e.g., Magie N-40 oil; naphthenic oils and distillates, such as hydrotreated light naphthenic distillates (CAS No. 64742-53-6), e.g., Nytex 5130, and hydrotreated heavy naphthenic distillates (CAS No. 64742-55-5), e.g., Nytex 510). The vegetable oils can be drying oils, semidrying oils and nondrying oils. Examples include almond oil, cacao oil, candlenut oil, castor oil, dehydrated castor oil, coconut oil, corn oil, cottonseed oil, grape seed oil, hempseed oil, linseed oil, olive oil, palm kernel oil, peanut oil, rapeseed oil, rice bran oil, safflower oil, sunflower oil, sesame oil, soybean oil, tall oil, tung oil and walnut oil, including combinations and fatty acid esters, such as fatty acid alkyl esters, thereof. Modified vegetable oils, such as epoxy-modified or silicone-modified or epoxidized oils, such as epoxidized soybean or linseed oils, also can be used. Coldset printing ink compositions generally include oils having less volatility. For example, in some compositions, the oil can be selected to have a boiling range between 300° C. to 400° C. In the coldset printing ink compositions containing NAD provided herein, the oil can be present in an amount that is from at or about 2 wt % to at or about 30 wt % based on the weight of the ink composition.

When present, any resin known in the art can be used. Exemplary resins include, e.g., natural or processed resins such as rosins, rosin esters, maleic modified resins, rosin modified fumaric resins, dimerized and polymerized rosins, phenolics, rosin modified phenolics, alkyd resins, modified alkyd resins, terpenes, polyamides, cyclized rubber, acrylics, hydrocarbons and modified hydrocarbons. In the coldset printing ink compositions provided herein containing NAD, the resin, when present, can be in an amount that is from at or about 0.5 wt % to at or about 30 wt % based on the weight of the ink composition.

The coldset printing ink composition containing NAD can include viscosity modifying agents and/or mineral fillers. Many such additives are known in the art and are commercially available. Organoclays can be used as a viscosity modifying agent as well as a mineral filler. Organoclays generally contain bentonite, hectorite or attapulgite clays or combinations thereof. Organoclays sold under the trademark Bentone® can be included in the coldset ink compositions containing NAD described herein. In the coldset printing ink compositions containing NAD provided herein, a viscosity modifying agent, such as an organoclay, when present, can be in an amount that is from at or about 0.5 wt % to at or about 5 wt % based on the weight of the ink composition.

The coldset printing ink composition containing NAD can include an extender paste. Extender paste can be used to increase the solid content of the printing ink and to improve the solid lay of the coldset printing ink on the printed substrate. The extender paste can contain extender pigments, such as kaolin, kaolin derivatives, alumina hydrate, blanc fixe (CAS No. 7727-43-7), calcium carbonate (coated or uncoated) or zinc white. The extender paste also can include resins and solvents. An exemplary resin is vegetable oil hybrid resin. The solvent can be a hydrocarbon solvent, such as a white mineral oil (CAS No. 8042-47-5) or a hydrotreated light naphthenic distillates (CAS No. 64742-53-6). An exemplary extender paste includes 60 wt % coated calcium carbonate, 4.5 wt % vegetable oil hybrid resin, and 35.5 wt % mineral oil based on the weight of the extender paste. In the coldset printing ink compositions containing NAD provided herein, an extender paste, when present, can be included in an amount that is from at or about 1 wt % to at or about 25 wt % based on the weight of the ink composition.

The coldset printing ink composition containing NAD includes a varnish. The varnishes can contain a resin and a solvent. Any resin and any solvent that can dissolve or solvate the selected resin can be used. Exemplary resins include rosin resin, modified rosin resin, alkyd resin, and modified alkyd resin, such as epoxy modified alkyd resins and soya/linseed oil alkyd resins. The varnish also can contain, as a solvent, a mineral oil, such as a light mineral oil or a heavy mineral oil, a naphthenic oil, a paraffinic oil, a vegetable oil, hydrocarbons, such as $C_{12}$-$C_{14}$ or $C_{11}$-$C_{14}$ or $C_{12}$-$C_{16}$ or $C_{14}$-$C_{18}$ n-alkanes, isoalkanes, cyclics or aromatics, or combinations of these solvents thereof. Exemplary hydrocarbon solvents include white mineral oil (CAS No. 8042-47-5) and Exx-Print solvents (ExxonMobile Chemical, Houston, Tex.), such as Exx-Print T82A and T84D. Exemplary vegetable oils include soybean, cottonseed and linseed oils.

In the coldset printing ink compositions containing NAD provided herein, the varnish can be present in a range of from at or about 5 wt % to at or about 55 wt %, or in a range of from at or about 10 wt % to at or about 50 wt %, or in a range of from at or about 15 wt % to at or about 45 wt % based on the weight of the ink composition. An exemplary wetting varnish can include 15 wt % to 30 wt % vegetable oil, such as soybean oil, 25 wt % to 40 wt % mineral oil, 30 wt % to 60 wt % resin, such as rosin resin or modified rosin resin, and 0.001 wt % to 0.5 wt % anti-oxidant, such as BHT, based on the weight of the wetting varnish. An exemplary letdown varnish can include 10 wt % to 30 wt % vegetable oil, such as soybean oil, 30 wt % to 60 wt % hydrocarbon solvent, such as mineral oil or Exx-Print T82A, 30 wt % to 60 wt % resin, such as rosin resin or modified rosin resin, and 0.001 wt % to 0.5 wt % anti-oxidant, such as BHT, based on the weight of the letdown varnish.

The coldset printing ink compositions containing NAD can contain an anti-oxidant. Any conventional anti-oxidant compatible with the components in the coldset printing ink composition can be used. Exemplary anti-oxidants include ascorbic acid, chroman (3,4-dihydro-2H-1-benzopyran), hexamethylene bis(3,5-di-tert-butyl-4-hydroxyhydro-cinnamate), octadecyl 3,5-di-tert-butyl-4-hydroxyhydrocinnamate, vitamin E and vitamin E analogs, mono-tert-butylhydroquinone (MTBHQ) and butylated hydroxy toluene (BHT). Preferred anti-oxidants are MTBHQ and BHT. Generally, the coldset printing ink composition containing NAD can contain an anti-oxidant in an amount that is less than about 5 wt %, preferably less than about 2.5 wt % or less than about 1.5 wt % based on the weight of the ink composition.

The amount of NAD introduced into a coldset printing ink composition can vary between at or about 5 wt % to at or about 60 wt %. A coldset printing ink composition can contain NAD in an amount between 5 wt % to 25 wt % or 10 wt % to 50 wt % or 15 wt % to 40 wt % or 20 wt % to 35 wt % by weight of the ink composition. In the coldset printing ink compositions provided herein, the NAD can be present in an amount that is 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt % or 60 wt % based on the weight of the ink composition.

Addition of NAD to a coldset printing ink, particularly when added in an amount of 5 wt % or greater, such as between 10% to 60% by weight of the ink composition, improves the set and rub resistance of the printed product. Exemplary coldset printing ink formulations containing as little as 10 wt % NAD based on the weight of the ink composition, when printed on uncoated paper, exhibited a significant decrease of the Delta E CMC values in rub tests, which can be directly correlated to a better rub resistance. A Delta E CMC value of 4 generally is accepted as indicative of an ink that exhibits good rub resistance.

Including NAD in coldset printing ink compositions can improve the kinetics at which acceptable rub resistance is achieved on a paper substrate. The improvements in rub resistance can be observed in samples printed with inks containing NAD shortly after printing. For example, 15 minutes after printing on uncoated paper, exemplary samples printed with coldset printing ink compositions containing 10 wt % NAD based on the weight of the ink composition exhibited rub resistance values half that of control inks containing no NAD, demonstrating significant improvement in rub resistance of coldset inks when NAD is included. Increasing the amount of NAD in the coldset printing ink composition resulted in concurrent improvements in the short term rub resistance values. Thus, coldset printing ink compositions containing NAD in an amount that its 5 wt % to 60 wt % based on the weight of the ink composition, and particularly exemplary in compositions containing 10 wt % to 50 wt % NAD based on the weight of the ink composition, exhibit improvements in ink setting and drying properties, as exhibited by improved rub resistance values obtained by standard testing methods. Coldset printing ink compositions containing NAD also exhibit rub resistance values at 15 minutes that are similar to the rub resistance values obtained at 24 hours.

Adding NAD to coldset printing ink compositions also allows the coldset printing ink to be used on diverse substrates other than uncoated newsprint. Coldset printing ink compositions containing NAD can be printed on super calendered and coated paper, paper substrates that typically cannot be printed with conventional coldset printing inks that do not contain NAD, Exemplary coldset printing inks containing 10 wt % NAD based on the weight of the ink composition exhibited improvement in rub resistance when compared to conventional coldset printing ink without NAD on super calendered paper. As the amount of NAD in the coldset printing ink composition is increased, the rub resistance of the resulting coldset printing ink composition increases. For example, an exemplary coldset printing ink composition containing 25 wt % NAD based on the weight of the ink composition exhibited a rub resistance better than an exemplary coldset printing ink compositions containing 10 wt % NAD based on the weight of the ink composition, and exhibited a significant improvement in rub resistance compared to conventional coldset printing ink compositions that do not contain NAD. Coldset printing ink compositions containing NAD that were printed on super calendared paper produced a printed substrate that had rub resistance test values, measured by Delta E CMC, that were below the critical value of 4. Hence, coldset printing ink compositions containing NAD, particularly compositions containing 5 wt % to 60 wt % NAD based on the weight of the ink composition, can be used to print on super calendered paper using a coldset lithographic process.

Similar results were obtained for coldset printing inks containing NAD when printed on low weight coated paper. Control comparative coldset printing ink samples without NAD exhibited a very poor rub resistance 15 minutes after printing when printed on low weight coated paper. Coldset printing ink compositions containing between 5 wt % to 60 wt % NAD based on the weight of the ink composition, exhibited improvement in rub resistance when printed on low weight coated paper in comparison to comparative coldset printing ink without NAD. Increasing the amount of NAD in the ink composition increased the improvement observed in rub resistance. Exemplary compositions containing greater than 5 wt % NAD based on the weight of the ink composition exhibit enhanced rub resistance on low weight coated paper. Hence, coldset printing ink compositions containing NAD, such as between 5 wt % to 60 wt % NAD based on the weight of the ink composition, exhibit enhanced nib resistance on low weight coated paper and thus can be used to print on low weight coated paper using a coldset lithographic process.

Provided are methods of improving nib resistance of a substrate printed using a coldset lithographic process. The methods include preparation of a coldset printing ink composition that contains from 5 wt % to 60 wt % NAD or 10 wt % to 50 wt % NAD or 15 wt % to 40 wt % NAD or 25 wt % to 50 wt % NAD based on the weight of the ink composition, and printing the ink onto a substrate using a coldset lithographic process. As demonstrated in the Examples, coldset printing ink compositions that contain NAD in the range of from 5 wt % to 60 wt % NAD based on the weight of the ink composition, set faster and exhibit improved rub resistance when compared to coldset ink compositions without NAD. In some methods, a rub resistance value less than 4 can be achieved within 15 minutes after printing using a coldset printing ink composition containing NAD.

Also provided are methods for printing on super calendered paper using a coldset lithographic printing process by using a coldset printing ink formulation that includes an NAD in an amount that provides rub resistance on super calendered paper, such as in the range of from 5 wt % to 60 wt % NAD or 10 wt % to 50 wt % NAD or 15 wt % to 40 wt % NAD based on the weight of the ink composition.

Also provided are methods for printing on light weight coated paper using a coldset lithographic printing process by using a coldset printing ink formulation that includes an NAD in an amount that provides rub resistance on light weight coated paper, such as in the range of from 5 wt % to 60 wt % NAD or 10 wt % to 50 wt % NAD or 15 wt % to 40 wt % NAD based on the weight of the ink composition.

Also provided are methods for reducing the time necessary for a coldset printing ink printed on a substrate to set and dry, where the methods include preparation of a coldset printing ink composition that contains from 5 wt % to 60 wt % NAD or 10 wt % to 50 wt % NAD or 15 wt % to 40 wt % NAD or 30 wt % to 60 wt % NAD based on the weight of the ink composition, and printing the coldset printing ink onto a substrate. Such coldset printing ink compositions containing NAD yield printed inks that have rub resistance values after 15 minutes that are equal or better than ink compositions containing no NAD after 24 hours.

Also provided are substrates printed using a coldset lithographic process that include a coldset printing ink film on at least one surface thereof, where the coldset printing ink that formed the film contains from 5 wt % to 60 wt % NAD, preferably between 10 wt % to 40 wt % or 15 wt % to 35 wt % NAD or 30 wt % to 60 wt % NAD based on the weight of the ink composition.

Also provided are methods of printing a substrate using a coldset lithographic process, comprising depositing on a substrate a coldset printing ink composition that contains from 5 wt % to 60 wt % NAD, preferably between 10 wt % to 40 wt % or 15 wt % to 35 wt % NAD or 30 wt % to 60 wt % NAD based on the weight of the ink composition.

EXAMPLES

The following examples illustrate specific aspects of the present invention and are not intended to limit the scope thereof in any respect and should not be so construed.

Example 1

An exemplary non-aqueous dispersion of an acrylic core/shell polymer (NAD) was prepared. The acrylic shell polymer was synthesized containing the ingredients in Table 1.

TABLE 1

Acrylic shell polymer ingredients.

|    |   | Material | wt % |
|----|---|----------|------|
|    | A | Magie N-40 ink oil | 34.05 |
| MP | B | Isobutyl methacrylate | 39.58 |
|    | C | Dodecyl methacrylate | 13.56 |
|    | D | Acrylic acid | 1.08 |
| CP | E | Magie N-40 ink oil | 10.837 |
|    | F | t-butyl peroctoate | 0.43 |
|    | G | t-butyl peroxybenzoate | 0.11 |
|    | H | Glycidyl methacrylate | 0.33 |
|    | I | Triphenylphosphine | 0.02 |
|    | J | p-Methoxyphenol | 0.003 |
|    |   | TOTAL (wt %) | 100.00 |

The following protocol was used to synthesize the shell polymer.

Ingredient A was charged to a reactor and heated to 120° C. and held in nitrogen gas. Ingredients B, C and D were pre-mixed to form a monomer pre-mixture (MP). Ingredients E, F and G were pre-mixed to form a catalyst pre-mixture (CP). Thereafter, pre-mixtures MP and CP were concurrently added to the reactor from separate feeds over 4 hours and held at 120° C. for 4 hours. Then, the nitrogen gas was changed to air and ingredients H, I and J were charged to the reactor and the temperature was held at 120° C. for 4 hours. The air was then vacuumed for 30 minutes and the temperature cooled to 100° C. followed by discharging the resulting product (shell polymer).

The formation of the acrylic core polymer and NAD was carried out using the materials described in Table 2.

TABLE 2

Acrylic Core polymer and NAD ingredients.

|     |   | Material | wt % |
|-----|---|----------|------|
|     | A | Magie #N-40 ink oil | 32.64 |
|     | B | Shell polymer (Table 1) | 31.47 |
| MP  | C | Methylmethacrylate | 13.30 |
|     | D | N-butyl methacrylate | 5.36 |
|     | E | N-butyl acrylate | 6.57 |
| CP1 | F | Magie #N-40 ink oil | 5.24 |
|     | G | t-butyl peroctoate | 0.26 |
|     | H | t-butyl peroctoate | 0.14 |
|     | I | Methylmethacrylate | 2.56 |
| CP3 | J | t-butyl peroctoate | 0.13 |
|     | K | Magie #N-40 ink oil | 2.33 |
|     |   |          | 100.00 |

The components for synthesis of the acrylic core polymer include the monomer pre-mixture (MP), the catalyst pre-mixture 1 (CP1), catalyst pre-mixture 3 (CP3), additional monomer (Component H) and additional catalyst (Component I). The acrylic core polymer is formed in the presence of the acrylic shell polymer (Component B, from Table 1) in the continuous phase containing the essentially non-aqueous organic solvent (Component A, Magie #N-40 ink oil). The acrylic core polymer is insoluble in the continuous phase of the essentially non-aqueous solvent but is soluble in the acrylic shell polymer and the acrylic shell polymer is soluble in the continuous phase of the essentially non-aqueous solvent and forms particles of acrylic core/shell polymer in the continuous phase of the essentially non-aqueous solvent. The NAD contains the dispersion of the acrylic core/shell polymer particles in the continuous phase of the essentially non-aqueous solvent and residual rheology adjusting component.

The formation of the acrylic core polymer and the final NAD were carried out according to the following protocol. Ingredients A and B were charged to a reactor and heated to 85° C. and held in nitrogen gas. Ingredients C and D and E were pre-mixed to form a monomer pre-mixture (MP). Ingredients F and G were pre-mixed to form a catalyst pre-mixture 1 (CP1). Ingredients J and K were pre-mixed to form a catalyst pre-mixture 3 (CP3). Thereafter, pre-mixtures MP and CP1 were concurrently added from separate feeds to the reactor over 4 hours and held at 85° C. for 3 hours. Then, ingredient I was charged followed by pre-mixture CP3 drip-wise and the mixture was held for 3 hours. The presence of residual monomers was checked with gas chromatography and the resultant product (NAD) was brought to room temperature and discharged.

In this Example, the continuous phase of essentially non-aqueous solvent used was a common hydrocarbon solvent, Magie N-40 oil. The shell polymer was made up of a copolymer of isobutyl methacrylate and dodecyl methacrylate in a ratio of approximately 3:1. The long hydrocarbon chains on these monomers make the resulting polymer readily soluble in the mineral oil. Approximately 1 wt % acrylic acid based on the weight of the reaction mixture was added to aid in efficient polymer formation. A small amount of glycidyl methacrylate was added because the epoxy groups in this monomer increase the attraction between the acrylic shell and acrylic core polymers.

Example 2

An exemplary non-aqueous dispersion of an acrylic core/shell polymer (NAD) was prepared. The shell polymer was synthesized containing the ingredients in Table 3.

TABLE 3

Shell polymer ingredients.

| | | Material | wt % |
|---|---|---|---|
| MP | A | Nytex 5130 | 34.03 |
| | B | Isobutyl methacrylate | 39.25 |
| | C | Dodecyl methacrylate | 13.50 |
| | D | Acrylic acid | 1.07 |
| CP | E | Nytex 5130 | 9.79 |
| | F | t-butyl peroctoate (50% conc.) | 0.83 |
| | G | t-butyl peroxybenzoate | 0.11 |
| | H | t-butyl peroctoate (50% conc.) | 0.42 |
| WT | I | Water | 0.75 |
| | J | KOH [85%] | 0.09 |
| | K | Isopropyl alcohol | 0.06 |
| | L | Diethylamine | 0.1 |
| | | TOTAL (wt %) | 100.00 |

A shell polymer was synthesized according to the following protocol. Ingredient A was charged to a reactor and heated to 120° C. and held in nitrogen gas. Ingredients B, C and D were pre-mixed to form a monomer pre-mixture (MP). Ingredients E, F and G were pre-mixed to form a catalyst pre-mixture (CP). Thereafter, pre-mixtures MP and CP were concurrently added from separate feeds to the reactor over 4 hours and held at 120° C. for 4 hours. Then, the nitrogen gas was changed to air and the reaction was held for an hour at 120° C. Ingredient H then was added to the reaction vessel and the temperature was held at 120° C. for an additional 2 hours. Ingredients I, J, K and L were premixed in a separate addition vessel and were then slowly added to the reaction mixture under reflux conditions. Foaming that occurred was controlled by adjusting the addition rate. After addition of the ingredients to the vessel was complete, the reaction vessel was held for an hour at 120° C. and then cooled down to 90° C. to allow discharging the resulting product (shell polymer).

The formation of the acrylic core polymer and final NAD were carried out using the materials described in Table 4.

TABLE 4

Acrylic core polymer and NAD ingredients.

| | | Material | wt % |
|---|---|---|---|
| MP | A | Nytex 5130 | 32.00 |
| | B | Shell polymer (Table 3) | 32.04 |
| | C | Methylmethacrylate | 15.73 |
| | D | N-butyl methacrylate | 5.32 |
| | E | N-butyl acrylate | 6.23 |
| CP1 | F | Nytex 5130 | 6.50 |
| | G | t-butyl peroctoate (50% conc.) | 0.51 |
| | H | t-butyl peroxybenzoate | 0.25 |
| CP2 | I | t-butyl peroctoate (50% conc.) | 0.28 |
| | J | t-butyl peroxybenzoate | 0.14 |

TABLE 4-continued

Acrylic core polymer and NAD ingredients.

| | | Material | wt % |
|---|---|---|---|
| WT | K | Water | 0.75 |
| | L | KOH [85%] | 0.09 |
| | M | Isopropyl alcohol | 0.06 |
| | N | Diethylamine | 0.1 |
| | | TOTAL (wt %) | 100.00 |

The components for synthesis of the acrylic core polymer include the monomer pre-mixture (MP), the catalyst pre-mixture 1 (CP1) and catalyst pre-mixture 2 (CP2). The acrylic core polymer is formed in the presence of the acrylic shell polymer (Component B, from Table 3) in the continuous phase containing the essentially non-aqueous organic solvent (Component A, Nytex 5130). The acrylic core polymer is insoluble in the continuous phase of the essentially non-aqueous solvent but is soluble in the acrylic shell polymer and the acrylic shell polymer is soluble in the continuous phase of the essentially non-aqueous solvent and forms particles of acrylic core/shell polymer in the continuous phase of the essentially non-aqueous solvent. The rheology adjusting component includes water, KOH, isopropyl alcohol and diethyl amine (Components K through N), which is added to modify the rheology of the dispersion, e.g., to increase the apparent viscosity. The NAD contains the dispersion of the acrylic core/shell polymer particles in the continuous phase of the essentially non-aqueous solvent and residual rheology adjusting component.

The formation of the acrylic core polymer and NAD was carried out using the following protocol.

Ingredients A and B were charged to a reactor and heated to 120° C. and held in nitrogen gas. Ingredients C and D and E were pre-mixed to form a monomer pre-mixture (MP). Ingredients F, G and H were pre-mixed to form a catalyst pre-mixture 1 (CP1). Ingredients I and J were pre-mixed to form a catalyst pre-mixture 2 (CP2). Thereafter, pre-mixtures MP and CP1 were concurrently added from separate feeds to the reactor over 3 hours and held at 120° C. for 3 hours. Then, the nitrogen gas was changed to air and the reaction was held for an hour at 120° C. Then, the pre-mixture CP2 was charged drip-wise and the mixture was held for 3 hours. Finally the ingredients K, L, M, and N were premixed and added slowly to the reaction vessel under reflux conditions. The foaming that occurred was controlled by adjusting the addition rate. The reaction vessel was held for an hour at 120° C. and then cooled down to 90° C. to allow discharging the resulting product (NAD).

The continuous phase of essentially non-aqueous solvent used in this Example is the common hydrocarbon solvent Nytex 5130. The shell polymer is made up of a copolymer of isobutyl methacrylate and dodecyl methacrylate in a ratio of approximately 3:1. The long hydrocarbon chains on these monomers make the resulting polymer readily soluble in the mineral oil. Approximately 1% of acrylic acid based on the weight of the reaction mixture was added to aid in efficient polymer formation. The viscosity of the composition was modified by adding a mixture of water, isopropyl alcohol, KOH and diethylamine (shown in Table 4 as items K through N).

Example 3

Typical commercially available sheetfed printing inks require drier and anti-oxidant in order to properly polymerize to dry the ink. A print trial was performed to demonstrate that commercially available sheetfed printing inks without NAD will not polymerize unless they contain drier and anti-oxidant. A commercial sheetfed printing inks, Sunlit Exact (Sun Chemical Corporation, Parsippany, N.J., USA) containing anti-oxidant and a combination cobalt/manganese drier in an amount that is from 1 wt % to 4 wt % based on the weight of the ink composition was used and compared to the same commercial sheetfed printing ink, Sunlit Exact, with the drier and anti-oxidant removed.

The sheetfed printing inks were printed with an ink film weight of about 1.5 g/m$^2$ using a Prüfbau printing machine. Rub resistance of these prints was assessed with a Prüfbau Quartant abrasion testing instrument (100 strikes, P=0.05 bar). Rub test results were assessed visually and assigned a number from 0 to 5 based on the amount of ink that rubbed off during the test. A rating of 0 indicates no visual rub off detected, while a rating of 5 indicates severe rub off. Depending on end use applications and customer requirements, a rub rating of 2 or lower is considered a passing result. There may be applications, however, where a rub rating of higher than 2 would be acceptable. Delta E CMC values can be used for more quantitative values.

The rub resistance tests of the sheetfed printing ink Sunlit Exact with and without drier and anti-oxidant were performed after 30 minutes, 2 hours and 24 hours of printing. The results are provided in Table 5.

TABLE 5

Rub Resistance comparison between a standard sheetfed offset ink with drier and anti-oxidant vs. a standard ink without drier or anti-oxidant.

| | Average Rub Resistance | | |
|---|---|---|---|
| | 30 min | 2 hr | 24 hr |
| Sunlit Exact (Sun Chemical) | 4.08 | 2.79 | 1.92 |
| Sunlit Exact (Sun Chemical) w/o drier/anti-oxidant | 4.38 | 3.04 | 3.25 |

Rub resistance rated from 0 = no rub off; to 5 = severe rub off

From the data, it can be seen that the Sunlit Exact ink without drier and anti-oxidant has not sufficiently polymerized after 24 hours and as a consequence, exhibits poor rub resistance, while the standard Sunlit Exact ink containing drier and anti-oxidant exhibits progressive polymerization at 2 hours and 24 hours and as a result exhibits improving rub resistance. Even after 24 hours to dry, however, the conventional sheetfed printing ink without drier and anti-oxidant had a rub resistance value greater than 2.

Examples 4-15

Examples 4-15 describe the formulation and preparation of several sheetfed printing ink compositions. The formulations for sheetfed printing inks of Examples 4 to 8 are shown in Table 6. The ink compositions were prepared by mixing together ingredients A, B, C, D and E for 2 minutes at 3000 rpm using a Speedmixer™ DAC 150 FVZ from Hauschild. The mill base (MB) obtained then was passed over a three roller mill until obtaining a grain size measured on a NPIRI grind gauge below 20 μm (preferably below 10 μm). Ingredients F, G, H, J, K, L and M (taken together, if present, the letdown ingredients) and the NAD (item 1) were added to the mill base. Each of the inks then was homogenized by again mixing all the ingredients together for 2 minutes at 3000 rpm with the Speedmixer™.

The sheetfed printing ink of Example 4 is a comparative ink—it contains no NAD but does contain drier and anti-oxidant. Thus, the comparative ink of Example 4 is similar to commercial sheetfed printing inks, which usually contain a drier and an anti-oxidant. The sheetfed printing ink of Example 5 also is a comparative ink—it contains no NAD, and it contains no drier and no anti-oxidant. Thus, the comparative ink of Example 5 differs from commercial sheetfed printing inks in that it contains no drier and no anti-oxidant. The amount of cyan pigment, alkyd resin, heavy oil (Printosol 30/40 AP85 from Haltermann Products, Channelview, Tex.), wax paste (containing 55 wt % microcrystalline PE wax, 5 wt % PTFE wax, 38 wt % mineral oil and 2 wt % wetting additive based on the weight of the wax paste composition), anti-set off paste and water fighter (blown linseed oil) was maintained constant in these sheetfed printing inks. The sheetfed printing ink composition of Example 6 contained 10 wt % NAD, 1.1 wt % anti-oxidant and 1.1 wt % drier based on the weight of the ink composition. The sheetfed printing ink composition of Example 7 contained about 30 wt % NAD, 1.1 wt % anti-oxidant and 1.1 wt % drier based on the weight of the ink composition. The sheetfed printing ink composition of Example 8 contained about 30 wt % NAD based on the weight of the ink composition, no anti-oxidant and no drier. To account for the addition of NAD and/or removal of anti-oxidant and drier, the amount of mineral varnish 1 and mineral varnish 2 was varied in the sheetfed printing ink compositions of Example 4 to 8.

For the sheetfed printing ink compositions of Example 4 to 8, viscosity was measured using an AR 1000 rotational viscometer (TA Instruments, New Castle, Del., USA). All the samples were adjusted to have an approximately similar high shear viscosity (±10 cP when measured at 50 s$^{-1}$ at 23° C. Pa·s) so that differences observed on the examples cannot be attributed to differences in high shear viscosity.

Tack was evaluated on a Tack-o-scope device (Testprint, Inc., Cherry Hill, N.J.). As shown in Table 5, inks of Examples 1 to 3 all exhibited similar tack at 200 rpm.

TABLE 6

Exemplary sheetfed printing ink compositions.

| Item | Component | Example 4 (comparative) | Example 5 (comparative) | Example 6 | Example 7 | Example 8 |
|---|---|---|---|---|---|---|
| A | Cyan pigment | 18.00 | 18.00 | 18.00 | 18.00 | 18.00 |
| B | $^a$Mineral varnish 1 | 25.40 | 26.60 | 19.40 | | |
| C | $^b$Mineral varnish 2 | 33.00 | 33.00 | 33.00 | 33.00 | 33.00 |
| D | Alkyd resin | 5.00 | 5.00 | 5.00 | 5.00 | 5.00 |
| E | $^c$Heavy oil | 2.50 | 2.50 | 2.50 | 2.50 | 2.50 |
| MB | Mill Base (total of above components) | 83.90 | 85.10 | 77.90 | 58.50 | 58.50 |
| F | Mineral varnish 2 | 4.00 | 5.00 | | | 2.20 |
| G | Wax paste | 5.40 | 5.40 | 5.40 | 5.40 | 5.40 |

TABLE 6-continued

Exemplary sheetfed printing ink compositions.

| Item | Component | Example 4 (comparative) | Example 5 (comparative) | Example 6 | Example 7 | Example 8 |
|---|---|---|---|---|---|---|
| H | Anti set off paste | 2.50 | 2.50 | 2.50 | 2.50 | 2.50 |
| I | NAD (from Table 2) | — | — | 10.00 | 29.40 | 29.40 |
| J | Anti-oxidant | 1.10 | — | 1.10 | 1.10 | |
| K | Water fighter | 0.50 | 0.50 | 0.50 | 0.50 | 0.50 |
| L | Drier | 1.10 | — | 1.10 | 1.10 | |
| M | Emulsifier additive | 1.50 | 1.50 | 1.50 | 1.50 | 1.50 |
| | Total (wt %) | 100.00 | 100.00 | 100.00 | 100.00 | 100.00 |
| | Viscosity | | | | | |
| | High shear ($50\ s^{-1}$, 23° C. Pa·s) | 52 | 53 | 49 | 41 | 53 |
| | Low shear ($2\ s^{-1}$, 23° C. Pa·s) | 70 | 67 | 86 | 170 | 208 |
| | Tack (200 rpm) | 90 | 90 | 167 | 156 | 160 |

[a] Mineral varnish 1 consists of 30-40 wt % rosin resin, 30-40 wt % mineral oil, 15-25 wt % linseed oil and 10-20 wt % alkyd based on the weight of the varnish.
[b] Mineral varnish 2 consists of 40-50 wt % rosin resin, 40-50 wt % mineral oil, 5-15 wt % linseed oil and 1-5% soya oil based on the weight of the varnish.
[c] Heavy Oil: Printosol 30/40 AP85 (Haltermann).

The sheetfed printing ink compositions of Examples 4 to 8, shown in Table 6, were printed with an ink film weight of about 1.5 g/m² using a Prüfbau printing machine. Rub resistance of these prints was assessed with a Prüfbau Quartant abrasion testing instrument (100 strikes, P=0.05 bar). Table 7 provides rub test results for the inks described in Table 5. Rub test results were assessed visually and assigned a number from 0 to 5 based on the amount of ink that rubbed off during the test. A rating of 0 indicates no visual rub off detected, while a rating of 5 indicates severe rub off. Delta E CMC values also can be used for more quantitative values.

TABLE 7

Influence on rub resistance of the addition of NAD to sheetfed printing ink compositions containing drier and anti-oxidant.

| | Example 4 (comparative) | Example 6 | Example 7 |
|---|---|---|---|
| wt % NAD (from Table 2) | 0 | 10.00 | 29.40 |
| Rub resistance 2 hr | 4 | 3 | 1.5 |
| Rub resistance 24 hr | 0.5 | 1 | 1.5 |

Rub resistance rated from 0 = no rub off; to 5 = severe rub off

The sheetfed printing ink composition of Example 6 is a sheetfed printing ink composition similar to those described in the international patent publication WO09155201A containing 10 wt % NAD based on the weight of the ink along with metal drier and anti-oxidant. The sheetfed printing ink composition of Example 7 contains a higher amount of NAD but still contains drier and anti-oxidant. The increased amount of NAD in the sheetfed printing ink composition of Example 7 leads to an improvement of the rub resistance in comparison to the rub resistance of the sheetfed printing ink composition of Example 6.

The sheetfed printing ink composition of Example 8 differs from the sheetfed printing ink composition of Example 7 in that it does not contain drier or anti-oxidant. Table 8 provides rub test results for the sheetfed printing ink compositions of the comparative ink formulation of Example 5 and inks of Examples 7 and 8, which contain NAD. As can be seen in Table 8, the rub resistance of the sheetfed printing ink composition ink composition of Example 8 (no drier or anti-oxidant) after 2 hours and after 24 hours is equal to or slightly better than the sheetfed printing ink composition of Example 7, which contains drier. This trial demonstrates that sheetfed printing ink compositions containing 15 wt % to 60 wt % NAD, preferably 25 wt % to 35 wt % NAD based on the weight of the ink composition, will set and dry properly and exhibit good rub resistance without the need for driers and anti-oxidant.

TABLE 8

Influence on rub resistance of the addition of NAD to sheetfed printing ink compositions that do not contain drier nor anti-oxidant.

| | Example 5 (Comparative) | Example 7 | Example 8 |
|---|---|---|---|
| wt % NAD (from Table 2) | 0 | 29.40 | 29.40 |
| wt % Drier | 0 | 1.1 | 0 |
| wt % Anti-oxidant | 0 | 1.1 | 0 |
| Rub resistance 2 hr | 4 | 1.5 | 1 |
| Rub resistance 24 hr | 1 | 1.5 | 1 |

Rub resistance rated from 0 = no rub off; to 5 = severe rub off

To confirm these results, two different sets of sheetfed printing ink compositions were prepared using the protocol set forth above. The two sets of sheetfed printing ink compositions differ in that the sheetfed printing ink compositions of Examples 9 to 12 contain drier/anti-oxidant and about 10 wt % NAD, based on the weight of the ink composition, while the sheetfed printing ink compositions of Examples 13 to 16 contain about 25 wt % to 30 wt % NAD based on the weight of the ink composition but contain no drier and no anti-oxidant. The formulations for sheetfed printing ink compositions of Examples 9 to 12 are provided Tables 9 and the formulations for sheetfed printing ink compositions of Examples 13 to 16 are provided in Table 10.

TABLE 9

Four color process inks containing 10 wt % NAD, drier and anti-oxidant.

| | Example 9 | Example 10 | Example 11 | Example 12 |
|---|---|---|---|---|
| Black pigment | 22.00 | | | |
| Cyan pigment | | 18.00 | | |

TABLE 9-continued

Four color process inks containing 10 wt % NAD, drier and anti-oxidant.

|  | Example 9 | Example 10 | Example 11 | Example 12 |
|---|---|---|---|---|
| Magenta pigment |  |  | 18.50 |  |
| Yellow pigment |  |  |  | 12.50 |
| Clay |  |  |  | 2.00 |
| [a]Mineral varnish 1 | 14.10 | 19.40 | 26.00 | 13.50 |
| [b]Mineral varnish 2 | 26.00 | 33.00 | 26.00 | 29.60 |
| Alkyd Resin | 8.00 | 5.00 |  |  |
| Heavy oil | 3.00 | 2.50 |  |  |
| Mineral oil |  |  | 3.00 |  |
| Mill Base (total of above components) | 73.10 | 77.90 | 73.50 | 57.60 |
| Mineral varnish 1 |  |  |  | 18.50 |
| Wax paste | 5.50 | 5.40 | 5.90 | 6.00 |
| Anti set off paste | 2.50 | 2.50 | 2.50 | 3.00 |
| NAD (from Table 2) | 10.00 | 10.00 | 10.00 | 10.00 |
| Blue Toning | 5.00 |  |  |  |
| Drier | 1.40 | 1.10 | 0.80 | 1.00 |
| Anti-oxidant | 0.70 | 1.20 | 1.20 | 1.00 |
| Emulsifier | 1.50 | 1.50 | 1.50 | 1.00 |
| Mineral oil | 3.00 | 3.00 | 6.00 | 3.00 |
| Total (% recipe) | 102.70 | 102.60 | 101.40 | 101.10 |
| High shear viscosity (50 s$^{-1}$, 23° C. Pa · s) | 33 | 44 | 55 | 40 |
| Low shear viscosity (2 s$^{-1}$, 23° C. Pa · s) | 62 | 77 | 110 | 60 |
| Tack (200 rpm) | 141 | 149 | 119 | 165 |

[a]Mineral varnish 1 contains 30-40 wt % rosin resin; 30-40 wt % mineral oil; 15-25 wt % linseed oil; and 10-20 wt % alkyd based on the weight of the varnish.
[b]Mineral varnish 2 contains 40-50 wt % rosin resin; 40-50 wt % mineral oil; 5-15 wt % linseed oil; and 1-5 wt % soya oil based on the weight of the varnish.

TABLE 10

Four color process inks containing 25 wt %-30 wt % NAD without drier or anti-oxidant.

|  | Example 13 | Example 14 | Example 15 | Example 16 |
|---|---|---|---|---|
| Black pigment | 22.00 |  |  |  |
| Cyan pigment |  | 18.00 |  |  |
| Magenta pigment |  |  | 18.50 |  |
| Yellow pigment |  |  |  | 12.50 |
| Clay |  |  |  | 2.00 |
| [a]Mineral varnish 1 |  |  |  | 13.00 |
| [b]Mineral varnish 2 | 26.00 | 33.00 | 32.00 | 29.60 |
| Alkyd | 10.00 | 7.00 | 7.00 |  |
| Heavy oil | 3.00 | 2.50 |  |  |
| Mineral oil |  |  | 2.00 |  |
| Mill Base (total of above components) | 61.00 | 60.50 | 59.50 | 57.10 |
|  | 1.00 | 1.00 | 1.00 | 1.00 |
| Wax paste | 5.50 | 5.40 | 5.90 | 6.00 |
| Anti set off paste | 2.50 | 2.50 | 2.50 | 3.00 |
| NAD (from Table 2) | 25.00 | 30.00 | 30.00 | 30.00 |
| Blue Toning | 5.00 |  |  |  |
| Emulsifier | 1.50 | 1.50 | 1.50 | 1.00 |
| Mineral oil |  |  |  | 2.00 |
| Water fighter | 0.50 | 0.50 |  |  |
| Total (% recipe) | 101.00 | 100.40 | 99.40 | 99.10 |
| High shear viscosity (50 s-1, 23° C. Pa · s) | 28 | 38 | 49 | 42 |
| Low shear viscosity (2 s-1, 23° C. Pa · s) | 68 | 98 | 139 | 234 |
| Tack (200 rpm) | 158 | 164 | 174 | 174 |

[a]Mineral varnish 1 contains 30-40 wt % rosin resin; 30-40 wt % mineral oil; 15-25 wt % linseed oil; and 10-20 wt % alkyd based on the weight of the varnish.
[b]Mineral varnish 2 contains 40-50 wt % rosin resin; 40-50 wt % mineral oil; 5-15 wt % linseed oil; and 1-5 wt % soya oil based on the weight of the varnish.

Sheetfed Lithographic Printing Press Trials

Prints using a sheetfed lithographic printing process were made using the sheetfed printing ink compositions of Examples 9 to 12 and Examples 13 to 16. In the sheetfed lithographic printing press trials, the sheetfed printing ink compositions of Examples 9 to 12 of Table 9 and Examples 13 to 16 of Table 10 were printed using a sheetfed lithographic printing process on a Heidelberg MO press with the following optical densities (Y=1.3; M=1.45; C=1.5; and K=1.9). Prints were prepared on two paper substrates: Magnostar 115 g/m$^2$ (Sappi) and Maxigloss 200 g/m$^2$ (IGEPA).

Rub resistance of the printed substrates was assessed using a Prüfbau Quartant abrasion testing instrument and a Sutherland® ink rub tester. Rub resistance tests were performed 15 minutes, 1 hour, 2 hours and 24 hours after printing. The results of the rub resistance tests are shown in Table 11.

TABLE 11

Comparison of the time evolution of the rub resistance of comparative sheetfed printing inks and increased NAD-containing inks.

| Time after printing | Average Rub Resistance | |
|---|---|---|
|  | Examples 9 to 12 (10 wt % NAD) | Examples 13 to 16 (25 wt %-30 wt % NAD) |
| 15 minutes | 1.75 | 0.55 |
| 1 hour | 1.45 | 0.4 |
| 2 hour | 1.45 | 0.1 |
| 24 hour | 0.75 | 0.75 |

Rub resistance rated from 0 = no rub off; to 5 = severe rub off

The results in Table 11 demonstrate that the sheetfed printing ink compositions provided herein containing a preferred amount of NAD and no drier or anti-oxidant (sheetfed printing inks of Examples 13 to 16) exhibit rub resistance values equal to or better than comparative inks that contain drier or anti-oxidant (sheetfed printing inks of Examples 9 to 12) very soon after printing (15 minutes) as well as after 1, 2 and 24 hours.

Since sheetfed printing inks of Examples 13 to 16 (containing from 25 wt % to 30 wt % NAD based on the weight of the ink composition but no drier nor anti-oxidant) exhibit good rub resistance 15 minutes after printing using a sheetfed lithographic printing process and at subsequent time intervals, it is evident that sheetfed printing inks can be formulated without drier while still quickly exhibiting good drying properties, provided sufficient NAD is incorporated into the formula. In the exemplary sheetfed printing ink compositions, sheetfed printing inks containing from 25 wt % to about 30 wt % NAD based on the weight of the ink composition can be formulated without drier that quickly exhibit very good drying properties.

Examples 17-24

Heatset Printing Ink Preparation

Examples 17 to 24 describe the formulation and preparation of several heatset printing ink compositions. The formulations for heatset printing inks of Examples 17 to 22 are shown in Table 12. Example 17 is a comparative ink that contains no NAD. The heatset printing ink compositions were prepared by weighing all the raw materials together and mixing them at 3000 rpm for 2 minutes with a Speedmixer™ DAC 150 FVZ from Hauschild. A homogeneous mixture was obtained.

TABLE 12

Magenta ink formulations.

| Component | Example 17 (comparative) | Example 18 | Example 19 | Example 20 | Example 21 | Example 22 |
|---|---|---|---|---|---|---|
| Magenta base | 34.00 | 34.00 | 34.00 | 34.00 | 34.00 | 34.00 |
| [a]Rosin resin varnish | 49.50 | 42.50 | 35.00 | 28.50 | 20.50 | 11.50 |
| Mineral oil | 12.00 | 9.00 | 6.50 | 3.00 | 1.00 | |
| [b]Antioxidant | 0.50 | 0.50 | 0.50 | 0.50 | 0.50 | 0.50 |
| Wax paste | 4.00 | 4.00 | 4.00 | 4.00 | 4.00 | 4.00 |
| NAD (table 4) | 0 | 10.00 | 20.00 | 30.00 | 40.00 | 50.00 |
| wt % | 100.00 | 100.00 | 100.00 | 100.00 | 100.00 | 100.00 |

[a]Rosin resin varnish contains 51.5% rosin resin; 45.6% mineral oil; 5% linseed oil; 0.9% aluminum chelate based on the weight of the varnish.
[b]BHT.

The heatset printing ink compositions of Examples 17 to 22 used flush pigment although dry grind pigments also could have been used. In order to introduce up to 50 wt % NAD based on the weight of the ink composition, the amounts of rosin resin varnish and mineral oil were both, in parallel, reduced in order to yield a comparable high shear viscosity for all of the different heatset printing inks. All the heatset printing ink compositions were adjusted to a similar high shear viscosity range so that differences observed amongst the heatset printing ink compositions cannot be attributed to any high shear viscosity difference.

Heatset Lithographic Printing Press Trials

Proof prints were printed in the lab using a Prüfbau device that was equipped with a small heatset oven that simulates the drying using in a heatset lithographic printing process. The temperature of the printed substrate, such as paper, could be adjusted and controlled at the end of the oven by use of an IR thermometer that measured the paper temperature. Heatset printing inks were printed on a low weight coated stock Bavaria 70 g/m² from Papier Union at 1.3 g/m².

Rub resistance testings of prints were performed on 2 different devices: the Sutherland® ink rub tester and a Prüfbau Quartant abrasion testing instrument. For the Sutherland® ink rub resistance tests, the printed sheet was fixed to the moving device whereas the plain Maxigloss 200 g/m² from IGEPA was fixed to the still surface. Fifty strikes were performed using a 910 g weight. For the Prüfbau Quartant tests, the printed paper was fixed to the still surface whereas the plain paper APCO II from Scheufelen was fixed to the moving device. Thirty strikes were performed.

The testing on both devices was performed at room temperature and results were evaluated visually on a scale of 0-10, with 0 representing no rub-off, 5 representing moderate rub-off, and 10 representing very severe rub-off.

Rub resistance tests were performed at 1 minute after printing to simulate the immediate rub resistance and at 24 hours after printing to evaluate the final rub resistance of the prints. In these tests, the printed paper was not dried in an oven. The rub resistance results are shown in Table 13. An average rub resistance value of 4 is considered by many print customers to be trouble-free.

TABLE 13

Influence of the introduction of 10% NAD on rub resistance 1 minute after printing when printed sheets were not dried through the oven.

| Rub Resistance Test | Example 17 (comparative) | Example 18 |
|---|---|---|
| wt % NAD | 0 | 10 |
| Sutherland rub mark | 8 | 9 |
| Prüfbau rub mark | 8 | 6 |
| Average rub mark | 8 | 7.5 |

The comparison of the rub resistance values 1 minute after printing without oven drying between the comparative heatset printing ink of Example 17, a heatset printing ink containing no NAD, and the heatset printing ink composition of Example 18 containing 10 wt % NAD based on the weight of the ink composition, demonstrated that NAD, at levels of 10 wt % based on the weight of the ink composition, improves the short term rub resistances when a printed heatset printing ink is not dried by passing through an oven.

The influence of increasing the amount of NAD in a heatset printing ink composition on the rub resistance of the printed ink is shown in Table 14. Although the rub resistance improvement observed in Table 13 for a heatset printing ink composition containing 10 wt % NAD was somewhat limited in comparison to the ink without NAD, the data in Table 14 demonstrates that increasing the amount of NAD in the heatset printing ink composition results in increasing improvements in the rub resistance after 1 minute when the printed substrate does not go through the oven.

TABLE 14

Influence of 0 wt % to 50 wt % NAD on rub resistance of heatset printing inks 1 minute after printing when printed sheets were not dried through the oven.

| Rub Resistance Test | Example 17 (comparative) | Example 18 | Example 19 | Example 20 | Example 21 | Example 22 |
|---|---|---|---|---|---|---|
| wt % NAD | 0 | 10 | 20 | 30 | 40 | 50 |
| Sutherland rub mark | 8 | 9 | 8 | 7 | 5 | 5 |
| Prüfbau rub mark | 8 | 6 | 5 | 5 | 3 | 3 |
| Average rub mark | 8 | 7.5 | 6.5 | 6 | 4 | 4 |

As the amount of NAD was increased from 10 wt % based on the weight of the ink composition in the heatset printing ink composition of Example 18 to 50 wt % based on the weight of the ink composition in the heatset printing ink composition of Example 22, the rub resistance of the printed substrate made using the heatset printing inks was continuously improved. For the heatset printing ink compositions, little improvement in rub resistance was observed between the heatset printing ink composition of Example 21, containing 40 wt % NAD based on the weight of the ink composition, and the ink of Example 22, containing 50 wt % NAD based on the weight of the ink composition. From these results, it can be concluded for the tested heatset printing ink compositions that 40 wt % NAD based on the weight of the ink composition provides an optimum rub resistance 1 minute after printing when the printed substrate is not subjected to an external energy such as passing through an oven (or passing through an oven that is turned off).

Samples printed with heatset printing ink compositions of Example 17 and Example 18 were thermally treated by passing the printed substrates through the oven under standard conditions (paper temperature=100° C. at the exit of the oven). The results are shown in Table 15.

TABLE 15

Influence of 10 wt % NAD based on the weight of the ink composition on rub resistance 1 minute after printing when printed sheets achieved a temperature of 100° C. at the exit of the oven.

| Rub Resistance Test | Example 17 (comparative) | Example 18 |
|---|---|---|
| wt % NAD | 0 | 10 |
| Sutherland rub mark | 4 | 5 |
| Prüfbau rub mark | 4 | 3 |
| Average rub mark | 4 | 4 |

The data in Table 15 demonstrate that the heatset printing ink of Example 18 containing 10 wt % NAD based on the weight of the ink composition has a rub resistance similar to the comparative heatset printing ink of Example 14 containing no NAD when the printed samples are heat treated in an oven using conventional processing conditions.

The effect of heat treatment on heatset printing ink compositions containing increasing amounts of NAD also was tested. Substrates printed with heatset printing ink compositions of Examples 17 to 22 were thermally treated by passing the printed substrates through the oven under standard conditions (paper temperature=100° C. at the exit of the oven). The results are shown in Table 16.

TABLE 16

Influence of the introduction of 10 wt % to 50 wt % NAD based on the weight of the ink composition on rub resistance 1 minute after printing when printed sheets achieved a temperature of 100° C. at the exit of the oven.

| Rub Resistance Test | Example 17 (comparative) | Example 18 | Example 19 | Example 20 | Example 21 | Example 22 |
|---|---|---|---|---|---|---|
| wt % NAD | 0 | 10 | 20 | 30 | 40 | 50 |
| Sutherland rub mark | 4 | 5 | 5 | 5 | 5 | 3 |
| Prüfbau rub mark | 4 | 3 | 4 | 3 | 2 | 2 |
| Average rub mark | 4 | 4 | 4.5 | 4 | 3.5 | 2.5 |

The data in Table 16 demonstrate that when the heatset printing inks containing NAD are dried through the oven, heatset printing inks containing NAD below 30 wt % based on the weight of the ink composition exhibit a very similar rub resistance. As the amount of NAD in the heatset printing ink is increased, for example, in amounts greater than 30 wt % NAD based on the weight of the ink composition, the rub resistance of the heatset printing ink composition on the printed substrate after 1 minute is improved in comparison to the comparative heatset printing ink of Example 17 containing no NAD.

For illustration, the importance of exposure of a traditional heatset printing ink composition to external energy to set and dry the ink was demonstrated. A printed substrate printed with a heatset printing ink composition containing no NAD (comparative heatset printing ink of Example 17) and a substrate printed with a heatset printing ink composition containing NAD (heatset printing ink of Example 21, containing 40 wt % NAD based on the weight of the ink composition) were compared before exposing the printed substrate to external energy (e.g., passing through an oven) and after exposing the printed substrate to external energy. The results are shown in Table 17.

TABLE 17

Comparison of rub resistances 1 minute after printing of a conventional heatset printing ink containing no NAD (Example 17) and an NAD containing ink (Example 21, 40 wt % NAD). Both inks were dried either without oven or by passing through an oven to achieve a paper temperature of 100° C. at the exit of the oven.

| Paper T at Exit of the Oven (° C.) | Rub Resistance Test (Performed at Room Temp.) | Example 17 (comparative) | Example 21 |
|---|---|---|---|
| Without oven T = 23° C. | Sutherland rub mark | 8 | 5 |
| | Prüfbau rub mark | 8 | 3 |
| | Average rub mark | 8 | 4 |
| With oven T = 100° C. | Sutherland rub mark | 4 | 5 |
| | Prüfbau rub mark | 4 | 3 |
| | Average rub mark | 4 | 4 |

The data of Table 17 illustrate the dependence of conventional heatset printing inks to energy exposure, such as to heat in an oven, in order to set and dry, as exhibited by rub resistance. For the comparative heatset printing ink of Example 17, which contains no NAD, the rub resistance after 1 minute is significantly improved when the printed sheet is exposed to thermal energy by heating in the oven. Sheets printed with the heatset printing ink containing NAD (heatset printing ink of Example 21), however, exhibit a similar rub resistance whether or not the printed substrate is exposed to thermal energy by passing through the oven. For the tested heatset printing ink compositions, the average value of the rub resistance after 1 minute for the substrate printed with the heatset printing ink composition of Example 21 (containing NAD) without energy exposure (no oven treatment) is equal to the rub resistance of the conventional heatset printing ink with energy exposure (with oven treatment).

The 1 minute rub resistance values obtained for substrates printed with heatset printing ink compositions of Examples 17 to 22 are provided in Table 18. As demonstrated by the data, a continuous improvement of the rub resistance values without oven treatment is observed in the neatest printing ink compositions of Examples 18 to 22. For the tested heatset printing ink compositions containing NAD, immediate rub resistance comparable to that obtained in the comparative heatset printing ink of Example 17 when dried through an oven can be achieved without heat treatment by including 30 wt % to 50 wt % NAD based on the weight of the ink composition. Thus, exemplary heatset printing ink compositions containing at least 30 wt % NAD based on the weight of the ink composition can be formulated to eliminate the need for application of external energy to set and dry the ink and thus to eliminate ovens or IR or UV dryers.

TABLE 18

Rub resistance measurements performed 1 minute after printing.

| Paper T at End of the Oven (° C.) | Rub Test (performed at room T) | Example | | | | | |
|---|---|---|---|---|---|---|---|
| | | 17 | 18 | 19 | 20 | 21 | 22 |
| Without oven T = 23° C. | Sutherland rub mark | 8 | 9 | 8 | 7 | 5 | 5 |
| | Prüfbau rub mark | 8 | 6 | 5 | 5 | 3 | 3 |
| | Average rub mark | 8 | 7.5 | 6.5 | 6 | 4 | 4 |

TABLE 18-continued

Rub resistance measurements performed 1 minute after printing.

| Paper T at End of the Oven (° C.) | Rub Test (performed at room T) | Example |  |  |  |  |  |
|---|---|---|---|---|---|---|---|
|  |  | 17 | 18 | 19 | 20 | 21 | 22 |
| With oven T = 100° C. | Sutherland rub mark | 4 | 5 | 5 | 5 | 5 | 3 |
|  | Prüfbau rub mark | 4 | 3 | 4 | 3 | 2 | 2 |
|  | Average rub mark | 4 | 4 | 4.5 | 4 | 3.5 | 2.5 |

For the heatset printing ink compositions of Examples 18 to 20, the improvement of rub resistance may not be sufficient to completely turn off the oven. In view of the improvement in set and apparent dryness (improved rub resistance), the amount of external energy required to dry the heatset printing ink compositions of Examples 18 to 20 likely is reduced, and thus heatset printing ink compositions containing from 10 wt % to 30 wt % NAD based on the weight of the ink composition could allow the printer to reduce its oven temperature, thereby reducing the energy consumption required to set and dry the printed substrate.

Heatset printing ink compositions containing NAD, particularly containing greater than 30 wt % NAD, such as at least 40 wt % NAD based on the weight of the ink composition, when printed on a substrate under standard conditions (when dried using an oven) demonstrated improved immediate rub resistance when compared to a control heatset printing ink containing no NAD. These results are shown in Table 19.

TABLE 19

Comparison of the time evolution of the rub resistance of a conventional heatset printing ink and a heatset ink with NAD. The inks did not go through the oven.

| Time After Printing | Rub Test (Performed at Room T) | Example 17 (comparative) | Example 21 |
|---|---|---|---|
| 1 minute | Sutherland rub mark | 8 | 5 |
|  | Prüfbau rub mark | 8 | 3 |
|  | Average rub mark | 8 | 4 |
| 24 hours | Sutherland rub mark | 4 | 4 |
|  | Prüfbau rub mark | 2 | 3 |
|  | Average rub mark | 3 | 3.5 |

The data in Table 19 demonstrates that the printed ink of the heatset printing ink composition of Example 21 containing NAD quickly exhibits an excellent rub resistance. As shown, in 1 minute after printing, the heatset printing ink composition of Example 21 already achieved almost the same rub resistance value in 1 minute as is exhibited after 24 hours without application of external energy (e.g., drying in an oven). Without the oven treatment, the comparative ink that contains no NAD (Example 17) has at the very beginning (1 minute) a very poor rub resistance that slowly improves as the solvent evaporates and is absorbed by the substrate. After 24 hours, the comparative ink that contains no NAD (Example 17) finally exhibits a good rub resistance.

In order to demonstrate that the improvements in setting and drying, as exhibited by improved rub resistance, was valid for heatset printing inks containing pigments other than magenta, additional trials were performed using heatset printing ink formulations containing cyan pigment. The comparative heatset printing ink composition of Example 23 contains no NAD and the heatset printing ink composition of Example 24 contains about 30 wt % NAD based on the weight of the ink composition. The formulations of the cyan heatset printing ink compositions are shown in Table 20.

TABLE 20

Cyan ink formulation.

| Component | Example 23 (comparative) | Example 24 |
|---|---|---|
| Cyan base | 27.60 | 27.60 |
| Clay base | 4.50 | 4.50 |
| [a]Rosin resin varnish | 49.20 | 24.50 |
| Alkyd resin | 2.50 | 2.50 |
| Wax paste | 4.10 | 4.10 |
| Emulsifier | 4.40 | 4.40 |
| NAD | 0.00 | 30.00 |
| [b]Mineral solvent | 7.20 | 0 |
| [c]Anti-oxidant (BHT) | 0.50 | 0.50 |
| Total Weight (% Recipe) | 100.00 | 98.10 |

[a]Rosin resin varnish contains 51.5 wt % rosin resin; 45.6 wt % mineral oil; 5 wt % linseed oil; 0.9 wt % aluminum chelate based on the weight of the varnish.
[b]Mineral oil.

The heatset printing ink compositions of comparative Example 23 and Example 24 containing NAD were prepared by the same process as described above, replacing the magenta pigment with a cyan pigment. In order to include 30 wt % of NAD into the heatset printing ink composition of Example 24, the amounts of rosin resin varnish and mineral oil in the compositions were reduced in order to provide an ink with a comparable high shear viscosity.

Proof prints were printed in the lab using a Prüfbau device that was equipped with a small heatset oven that simulates the drying using in a heatset lithographic printing process. The heatset printing inks were printed on a low weight coated stock Bavaria 70 g/m² from Papier Union at 1.3 g/m². Rub resistance testings of prints were performed as described above at 1 minute and 24 hours after printing. The 1 minute rub resistance values obtained for substrates printed with heatset printing ink compositions of Examples 23 and 24 are provided in Table 21.

TABLE 21

Influence of 30 wt % NAD in a Cyan heatset printing ink on the rub resistances after 1 minute. For both inks the oven was either turned off or set in order to get a paper Temperature of 100° C. at the exit of the oven.

| Paper T at the exit of the oven (° C.) | Rub Test (performed at room T) | Example 23 0% NAD (comparative) | Example 24 30% NAD |
|---|---|---|---|
| Without oven T = 23° C. | Sutherland rub mark | 8 | 6 |
|  | Prüfbau rub mark | 8 | 6 |
|  | Average rub mark | 8 | 6 |
| With oven T = 100° C. | Sutherland rub mark | 3 | 4 |
|  | Prüfbau rub mark | 2 | 2 |
|  | Average rub mark | 2.5 | 3 |

The results presented in Table 21 are similar to the results observed in prints prepared using heatset printing inks containing magenta pigment. The ink of Example 24 containing 30 wt % NAD based on the weight of the ink composition exhibits a similar rub resistance improvement in comparison to the comparative heatset printing ink of Example 23 (containing no NAD) as was observed in similar inks containing magenta pigment. Because the rub resistance values are similar for cyan inks and magenta inks, it can be concluded that the color of the pigment selected does not negatively impact the improvements observed when NAD is added to a heatset printing ink composition. It also is expected that increasing the amount of NAD in the heatset printing ink compositions as was done for ink compositions containing magenta pigment also would demonstrate a rub resistance similar to that exhibited by substrates printed using the heatset printing ink composition of Example 24 when dried through the oven. Once dried through the oven, both heatset printing inks exhibited a similar rub resistance. Because the results for cyan pigment-containing formulations were so similar to magenta pigment-containing formulations, it is expected that the observed results that adding NAD to a heatset printing ink increases rapid setting and drying can be extrapolated to pigments of the other colors.

Examples 25-27

Coldset Lithographic Printing Ink Preparation

Examples 25 to 27 describe the formulation and preparation of several coldset printing ink compositions. The comparative coldset printing ink of Example 25 contains no NAD. The coldset printing ink composition of Example 26 contains about 10 wt % NAD based on the weight of the ink composition. The coldset printing ink composition of Example 27 includes about 25 wt % NAD based on the weight of the ink composition. The formulations for coldset printing inks of Examples 25 to 27 are provided in Table 22.

TABLE 22

Coldset cyan ink formulation.

|    |   |                          | Example 25 (comparative) | Example 26 | Example 27 |
|----|---|--------------------------|--------------------------|------------|------------|
| MB | A | Pigment Blue 15:3        | 12.00                    | 12.00      | 12.00      |
|    | B | [a]Rosin resin varnish   | 30.50                    | 30.50      | 30.50      |
|    | C | Alkyd                    | 5.00                     | 5.00       | 5.00       |
|    | D | Mineral oil              | 5.00                     | 5.00       | 5.00       |
|    | E | Kaolin                   | 2.00                     | 2.00       | 2.00       |
| LD | F | [b]Rosin resin varnish   | 11.50                    | 6.50       |            |
|    | G | Mineral oil              | 12.00                    | 8.50       | 2.00       |
|    | H | Organoclay               | 2.00                     | 2.00       | 2.00       |
|    | L | [c]Extender paste        | 16.50                    | 16.50      | 16.50      |
|    | I | [d]Anti-oxidant solution (BHT) | 1.00               | 1.00       | 1.00       |
|    | J | NAD (table 4)            | 0                        | 10.00      | 25.00      |
|    |   | Total (% Recipe)         | 97.50                    | 99.00      | 101.00     |

[a]Varnish contains 47.5 wt % rosin resin; 31.5 wt % mineral oil; 20.8 wt % soybean oil and 0.2 wt % AO solution (BHT) based on the weight of the varnish.
[b]Varnish contains 39.5 wt % rosin resin; 46.5 wt % Exx-Print T82A; 13.8 wt % soybean oil and 0.2 wt % AO solution (BHT) based on the weight of the varnish.
[c]Extender paste contains 60 wt % coated calcium carbonate, 4.5 wt % vegetable oil hybrid resin and 35.5 wt % mineral oil based on the weight of the extender paste.

The coldset printing ink compositions were prepared by mixing ingredients A, B, C, D and E altogether for 2 minutes at 3000 rpm with a Speedmixer™ DAC 150 FVZ from Hauschild. The mill base (MB) obtained then was passed over a three roller mill until obtaining a grain size measured on a NPIRI grind gauge below 20 μm or most preferably below 10 μm. Finally the letdown ingredients (LD) F, G, H, I, J and optionally L were added to the mill base. The resulting mixture was homogenized by mixing all the ingredients together for 2 minutes at 3000 rpm with the Speedmixer. Mineral oils optionally could be added in order to get a similar high shear viscosity for all inks so that the difference observed during the following examples cannot be attributed to a different high shear viscosity.

Coldset Lithographic Printing Press Trials

Proof prints were performed in the lab using a Prüfbau device. Coldset printing inks were printed on 2 different stocks: an uncoated paper (Newsprint 45 g/m² from Stora Enso) and a low weight coated paper (Bavaria 70 g/m² from Papier Union). Both papers were printed at a similar optical density of 1+/−0.05 measured with a spectrophotometer Datacolor/Sphere.

Rub resistance testings of the proof prints were performed on a Prüfbau Quartant abrasion testing instrument 15 minutes and 24 hours after printing. The printed paper was fixed to the still surface whereas the similar plain paper was fixed to the moving device. To evaluate the rub resistance of the different inks, 100 strikes were performed and assessed by measuring the Delta E CMC between the plain paper before and after the 100 strikes. A correlation exists between the value observed for Delta E CMC and rub resistance: the lower the Delta E CMC value, the better the rub resistance of the printed ink. A Delta E CMC value below 4 could be considered as acceptable because coldset printing inks having a Delta E CMC value below 4 generally are regarded by many customers as being trouble-free with respect to rub resistance.

The results of the rub resistance testing performed 15 minutes after printing the coldset printing ink composition on uncoated paper are provided in Table 23.

TABLE 23

Results of the rub resistance performed after 15 minutes on uncoated paper Newsprint 45 g/m² from Stora Enso.

|  | Example 25 (comparative) | Example 26 | Example 27 |
|---|---|---|---|
| wt % NAD | 0 | 10 | 25 |
| Delta E CMC after 100 strikes on Prüfbau Quartant Abrasion Testing Instrument | 6.4 | 3.12 | 3.18 |

The coldset printing ink composition of Examples 26, which contain 10 wt % NAD based on the weight of the ink composition, and the coldset printing ink composition of Example 27, which contains 30 wt % NAD based on the weight of the ink composition, exhibit a significant decrease of the Delta E CMC, which directly can be correlated to a better rub resistance. The substrates printed with the coldset printing ink compositions of Examples 26 and 27 have a rub resistance value of less than 4, indicative that the coldset printing ink compositions would be expected to be acceptable to most print customers. The comparative coldset printing ink of Example 25 containing no NAD had a rub resistance value of greater than 4, indicative that the comparative coldset printing ink without NAD would be expected to be rejected by most print customers for poor rub resistance. The coldset printing ink compositions of Examples 26 and 27 exhibit very similar acceptable rub resistance values shortly after printing using a coldset lithographic printing process and demonstrate that set and rub resistance quickly is attained on uncoated paper using coldset printing ink compositions containing NAD.

After 24 hours, the print samples of the comparative coldset ink of Example 25 and the coldset printing ink compositions of Examples 26 and 27 containing NAD printed on uncoated paper were tested for rub resistance. The data is provided in Table 24.

TABLE 24

Results of the rub resistance performed after 24 hours
on uncoated paper Newsprint 45 g/m² from Stora Enso.

|  | Example 25 (comparative) | Example 26 | Example 27 |
|---|---|---|---|
| wt % NAD | 0 | 10 | 25 |
| Delta E CMC after 100 Strikes on Prüfbau Quartant Abrasion Testing Instrument | 3.13 | 3.84 | 2.39 |

After 24 hours, the rub resistance value of the comparative coldset printing ink of Example 25, containing no NAD, is significantly improved in comparison to the rub test performed 15 minutes after printing (see Table 23). Although the coldset printing ink composition of Example 26 exhibits a slightly worse rub resistance at 24 hours when compared to the rub resistance value obtained 15 minutes after printing, the Delta E CMC remains below 4 and should, therefore, still be accepted by customers. The coldset printing ink composition of Example 27, which contains 30 wt % of NAD based on the weight of the ink composition, exhibits the best rub resistance after 24 hours on uncoated paper, yielding a rub resistance value of 2.39.

The kinetics in forming a rub resistant ink film using coldset printing inks was determined. The rub resistance of the comparative coldset printing ink of Example 25 (containing no NAD) and the rub resistance of the coldset printing ink composition of Example 27 (containing 25 wt % NAD based on the weight of the ink composition) was compared over time. It was observed that the speed at which a rub resistant ink film is produced on a printed uncoated paper substrate is significantly increased by the introduction of NAD in a coldset printing ink. Exemplary data is provided in Table 25.

TABLE 25

Comparison of the rub resistance of a substrate printed with
the coldset printing ink of Example 25 (no NAD) after 24 hours
to the rub resistance after 15 minutes of a substrate printed
with the coldset printing ink composition of Example 27 (25
wt % NAD based on the weight of the ink composition).

|  | Example 25 after 24 hr (comparative) | Example 27 after 15 min |
|---|---|---|
| wt % NAD | 0 | 25 |
| Delta E CMC after 100 Strikes on Prüfbau Quartant Abrasion Testing Instrument | 3.13 | 3.18 |

The data in Table 25 demonstrate that the substrate printed with the coldset printing ink composition containing NAD (Example 27) has a rub resistance 15 minutes after printing that is similar to the rub resistance obtained using a comparative ink (without NAD) after 24 hours. Thus, addition of NAD to a coldset printing ink can significantly increase the speed with which a printed ink sets and attains rub resistance.

Paper Types

Coldset printing inks generally only can be printed on porous paper, since the coldset printing inks dry by absorption of the solvents into the paper substrate. Traditional coldset printing inks generally cannot be printed on super calendered or coated papers because the pore size or coating minimizes or prevents adequate absorption of the solvents into the substrate. To demonstrate that coldset printing ink compositions containing NAD can be printed on various paper types using a coldset lithographic printing process, coldset printing inks were printed on super calendered and low weight coated paper.

Super Calendered Paper

The coldset printing ink compositions of Examples 25 to 27 were printed on super calendered and coated paper to determine the effect of addition of NAD on printability of coldset printing ink compositions on different paper substrates. The results for the rub resistance of the coldset printing ink formulations printed on super calendered paper are provided in Tables 26 and 27. Table 26 provides the results of rub resistance testing performed 15 minutes after printing the ink compositions on super calendered paper (Publipress 64 g/m² from Stora Enso).

TABLE 26

Results of the rub resistance performed after 15 minutes on
super calendered paper Publipress 64 g/m² from Stora Enso.

|  | Example 25 (comparative) | Example 26 | Example 27 |
|---|---|---|---|
| wt % NAD | 0 | 10 | 25 |
| Delta E CMC after 100 Strikes on Prüfbau Quartant Abrasion Testing Instrument | 5.42 | 3.94 | 3.27 |

The data indicate that adding NAD to a coldset printing ink composition enhances short term rub resistance on super calendered paper, which typically cannot be printed with standard coldset printing inks. The rub resistance values obtained 15 minutes after printing show that the comparative coldset printing inks containing no NAD have a Delta E CMC value well above 4 and, therefore, likely would be rejected by customers due to poor rub resistance. The rub resistance values obtained 15 minutes after printing show that the coldset printing inks containing NAD have a Delta E CMC value below 4 and, therefore, should be accepted by customers. Thus, coldset printing ink compositions containing at least 10 wt % NAD based on the weight of the ink composition can be used to print on super calendered paper as evidenced by the exhibited short term rub resistance of the printed inks.

The coldset printing ink composition of Example 27 containing 25 wt % NAD based on the weight of the ink composition exhibits an increasing improvement in rub resistance when compared to the ink composition of Example 26, which contains only 10 wt % NAD based on the weight of the ink composition. The trend of the data suggests that increasing the amount of the NAD in the coldset printing ink composition would yield increasing improvements in rub resistance on this substrate. Accordingly, coldset printing ink compositions containing NAD demonstrate rub resistance on a super calendered paper within 15 minutes of printing on this substrate.

Table 27 provides the results of rub resistance testing performed 24 hours after printing the ink compositions on super calendered paper (Publipress 64 g/m² from Stora Enso).

TABLE 27

Results of the rub resistance performed after 24 hours on super calendered paper Publipress 64 g/m² from Stora Enso.

| | Example 25 (comparative) | Example 26 | Example 27 |
|---|---|---|---|
| wt % NAD | 0 | 10 | 25 |
| Delta E CMC after 100 Strikes on Prüfbau Quartant Abrasion Testing Instrument | 20.66 | 16.56 | 3.68 |

The data indicate that the comparative coldset printing ink of Example 25, which contains no NAD, exhibits, on super calendered paper, a very poor rub resistance after 24 hours. The coldset printing ink composition of Example 26, which contains 10 wt % of NAD based on the weight of the ink composition, exhibits improvement in rub resistance when compared to the comparative coldset printing ink containing no NAD (Example 25). The coldset printing ink composition of Example 27, containing 25 wt % of NAD based on the weight of the ink composition, exhibits a significant improvement in rub resistance compared to the conventional coldset printing ink (Example 25). For the sample printed with the coldset printing ink of Example 27, the Delta E CMC was below the critical value of 4. Hence, the data indicate that it should be possible to run such an ink on super calendered paper using a coldset lithographic printing process. The sample printed with the coldset printing ink composition of Example 27 containing 25 wt % NAD based on the weight of the ink composition exhibits an increasing improvement in rub resistance when compared to the sample printed with the coldset printing ink composition of Example 26, which contains only 10 wt % NAD based on the weight of the ink composition. Therefore, the trend of the data suggests that increasing the amount of the NAD in the exemplary coldset printing ink composition yields increasing improvements in rub resistance of this formulation on this substrate. Accordingly, coldset printing ink compositions containing NAD would be expected to be able to be used to print on super calendered paper using a coldset lithographic printing process.

Low Weight Coated Paper

The coldset printing ink compositions of Examples 25 to 27 also were printed on low weight coated paper to determine the effect of addition of NAD on printability on this paper substrate. The results for the rub resistance of the coldset printing ink formulations printed on low weight coated paper are provided in Table 28. Table 28 provides the results of rub resistance testing performed 15 minutes after printing the ink compositions on low weight coated paper (Bavaria 70 g/m² from Papier Union).

TABLE 28

Results of the rub resistance performed after 15 minutes on low weight coated paper (Bavaria 70 g/m² from Papier Union).

| | Example 25 (comparative) | Example 26 | Example 27 |
|---|---|---|---|
| wt % NAD | 0 | 10 | 25 |
| Delta E CMC after 100 Strikes on a Prüfbau Quartant Abrasion Testing Instrument | 23.18 | 16.88 | 4.99 |

The rub resistance data indicate that substrate printed with the comparative coldset printing ink of Example 25, which contains no NAD, exhibits, on low weight coated paper, a very poor rub resistance after 15 minutes. The substrate printed with the exemplary coldset printing ink composition of Example 26, which contains 10 wt % NAD based on the weight of the ink composition, exhibits improvement in rub resistance when compared to the rub resistance of the comparative coldset printing ink containing no NAD (Example 25). The substrate printed with the coldset printing ink composition of Example 27, which contains 25 wt % NAD based on the weight of the ink composition, exhibits a significant improvement in rub resistance compared to the comparative coldset printing ink containing no NAD (Example 25). For the exemplary sample printed with the coldset ink of Example 27, the Delta E CMC was approaching the critical value of 4.

The coldset printing ink composition of Example 27, which contains 25 wt % of NAD based on the weight of the ink composition, exhibits an increasing improvement in short term rub resistance when compared to the coldset printing ink composition of Example 26, which contains only 10 wt % NAD based on the weight of the ink composition. The trend of the data suggests that increasing the amount of the NAD in the coldset printing ink composition would yield increasing improvements in rub resistance on low weight coated paper.

The present invention has been described in detail, including the preferred embodiments thereof, but is more broadly applicable as will be understood by those skilled in the art. It will be appreciated that those skilled in the art, upon consideration of the present disclosure, may make modifications and/or improvements on this invention that fall within the scope and spirit of the invention. Since modifications will be apparent to those of skill in this art, it is intended that this invention be limited only by the scope of the following claims.

What is claimed is:

1. A lithographic printing ink comprising from 10 to 60 wt % of a non-aqueous dispersion (NAD) of an acrylic core/shell polymer, comprising:
    an acrylic shell polymer;
    an acrylic core polymer;
    a continuous phase of an essentially non-aqueous solvent;
    a drier and an anti-oxidant.

2. The lithographic printing ink of claim 1, wherein the acrylic shell polymer is soluble in the continuous phase of the essentially non-aqueous solvent; and the acrylic core polymer is insoluble in the continuous phase of the essentially non-aqueous solvent but is soluble in the acrylic shell polymer.

3. The lithographic printing ink of claim 1, wherein the continuous phase of essentially non-aqueous solvent contains 0.001 wt % to 1.0 wt % water based on the weight of the dispersion.

4. The lithographic printing ink of claim 1, wherein the (NAD) comprises a rheology adjusting component containing water, a $C_1$-$C_6$ alcohol, a metal hydroxide, an alkyl amine and/or a primary amine, a secondary amine, tertiary amine or a combination thereof.

5. The lithographic printing ink of claim 1, which is a sheetfed offset printing ink.

6. The lithographic printing ink of claim 1, which is a heat offset printing ink.

7. The lithographic printing ink of claim 1, which is a coldset offset printing ink.

8. The lithographic printing ink of claim 1, wherein the lithographic printing ink does not contain metal drier or metal catalyst.

9. The lithographic printing ink of claim 4, wherein the rheology adjusting component contains a mixture of water, potassium hydroxide, isopropanol and diethylamine.

10. The lithographic printing ink of claim 9, wherein the rheology adjusting component is present in an amount from 0.01 wt % to 2.0 wt % based on the weight of the dispersion.

11. The lithographic printing ink of claim 1, wherein the continuous phase essentially non-aqueous solvent has a sulfur content at or below 1000 ppm.

12. The lithographic printing ink of claim 1, wherein the continuous phase essentially non-aqueous solvent has an aniline point between 45° C. and 90° C.

13. The lithographic printing ink of claim 1, wherein the acrylic shell polymer contains isobutyl methacrylate and dodecyl methacrylate.

14. The lithographic printing ink claim 1, wherein the acrylic core polymer contains methylmethacrylate and N-butyl methacrylate.

15. The lithographic printing ink of claim 1, wherein 90% of the acrylic core/shell polymer particles have a particle size of less than 3 microns.

16. The lithographic printing ink of claim 1, wherein at least 50% of the acrylic core/shell polymer particles have a particle size of less than 1.5 microns.

17. The lithographic printing ink of claim 1, wherein the average particle size of the acrylic core/shell polymer particles is in the range of 300 nm to 1300 nm.

18. The lithographic printing ink of claim 1, wherein the acrylic core/shell polymer particles contain from 15 wt % to 75 wt % acrylic core polymer based on the weight of the acrylic core/shell polymer particle.

19. The lithographic printing ink of claim 1, wherein the acrylic core/shell polymer particles contain from 15 wt % to 75 wt % acrylic shell polymer based on the weight of the acrylic core/shell polymer particle.

20. The lithographic printing ink of claim 1, wherein the acrylic core/shell polymer particles have an average core-to-shell ratio of from 0.60 to 2.0.

21. The lithographic printing ink of claim 1, wherein the amount of acrylic core polymer in the dispersion is from 15 wt % to 35 wt % based on the weight of the dispersion.

22. The lithographic printing ink of claim 1, wherein the amount of acrylic shell polymer in the dispersion is from 15 wt % to 35 wt % based on the weight of the dispersion.

23. The lithographic printing ink of claim 1, wherein the amount of acrylic core/shell polymer particles in the dispersion is from 30 wt % to 70 wt % based on the weight of the dispersion.

24. The lithographic printing ink of claim 1, wherein the amount of essentially non-aqueous solvent in the dispersion is from 30 wt % to 70 wt % based on the weight of the dispersion.

25. The lithographic printing ink of claim 1 having a viscosity of 10 Pa·s to 150 Pa·s at a shear rate of 50 s$^{-1}$.

26. The lithographic printing ink of claim 1 having a viscosity of 40 Pa·s to 100 Pa·s at a shear rate of 50 s$^{-1}$.

27. The lithographic printing ink of claim 1, wherein the continuous phase essentially non-aqueous solvent is a hydrocarbon solvent.

28. The lithographic printing ink of claim 1, wherein the continuous phase essentially non-aqueous solvent is a white mineral or a hydrotreated light naphthenic distillate.

29. The lithographic printing ink of claim 1, wherein the continuous phase essentially non-aqueous solvent is a vegetable oil.

30. The lithographic printing ink of claim 1, wherein the continuous phase essentially non-aqueous solvent is a fatty acid alkyl ester.

31. The lithographic printing ink of claim 1, wherein the continuous phase essentially non-aqueous solvent is a ethyl hexyl palmitate.

32. The lithographic printing ink of claim 1, wherein the acrylic shell polymer and/or acrylic core polymer contain a copolymer of monomers that contain a functional group selected from the group consisting of a carboxyl group, a hydroxyl group and a vinyl group.

33. The lithographic printing ink of claim 32, wherein the monomers containing a carboxyl group are selected from the group consisting of acrylic acid, methacrylic acid, itaconic acid and maleic acid.

34. The lithographic printing ink of claim 32, wherein the monomers containing a hydroxyl group are selected from the group consisting of 2-hydroxy ethyl acrylate, 2-hydroxy ethyl methacrylate, 2-hydroxy propyl acrylate and 2-hydroxy propyl methacrylate.

* * * * *